US010850994B2

(12) United States Patent
Cam et al.

(10) Patent No.: US 10,850,994 B2
(45) Date of Patent: Dec. 1, 2020

(54) ELECTROCHEMICAL LIQUID TREATMENT APPARATUS

(71) Applicant: Hydrus Technology Pty. Ltd., Brisbane (AU)

(72) Inventors: David Victor Cam, Brisbane (AU); John Frederick Ellers, Brisbane (AU); Brook Douglas Hill, Brisbane (AU)

(73) Assignee: Hydrus Technology Pty. Ltd., Brisbane (AU)

( * ) Notice: Subject to any disclaimer, the term of this patent is extended or adjusted under 35 U.S.C. 154(b) by 178 days.

(21) Appl. No.: 15/313,461

(22) PCT Filed: May 22, 2015

(86) PCT No.: PCT/AU2015/050268
§ 371 (c)(1),
(2) Date: Nov. 22, 2016

(87) PCT Pub. No.: WO2015/176136
PCT Pub. Date: Nov. 26, 2015

(65) Prior Publication Data
US 2017/0152162 A1 Jun. 1, 2017

(30) Foreign Application Priority Data

May 23, 2014 (AU) ................................ 2014901949
Jan. 16, 2015 (AU) ................................ 2015900125
(Continued)

(51) Int. Cl.
*C02F 1/463* (2006.01)
*C02F 1/461* (2006.01)
*C02F 1/24* (2006.01)

(52) U.S. Cl.
CPC .......... *C02F 1/463* (2013.01); *C02F 1/46109* (2013.01); *C02F 1/24* (2013.01);
(Continued)

(58) Field of Classification Search
CPC ........ C02F 1/463; C02F 1/46109; C02F 1/24; C02F 2201/46135; C02F 2201/4611;
(Continued)

(56) References Cited

U.S. PATENT DOCUMENTS 2,931,412 A * 4/1960 Wing .................... F01L 1/047
411/108
3,728,245 A 1/1973 Preis et al.
(Continued)

FOREIGN PATENT DOCUMENTS

AU        784188       7/2003
AU     2012244232      5/2013
(Continued)

OTHER PUBLICATIONS

Barkley et al. Emerging Technology Summary, Electro-Pure Alternating Current Electrocoagulation, United States Environmental Protection Agency, (1993).
(Continued)

*Primary Examiner* — Louis J Rufo
(74) *Attorney, Agent, or Firm* — Leydig, Voit & Mayer, Ltd.

(57) ABSTRACT

Apparatus includes treatment chamber including at least one outlet for exit of electrochemically treated liquid, and a liquid disperser having a plurality of liquid passageways, wherein each said liquid passageway includes at least one inlet to the treatment chamber for entry of a liquid to be treated; and a plurality of electrodes positioned within the treatment chamber for electrochemical treatment of the liquid.

19 Claims, 18 Drawing Sheets

(30) Foreign Application Priority Data

Apr. 27, 2015 (AU) .................................. 2015901496
Apr. 27, 2015 (AU) .................................. 2015901497

(52) U.S. Cl.
CPC ............... *C02F 2001/46152* (2013.01); *C02F 2201/4611* (2013.01); *C02F 2201/4614* (2013.01); *C02F 2201/4619* (2013.01); *C02F 2201/46135* (2013.01); *Y02W 10/37* (2015.05)

(58) Field of Classification Search
CPC ...... C02F 2201/4614; C02F 2201/4619; C02F 2001/46152; Y02W 10/37
See application file for complete search history.

(56) References Cited

U.S. PATENT DOCUMENTS

| | | | |
|---|---|---|---|
| 3,925,176 | A | 12/1975 | Okert |
| 4,293,400 | A | 10/1981 | Liggett |
| 4,732,661 | A | 3/1988 | Wright |
| 4,872,959 | A | 10/1989 | Herbst et al. |
| 5,043,050 | A | 8/1991 | Herbst |
| D331,105 | S | 11/1992 | Bender et al. |
| 5,302,273 | A | 4/1994 | Kemmerer |
| 5,423,962 | A | 6/1995 | Herbst |
| 5,558,755 | A | 9/1996 | Gardner-Clayson et al. |
| 5,611,907 | A | 3/1997 | Herbst et al. |
| 5,807,473 | A | 9/1998 | Sadler et al. |
| 5,954,937 | A | 9/1999 | Farmer |
| 5,958,213 | A | 9/1999 | Goto |
| 6,139,710 | A | 10/2000 | Powell |
| 6,238,546 | B1 | 5/2001 | Knieper et al. |
| 6,309,519 | B1 | 10/2001 | Napper |
| 6,488,835 | B1 | 12/2002 | Powell |
| 6,613,217 | B1 | 9/2003 | Gilmore |
| 6,652,733 | B2 | 11/2003 | Napper |
| 6,663,783 | B2 | 12/2003 | Stephenson et al. |
| 6,746,593 | B2 | 6/2004 | Herbst |
| 6,780,292 | B2 | 8/2004 | Hermann et al. |
| 6,849,178 | B2 | 2/2005 | Flecking |
| 6,866,757 | B2 | 3/2005 | Gilmore |
| 6,962,662 | B2 | 11/2005 | Wurzburger |
| 6,972,077 | B2 | 12/2005 | Tipton et al. |
| 7,211,185 | B2 | 5/2007 | Powell |
| 7,252,752 | B2 | 8/2007 | Holland |
| 7,258,800 | B1 | 8/2007 | Herbst |
| 7,682,492 | B2 | 3/2010 | Bradley |
| 7,758,742 | B2 | 7/2010 | Powell |
| 7,862,700 | B2 | 1/2011 | Wilkins et al. |
| 7,892,439 | B2 | 2/2011 | Hadjiev et al. |
| 7,943,087 | B2 | 5/2011 | McGuire et al. |
| 7,981,293 | B2 | 7/2011 | Powell |
| 7,981,301 | B2 | 7/2011 | Powell |
| 7,998,225 | B2 | 8/2011 | Powell |
| 8,048,279 | B2 | 11/2011 | Powell et al. |
| 8,157,972 | B2 | 4/2012 | Hegel et al. |
| 8,192,617 | B2 | 6/2012 | Powell |
| 8,318,027 | B2 | 11/2012 | McGuire et al. |
| D675,171 | S | 1/2013 | Tanaka |
| 8,460,520 | B2 | 6/2013 | Rigby |
| 8,551,305 | B2 | 10/2013 | Behr |
| D695,699 | S | 12/2013 | Shih |
| 8,641,875 | B2 | 2/2014 | McAlister |
| 8,871,691 | B2 | 10/2014 | Rey et al. |
| 2001/0047934 | A1 | 12/2001 | Satoh |
| 2002/0040855 | A1 | 4/2002 | Morkovsky et al. |
| 2003/0017578 | A1 | 1/2003 | Ueberle et al. |
| 2004/0079650 | A1 | 4/2004 | Morkovsky et al. |
| 2004/0168909 | A1 | 9/2004 | Larson |
| 2005/0082164 | A1 | 4/2005 | Inamoto et al. |
| 2006/0096853 | A1 | 5/2006 | King |
| 2007/0068826 | A1 | 3/2007 | Morkovsky et al. |
| 2007/0215536 | A1 | 9/2007 | Bommi et al. |
| 2009/0068895 | A1 | 3/2009 | Millard |
| 2009/0230059 | A1 | 9/2009 | McGuire et al. |
| 2010/0116650 | A1 | 5/2010 | Bostock |
| 2010/0252447 | A1 | 10/2010 | Powell |
| 2011/0024361 | A1 | 2/2011 | Schwartzel et al. |
| 2011/0079510 | A1 | 4/2011 | Tretheway et al. |
| 2011/0266203 | A1 | 11/2011 | Frisky |
| 2011/0297552 | A1 | 12/2011 | Boyle et al. |
| 2011/0312222 | A1 | 12/2011 | Tanaka |
| 2012/0037568 | A1 | 2/2012 | Karrs et al. |
| 2012/0103797 | A1* | 5/2012 | Hermann .................. C25B 9/00 204/278.5 |
| 2012/0138482 | A1 | 6/2012 | Fanfan et al. |
| 2012/0152760 | A1 | 6/2012 | Robinson |
| 2012/0160706 | A1 | 6/2012 | Poirier et al. |
| 2012/0273367 | A1 | 11/2012 | Themy et al. |
| 2012/0298526 | A1* | 11/2012 | Haivala .................. C02F 1/463 205/742 |
| 2013/0112571 | A1 | 5/2013 | Doi |
| 2013/0140245 | A1 | 6/2013 | Themy |
| 2013/0161262 | A1 | 6/2013 | Henley |
| 2013/0180857 | A1 | 7/2013 | Heffernan et al. |
| 2013/0206664 | A1 | 8/2013 | Kim |
| 2013/0211113 | A1 | 8/2013 | Eckelberry et al. |
| 2013/0264210 | A1* | 10/2013 | Cobas .................. C02F 1/463 204/660 |
| 2014/0008242 | A1 | 1/2014 | Duarte |
| 2014/0021052 | A1 | 1/2014 | Andersen |
| 2014/0027271 | A1* | 1/2014 | Berrak .................. C02F 1/463 204/225 |
| 2014/0054173 | A1 | 2/2014 | Andersen |
| 2014/0054225 | A1 | 2/2014 | De la Monja Carter et al. |
| 2014/0076804 | A1 | 3/2014 | Kruk et al. |
| 2014/0151300 | A1 | 6/2014 | Savage et al. |
| 2014/0174942 | A1 | 6/2014 | Wylie et al. |
| 2014/0238934 | A1 | 8/2014 | Losh et al. |
| 2014/0263094 | A1 | 9/2014 | Quicksall et al. |
| 2014/0287509 | A1 | 9/2014 | Adamo et al. |
| 2014/0311920 | A1 | 10/2014 | Robinson |
| 2014/0339162 | A1 | 11/2014 | Cao et al. |
| 2015/0041333 | A1 | 2/2015 | Li et al. |
| 2015/0053619 | A1 | 2/2015 | Cao et al. |
| 2015/0266753 | A1 | 9/2015 | Fraim et al. |
| 2015/0315055 | A1 | 11/2015 | Chidambaran et al. |
| 2016/0280566 | A1* | 9/2016 | Rau, III .................. C02F 1/463 |
| 2016/0376172 | A1 | 12/2016 | Ellers |

FOREIGN PATENT DOCUMENTS

| | | | |
|---|---|---|---|
| DE | 4443297 | | 3/1996 |
| DE | 202012006736 | | 12/2012 |
| ES | 1069094 | | 2/2009 |
| FR | 2707282 | | 1/1995 |
| GB | 2440139 | A | 1/2008 |
| GB | 2440139 | A | 1/2008 |
| GB | 2500663 | A | 10/2013 |
| WO | 199640591 | | 12/1996 |
| WO | 199943617 | | 9/1999 |
| WO | 2007070628 | | 6/2007 |
| WO | 2010060016 | | 5/2010 |
| WO | WO-2012098058 | A1 * | 7/2012 ............ B01D 61/44 |
| WO | 2012151617 | | 11/2012 |
| WO | 2012166997 | | 12/2012 |
| WO | 2013048724 | | 4/2013 |
| WO | 2013050058 | | 4/2013 |
| WO | 2013055221 | | 4/2013 |
| WO | 2013117630 | | 8/2013 |
| WO | 2013178722 | | 12/2013 |
| WO | 2014088826 | | 6/2014 |

OTHER PUBLICATIONS

Kraus and Parker (1922) The Calibration of Cells for Conductance Measurements. Journal of the American Chemical Society. 44, 2422.

Lonergan and Pepper (1965) Transport Numbers and Ionic Mobilities by the Moving Boundary Method. Journal of Chemical Education. 42, 82.

(56) References Cited

OTHER PUBLICATIONS

Corrected version of International Search Report; PCT/AU2015/050268 dated Aug. 11, 2015.
Corrected version of Written Opinion; PCT/AU2015/050268 dated Aug. 11, 2015.
International Preliminary Report; PCT/AU2015/050268 dated Jun. 10, 2016.
PCT/AU2015/050268 "International Search Report," dated Nov. 26, 2015.

* cited by examiner

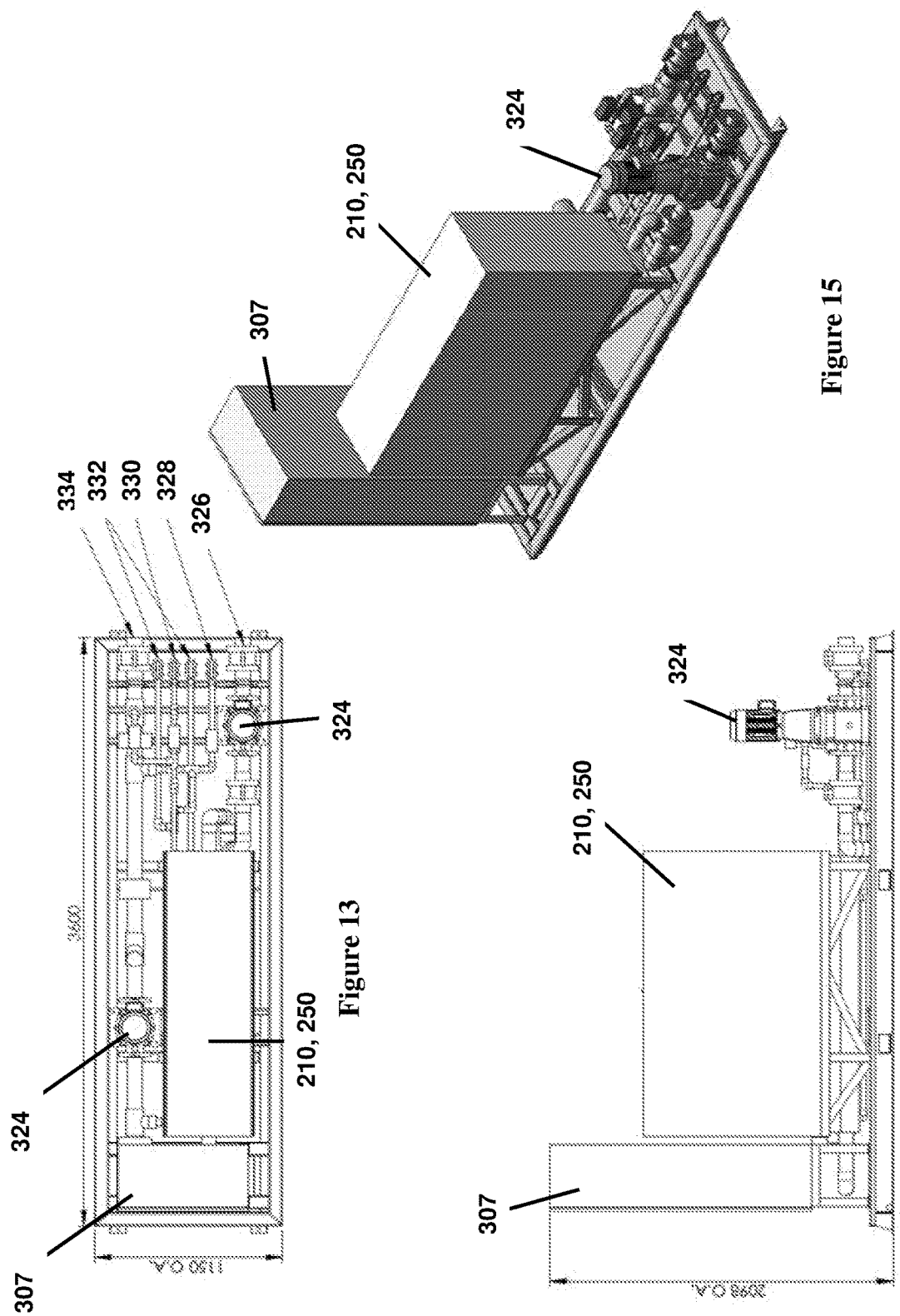

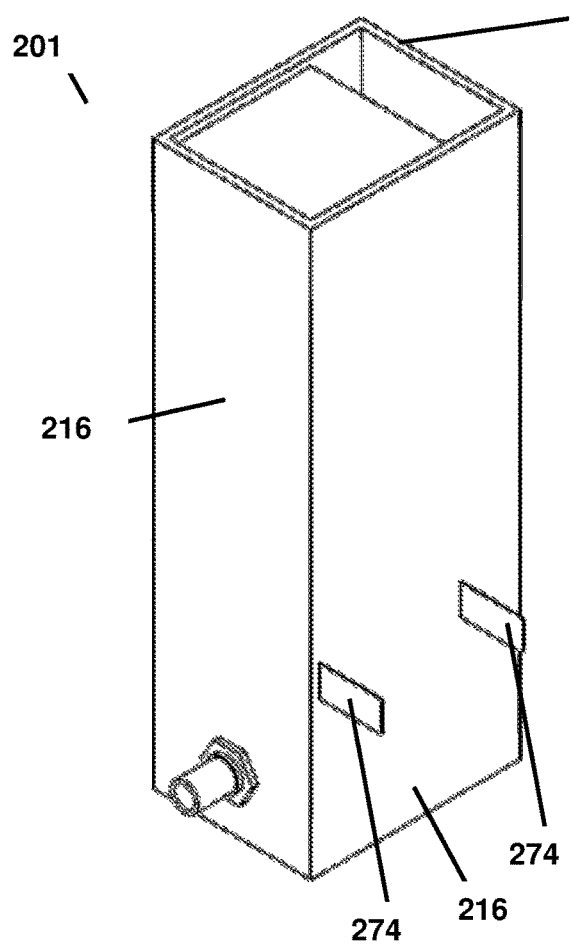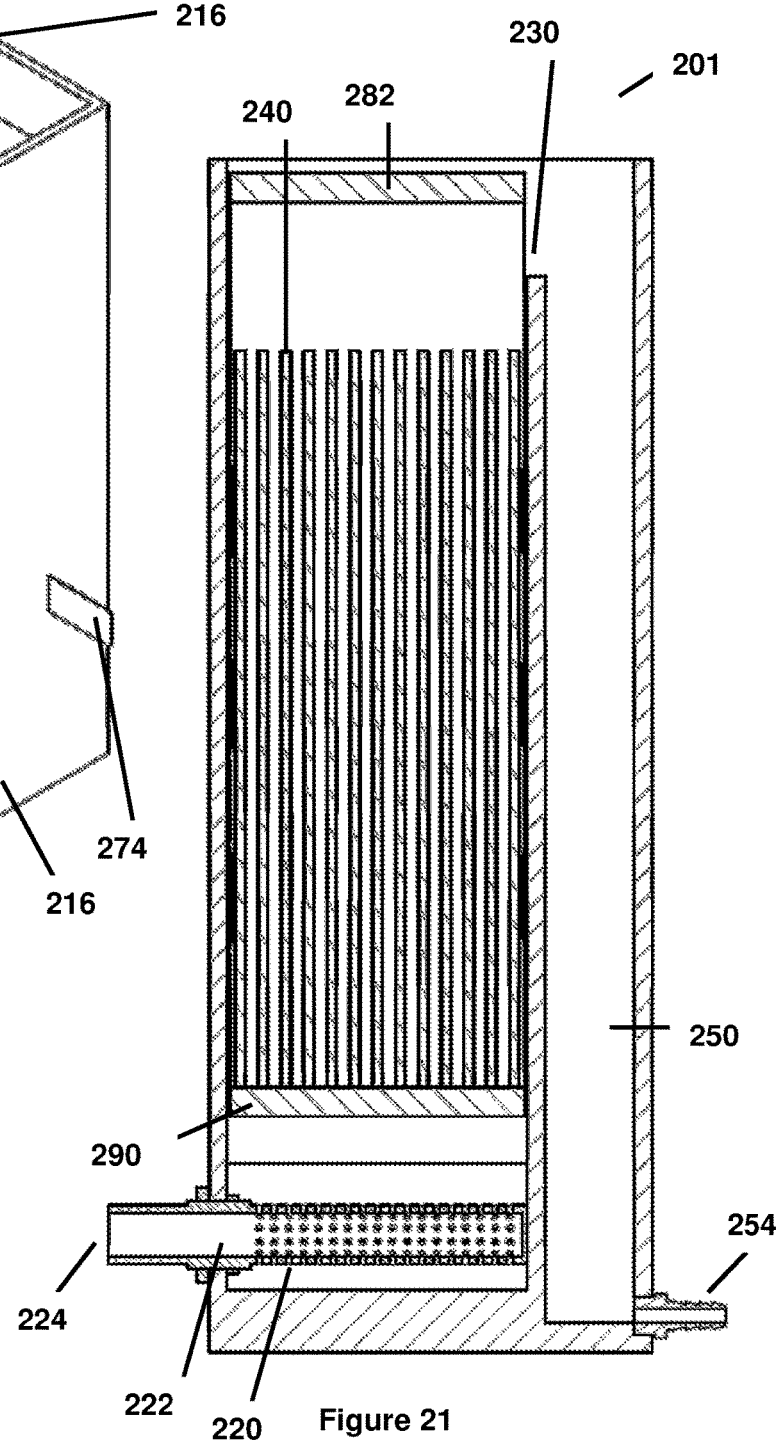
Figure 20
Figure 21

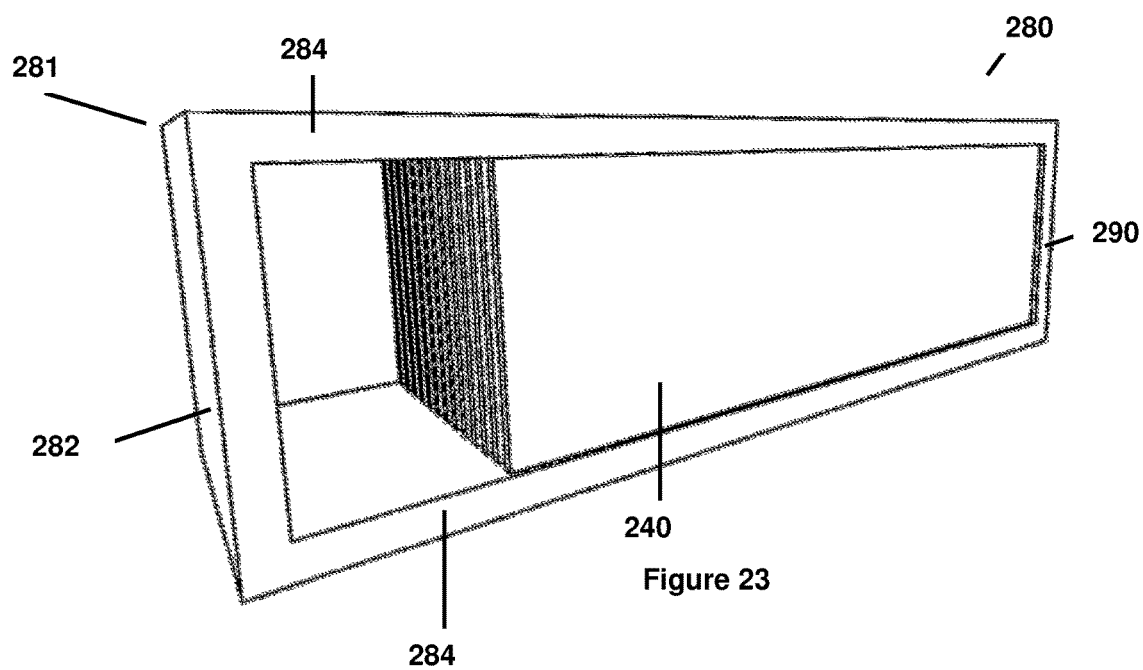
Figure 23
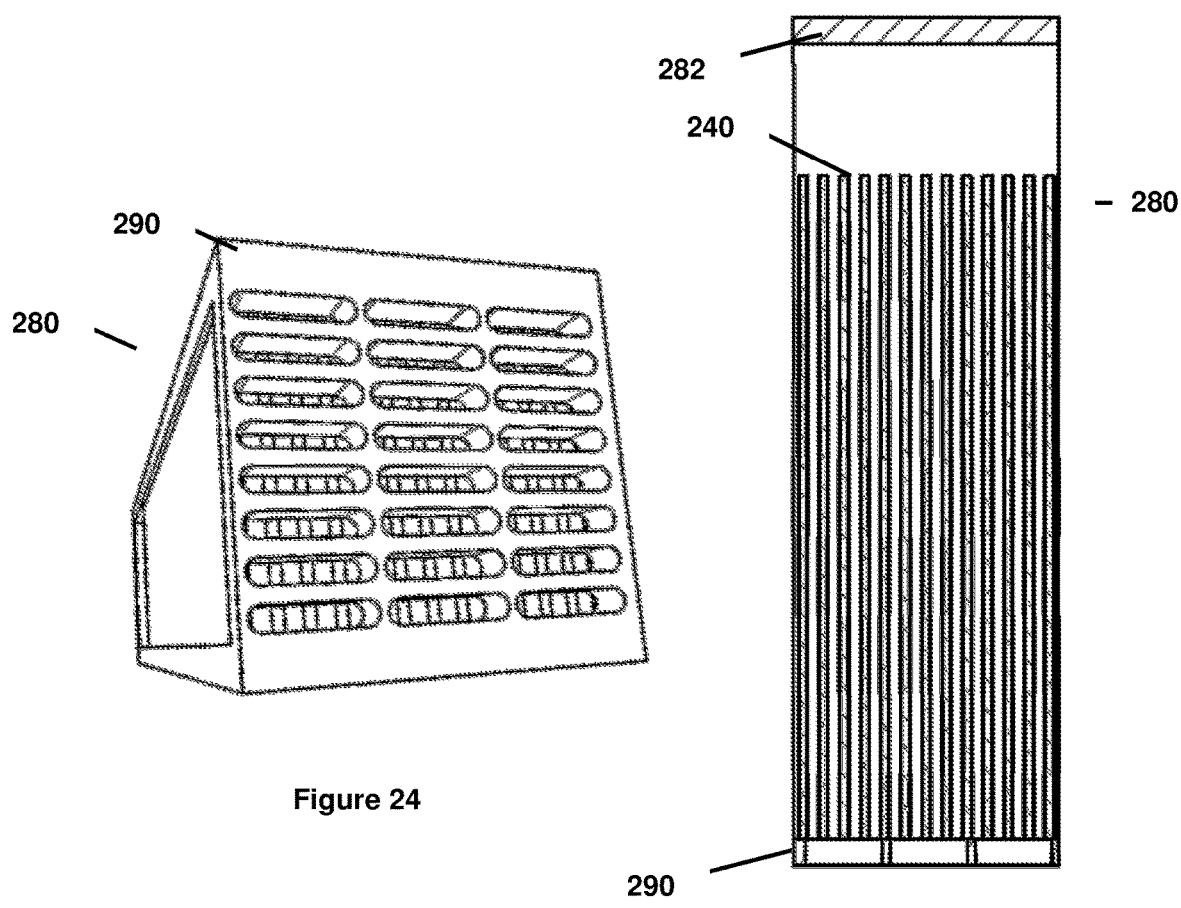
Figure 24
Figure 25

ELECTROCHEMICAL LIQUID TREATMENT APPARATUS

TECHNICAL FIELD

The present disclosure relates, inter alia, to an electrochemical liquid treatment apparatus and to methods of electrochemically treating a liquid.

BACKGROUND ART

It will be clearly understood that, if a prior art publication is referred to herein, this reference does not constitute an admission that the publication forms part of the common general knowledge in the art in Australia or in any other country.

A wide range of chemical processes may be effected using electrolysis—an area of chemistry known as electrochemistry. An increasingly significant electrochemical process is electrocoagulation, which may be used to separate contaminants from liquids. Such contaminants may include metals, solids, pathogens, colloids, chemicals, and various other undesirable substances.

Electrocoagulation may be used to treat a wide variety of liquids, but in the last decade electrocoagulation especially has been used increasingly for the treatment of industrial wastewater. For example, electrocoagulation may be used to treat water containing food and beverage manufacturing waste, oil wastes, dyes, suspended particulates, chemical waste, organic matter from various industrial processes and effluents, and drainage arising from mining activities (such as so-called acid mine drainage (AMD) where the drainage contains heavy metals or other environmental pollutants).

In an electrocoagulation process, a liquid being treated flows past an electric field generated between an anode and a cathode. Metal ions may be generated at the anode, along with production of both hydroxyl ions and higher energy hydroxyl radicals at the cathode. Gases may also be formed, such as hydrogen gas. Electrons can also travel through the liquid in a process known as electron flooding. Ionic species, radical species, electrons and gases may result in chemical modification of contaminants in the liquid (such as through oxidation), as well as destabilisation of electrical charges holding contaminants in the liquid (i.e. reduction of the net surface charge of the contaminants, which thereby reduces repulsive charges). This latter effect may allow the contaminant particles to move closer together and allow aggregation (through, for example, van der Waals forces), and aggregation may also be aided by the presence of gelatinous polymeric metal hydroxides in the solution, formed when metal ions generated by sacrificial dissolution of the anode chemically combine with hydroxyl ions at the cathode.

Electrocoagulation can be a relatively complex process, and the apparatus and conditions under which the electrocoagulation is or will be performed significantly affects the efficiency of the process. While various apparatuses for electrocoagulation are known, the preferred embodiment of the present disclosure provides an apparatus that improves the efficiency of an electrochemical process (especially an electrolytic or electrocoagulation process) and optionally the oxidation (or reduction, as required) of contaminant materials. For example, the apparatus may permit one or more of the following compared to prior art apparatuses: improved removal, or recovery and separation, of contaminants; reduced down-time for maintenance; reduced anode consumption; reduced power consumption; reduced cathode passivation and higher through-put of a liquid being treated.

SUMMARY OF INVENTION

In a first aspect, the present disclosure relates to an electrochemical liquid treatment apparatus, the apparatus including:
  a treatment chamber including at least one outlet for exit of electrochemically treated liquid, and a liquid disperser having a plurality of liquid passageways, wherein each said liquid passageway includes at least one inlet to the treatment chamber for entry of a liquid to be treated; and
  a plurality of electrodes positioned within the treatment chamber for electrochemical treatment of the liquid.

In a second aspect, the present disclosure relates to an electrochemical liquid treatment apparatus, the apparatus including:
  a treatment chamber including at least one inlet for entry of a liquid to be treated, and at least one outlet for exit of electrochemically treated liquid;
  a plurality of electrodes positioned within the treatment chamber for electrochemical treatment of the liquid, wherein the plurality of electrodes includes at least one anode, at least one cathode and at least one electrical conductor, wherein said at least one electrical conductor is positioned intermediate said at least one cathode and said at least one anode.

As used herein, the term "electrical conductor" refers to an electrode which is not intended to accept power from a power source external to the treatment chamber. The electrical conductor may obtain an electrolytic charge from the electron flow in an electric field contained within the vessel in which it resides.

In a third aspect, the present disclosure relates to an electrochemical liquid treatment apparatus, the apparatus including a plurality of electrodes angled from a vertical plane.

In one embodiment of this aspect, the apparatus further includes a treatment chamber within which said plurality of electrodes are positioned, the treatment chamber including at least one inlet for entry of a liquid to be treated and at least one outlet for exit of electrochemically treated liquid.

In a fourth aspect, the present disclosure relates to an electrochemical liquid treatment apparatus, the apparatus including:
  at least a first and a second treatment chamber, wherein each said treatment chamber includes:
    at least one inlet for entry of a liquid to be treated, and at least one outlet for exit of electrochemically treated liquid; and
    a plurality of electrodes positioned within the treatment chamber for electrochemical treatment of the liquid,
  wherein the apparatus is configured so that liquid from said at least one outlet of the first treatment chamber flows into said at least one inlet of the second treatment chamber.

In a fifth aspect, the present disclosure relates to an electrochemical liquid treatment apparatus, the apparatus including:
  a treatment chamber including:
    at least one inlet for entry of a liquid to be treated;
    at least one treatment inlet for entry of a treatment agent for assisting in the treatment of the liquid; and
    at least one outlet for exit of electrochemically treated liquid; and a plurality of electrodes positioned within the treatment chamber for electrochemical treatment of the liquid.

In a sixth aspect, the present disclosure relates to an electrochemical liquid treatment apparatus, the apparatus including:
- a treatment chamber including:
  - at least one inlet for entry of a liquid to be treated; and
  - at least one outlet for exit of electrochemically treated liquid; and
- a plurality of electrodes positioned within the treatment chamber for electrochemical treatment of the liquid; and wherein the apparatus is adapted to provide at least one treatment agent in the treatment chamber during electrochemical treatment of a liquid.

In a seventh aspect, the present disclosure relates to an electrochemical liquid treatment apparatus, the apparatus including a treatment chamber including at least one inlet for entry of a liquid to be treated and at least one outlet for exit of electrochemical treated liquid, wherein the treatment chamber is configured to engage (especially releasably engage) with at least one electrode holder holding a plurality of electrodes for electrochemical treatment of the liquid. In one embodiment of the seventh aspect, the apparatus further includes the electrode holder holding a plurality of electrodes, especially such that the plurality of electrodes are positioned (especially releasably engaged) within the treatment chamber.

In one embodiment of the seventh aspect, there is provided an electrochemical liquid treatment apparatus, the apparatus including a treatment chamber containing at least one inlet for entry of a liquid to be treated, and including at least one outlet for exit of electrochemically treated liquid, wherein the treatment chamber is configured to releasably engage with at least one electrode holder holding a plurality of electrodes for electrolytic treatment of the liquid, wherein said electrode holder includes a flow aligner for aligning the flow of the liquid between the electrodes, and wherein when the electrode holder is releasably engaged with the treatment chamber said flow aligner is positioned intermediate the at least one inlet and the electrodes.

In an eighth aspect, the present disclosure relates to an electrochemical liquid treatment apparatus, the apparatus including a treatment chamber including at least one inlet for entry of a liquid to be treated, and at least one outlet for exit of electrochemically treated liquid, and a plurality of electrodes positioned within the treatment chamber for electrochemical treatment of the liquid.

In one embodiment of the eighth aspect, the present disclosure relates to an electrochemical liquid treatment apparatus including:
- a treatment chamber containing at least one inlet for entry of a liquid to be treated, and including at least one outlet for exit of electrochemically treated liquid;
- a plurality of electrodes positioned within the treatment chamber for electrochemical treatment of the liquid; and
- a flow aligner for aligning the flow of the liquid between the electrodes, wherein the flow aligner is positioned intermediate the at least one inlet and the electrodes.

In a ninth aspect, the present disclosure relates to an electrochemical liquid treatment apparatus, the apparatus including a treatment chamber including at least one inlet for entry of a liquid to be treated, and at least one outlet for exit of electrochemically treated liquid, wherein the treatment chamber is configured to accommodate a plurality of electrodes. In one embodiment of the ninth aspect, the apparatus further includes a plurality of electrodes positioned within the treatment chamber for electrochemical treatment of the liquid. The plurality of electrodes may be removable from the treatment chamber.

In one embodiment of the second to ninth aspects of the present disclosure, the treatment chamber may include a plurality of inlets for entry of a liquid to be treated. The treatment chamber may further include a liquid disperser having a plurality of liquid passageways, wherein each said liquid passageway includes at least one inlet to the treatment chamber for entry of a liquid to be treated. Said liquid disperser may be for evenly dispersing the liquid to be treated relative to the electrodes in the treatment chamber, and may especially be a liquid manifold.

In one embodiment of the first and third to ninth aspects of the present disclosure, the plurality of electrodes includes at least one anode, at least one cathode and at least one electrical conductor, wherein said at least one electrical conductor is positioned intermediate said at least one cathode and said at least one anode.

In an embodiment of the first, second, and fourth to ninth aspects of the present disclosure, the plurality of electrodes positioned within the treatment chamber are angled from a vertical plane.

In an embodiment of the first to third and fifth to ninth aspects of the present disclosure, the apparatus includes at least a first and a second treatment chamber, wherein the apparatus is configured so that liquid from said at least one outlet of the first treatment chamber flows into said at least one inlet of the second treatment chamber.

In an embodiment of the first to fourth and seventh to ninth aspects of the present disclosure, the apparatus is adapted to provide at least one treatment agent in the treatment chamber during electrochemical treatment of a liquid. In another embodiment, the treatment chamber further includes at least one treatment inlet for entry of a treatment agent for assisting in the treatment of the liquid.

In an embodiment of the first to sixth, eighth and ninth aspects of the present disclosure, the treatment chamber is configured to engage (especially releasably engage) with at least one electrode holder holding a plurality of electrodes for electrochemical treatment of the liquid. In a further embodiment, the apparatus further includes the electrode holder holding the plurality of electrodes, wherein the electrode holder is engageable with the treatment chamber (especially such that the plurality of electrodes are positioned or releasably engaged within the treatment chamber).

Features of the first to ninth aspects of the disclosure may be as described further below.

Any of the features described herein can be combined in any combination with any one or more of the other features described herein within the scope of the invention.

In one embodiment of the first to ninth aspects of the disclosure, the electrochemical treatment apparatus is an electrolytic treatment apparatus.

The apparatus may be adapted for electrocoagulation of a liquid or for performing electrochemical reactions on the liquid or contaminants within the liquid. The electrochemical reactions may change the state of specific components within the liquid (for example by reductive or oxidative processes). Any suitable liquid may be used in the apparatus, but the liquid especially may be an aqueous solution. The aqueous solution may be a suspension or colloid, and especially may be water (including wastewater). Without wishing to be bound by theory, it is believed that the electrochemical treatment may produce hydroxyl and/or sulfate radicals at the anode(s), and these may more effectively oxidise some contaminants (especially refractory organic contaminants) whilst sulfate radicals to a greater extent ameliorate the inhibitory effect of chloride ion on this oxidative process.

In one embodiment, the liquid is industrial wastewater (including food and beverage manufacturing residues), agricultural wastewater (including wastewater from agricultural properties, such as from dairy operations and animal husbandry operations (e.g. wash-down water from milking sheds or animal lice dips)) or wastewater resulting from mining, oil or gas activities (including drainage arising from mining activities such as so-called acid mine drainage (AMD) (where the drainage contains heavy metals, sulfurous and sulfuric acids, suspended solids or other environmental pollutants); or wastewater from dewatering, hydraulic fracturing, flooding or other reworking or completion operations, known to those skilled in the art, for any oil or gas deposit (including coal seam, shale oil, 'tight' and unconventional gas)).

The aqueous solution may be brine (especially concentrated brine from a reverse osmosis (RO) system or dilute brine prior to the RO or other membrane filtration process) or an aqueous oil solution (including in the form of a suspension or emulsion) or the liquid may be a liquid including a cation or anion, especially including a metal ion (such as $Fe^{2+}$), a sulfate, a chloride, a hydroxide, a nitrate, a bicarbonate or a carbonate.

The liquid to be treated may include contaminants for removal. The contaminants may be selected from one or more of the group consisting of: metals (including transition and heavy metals), salts, solids, pathogens (including bacteria, protozoa, viruses and other organisms including algae), amphoteric species, colloids (organic and inorganic), suspended solids, organic or inorganic chemicals (including surfactants, biocides, cross-linkers or breakers) and oils or other hydrocarbons (such as in droplet and emulsified forms) and various other undesirable substances. The contaminants may include one or more of a refractory organic, a cation or an anion (especially a sulfate, a chloride, a hydroxide, a nitrate, a bicarbonate, or a carbonate). The liquid may include one or more of oil wastes, dyes, suspended particulates, chemicals, and organic matter from various industrial processes and effluents. The apparatus may be used (or be configured) to remove, immobilise, oxidise or reduce contaminants in or from the liquid. The contaminants are typically removed from the liquid in the form of flocculated particles or floc.

The apparatus may be used with a liquid of any suitable electrical conductivity. For example, when the liquid is an aqueous solution, the solution may be saline; especially saline with low, moderate or high electrical conductivity; more especially saline with relatively high electrical conductivity. In other embodiments, the liquid may be brackish with only moderate conductivity or may be predominantly fresh with low electrical conductivity. Liquids with moderate to high levels of total dissolved solids (TDS) generally respond well to treatment and the number and hence surface area of electrodes required is typically a function of the TDS.

The apparatus includes a treatment chamber (or a treatment vessel which defines a treatment chamber). The treatment chamber may be of any suitable size. In one embodiment, the treatment chamber is a large industrial unit. For example, the treatment chamber may accommodate from 60 kL to 1,000 kL of liquid; especially from 80 kL to 750 kL or from 100 kL to 600 kL; more especially from 125 kL to 500 kL or from 180 kL to 400 kL; most especially from 200 kL to 300 kL or about 250 kL of liquid.

The treatment chamber in another embodiment is portable. For example, the treatment chamber may accommodate less than 50 kL, 40 kL, 30 kL, 20 kL, 10 kL, 1 kL, 900 L, 800 L, 700 L, 600 L, 500 L, 400 L, 300 L, 200 L, 100 L, 80 L, 60 L, 40 L, 20 L or 10 L liquid. In another example the treatment chamber may accommodate greater than 40 kL, 30 kL, 20 kL, 10 kL, 1 kL, 900 L, 800 L, 700 L, 600 L, 500 L, 400 L, 300 L, 200 L, 100 L, 80 L, 60 L, 40 L, 20 L 10 L or 5 L liquid. In a further example, the treatment chamber may accommodate a range in which the upper and lower limits are as previously described.

Any suitable flow rate of liquid may flow through the at least one inlet, and thereby the treatment chamber. The optimal flow rate will depend on the size of the apparatus, the capacity of the treatment chamber and electrical conductivity (EC) of the liquid, which is typically a function of the total dissolved solids (TDS). The apparatus may be configured for a liquid flow rate of at least 500 mL/s; especially at least 1, 3, 5, 7, 10 or 13 L/s; more especially at least 15, 18 or 20 L/s; most especially about 23 L/s. In another embodiment, the apparatus is configured for a liquid flow rate of less than 100 L/s; especially less than 90, 80, 70, 60, 50 or 40 L/s; more especially less than 30 L/s; most especially about 23 L/s.

The residence time of the liquid within the treatment chamber may be controlled or varied, depending on the size of the treatment chamber, the surface area of electrodes and/or the flow rate of the liquid. This may achieve, for example, improved performance in either coagulation, REDOX reactions or emulsion breaking. In some embodiments, the residence time is less than 10 minutes in the treatment chamber, especially less than 9, 8, 7, 6, 5, 4, 3, 2 or 1 minute in the treatment chamber, more especially about 30 seconds in the treatment chamber. In other embodiments, the residence time is from 5 seconds to 5 minutes in the treatment chamber, especially from 10 seconds to 2 minutes in the treatment chamber, more especially from 20 to 55 seconds in the treatment chamber, most especially from 30-45 seconds in the treatment chamber.

The treatment chamber may be configured for use at atmospheric pressure. The treatment chamber may be configured for use at greater than atmospheric pressure, for example at from greater than 1 atmosphere to 10, 9, 8, 7, 6, 5, 4, 3 or 2 atmospheres (especially from 1-3 atmospheres). Pressures of greater than atmospheric pressure may be used to accelerate a reaction within the treatment chamber. The treatment chamber may be configured for use at less than atmospheric pressure, for example at from less than 1 atmosphere to 0.1, 0.2, 0.3, 0.4, 0.5, 0.6, 0.7, 0.8 or 0.9 atmospheres. Pressures of less than one atmosphere may be beneficial for the removal of dissolved gases (such as bicarbonate or carbonate), thereby limiting, by way of example, the electrode passivating effects of dissolved carbon dioxide. Gases may also be removed from the treatment chamber by use of a membrane system within the treatment chamber which operates at such reduced pressure so as to preferentially degas the liquid being treated.

The treatment chamber may be made of any suitable material. In one embodiment, the treatment chamber may be made of a polymer such as a polymer plastic (examples include high density polyethylene (HDPE), acrylonitrile butadiene styrene (ABS), polyvinyl chloride (PVC), polyethylene terephthalate (PET), a phenolic polymer plastic, polypropylene or polyethylene (PE)); a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix; a rubber; a metal such as steel, steel alloy, aluminium, or stainless steel (especially a metal insulated using a polymer plastic or composite material); a carbon fibre insulated using a polymer plastic or a composite material; or an insulating plastic (such as a phenolic insulating plastic) bonded (especially thermally) to a substrate such as a metal, concrete or compressed fibre-cement sheet. The treatment chamber may be machine finished. The treatment chamber may be partially or completely transparent (for example, the treatment chamber may be made of glass or a transparent plastic). A transparent treatment chamber may be advantageous for use with some treatment enhancers, such as UV light).

In one embodiment, the treatment chamber is configured so that the plurality of electrodes are positioned (or configured to be positioned) intermediate the at least one inlet and at least one outlet. In this embodiment liquid may enter the treatment chamber via the at least one inlet, pass between the plurality of electrodes, and then exit the treatment chamber via the at least one outlet. In a first example, the treatment chamber is configured so that the liquid flows substantially vertically through the treatment chamber. In this example, the at least one inlet may be positioned at the lower portion of the treatment chamber; and the at least one outlet may be positioned at the upper portion of the treatment chamber (i.e. the liquid substantially ascends through the chamber). Alternatively, the at least one inlet may be positioned at the upper portion of the treatment chamber; and the at least one outlet may be positioned at the lower portion of the treatment chamber (i.e. the liquid substantially descends through the chamber). In a second example, the treatment chamber is configured so that the liquid flows substantially horizontally through the treatment chamber. In this example the at least one inlet may be positioned at or adjacent to one side wall of the treatment chamber, and the at least one outlet may be positioned at or adjacent to an opposite side wall of the treatment chamber. In a third example, the treatment chamber is configured so that the liquid flows obliquely through the treatment chamber.

The treatment chamber may be a plurality of treatment chambers arranged in parallel. It may be advantageous to use a plurality of parallel treatment chambers in order to increase the external surface area of the treatment chamber during the electrochemical treatment. This may allow for greater exposure to, or penetration of, treatment enhancers (such as ultraviolet light, microwaves or ultrasonic waves (or ultrasonics)) during the electrochemical treatment.

The treatment chamber may be of any suitable shape or dimensions. The treatment chamber may have a square, circular, ovoid, elliptical, polygonal or rectangular cross-section. In one embodiment, the treatment chamber has a first wall, and one or more side walls. The first wall may include or be adjacent to the at least one inlet. The first wall may be distal to the electrodes and proximate to the at least one inlet. In this embodiment, the treatment chamber may include a second wall opposite to the first wall. The second wall may be distal to the electrodes and proximate to the at least one outlet. The second wall may be removable (such as if the second wall forms the lid of the chamber). The second wall may include or be adjacent to the at least one outlet. A side wall may also include or be adjacent to the at least one outlet. In another embodiment, the treatment chamber may include a base (first wall), a top or lid (second wall), and one or more side walls (especially if the treatment chamber is configured so that the liquid flows substantially vertically through the treatment chamber). It may be advantageous for the treatment chamber to include a lid so that pressure in the treatment chamber may accumulate as the electrochemical treatment progresses. If the liquid flows substantially vertically through the treatment chamber, then the at least one outlet may be positioned in the upper portion of the treatment chamber, and the at least one inlet may be positioned in the lower portion of the treatment chamber. A wall or panel of the treatment chamber may be at least partially removed or opened. In one embodiment, the treatment chamber may be cylindrical, especially a pipe.

The one or more side walls may be planar, circular or ovoid. The second wall may include a vent or gas outlet for gases which evolve during the electrochemical process.

The inner surface of the first wall may be planar. The inner surface of the first wall may also be configured to direct the flow of liquid towards the electrodes. The inner surface of the first wall may include at least one (especially one) trough or channel which narrows to its base. The trough or channel may be substantially V-shaped. The trough or channel may be for directing the flow of water towards the electrodes. The first wall (especially the trough or channel) may include the at least one inlet, or the at least one inlet may be located within the trough or channel.

The apparatus may include any suitable number of treatment chambers (and optionally any number of defoaming chambers). In one embodiment, the apparatus includes at least a first and a second treatment chamber (each of which may be as herein described), wherein the apparatus is configured so that liquid from said at least one outlet of the first treatment chamber flows into at least one inlet of the second treatment chamber. In another embodiment, the apparatus includes at least a first and a second treatment chamber and a first and a second defoaming chamber (each of these may be as described herein), wherein the apparatus is configured so that liquid passes through the first treatment chamber, the first defoaming chamber, the second treatment chamber and the second defoaming chamber; especially wherein the liquid passes sequentially through the aforementioned chambers.

In one embodiment, the at least one inlet is a plurality of inlets. The treatment chamber may include at least 10 inlets, especially at least 15 inlets, more especially at least 20 inlets and most especially at least 30 inlets. The plurality of inlets may be for dispersing the liquid to be treated into the treatment chamber, especially for evenly dispersing the liquid to be treated throughout the treatment chamber.

Advantageously, by using a plurality of inlets the liquid may evenly enter the treatment chamber. This may improve even, or so-called laminar, fluid flow throughout the treatment chamber and said flow may maximise uniform and efficient contact between the electrodes positioned within the treatment chamber and the liquid being treated. Without wishing to be bound by theory, the benefits of encouraging such laminar or uniform flow may include some or all of reduced electrode and power consumption, improved transfer of electrical charge to the liquid to be treated, improved oxidation of impurities by short-lived free radicals (particularly refractory organic contaminants) and reduced electrode passivation.

The liquid may be dispersed into the treatment chamber by way of at least one liquid disperser, especially one liquid disperser. The liquid disperser may be separate to, or integral with, the first wall. The disperser may include a plurality of liquid inlets into the treatment chamber (these would be outlets from the disperser). In one embodiment, the treatment chamber includes a liquid disperser for dispersing the liquid to be treated into the treatment chamber, wherein said liquid disperser includes a plurality of inlets within the treatment chamber for entry of a liquid to be treated. Any suitable type of liquid disperser may be used.

In a first example, the disperser is a tube, especially a tube perforated along its length to provide a plurality of inlets into the treatment chamber. The tube may be of circular, ovoid, square, rectangular or triangular cross section. The tube may be perforated on all sides, or on all sides except for a side opposite to the electrodes. Advantageously, the disperser in this embodiment may be positioned within the at least one (especially one) trough or channel which narrows to its base in the first wall. If the first wall includes multiple troughs or channels, then a disperser may be positioned within each trough or channel. In one embodiment, the treatment chamber includes at least one liquid disperser for dispersing the liquid to be treated into the treatment chamber, wherein said liquid disperser includes a plurality of inlets within the treatment chamber for entry of a liquid to be treated, and wherein within each said at least one channel is positioned one said liquid disperser.

In a second example, the disperser includes a plurality of liquid passageways, wherein each said liquid passageway includes at least one inlet to the treatment chamber for entry of a liquid to be treated. The disperser in this example may be a manifold. Said plurality of liquid passageways may include at least one longitudinal liquid passageway and/or at least one transverse liquid passageway. Said passageways may be in fluid communication with each other. For example, the disperser may include at least one liquid entry point, at least one longitudinal liquid passageway and/or at least one transverse liquid passageway. At least one or each of the liquid passageways may include at least one and preferably a plurality of inlets to the treatment chamber. The liquid passageways may be arranged in any suitable way. Advantageously, computational fluid dynamic (CFD) modelling may be used to provide for laminar flow across the surface of the electrodes within the treatment chamber. Typically, the at least one transverse liquid passageway may be in liquid communication with the at least one longitudinal liquid passageway. The at least one liquid entry point may be in liquid communication with or abut either the at least one longitudinal liquid passageway, or the at least one transverse liquid passageway. The at least one longitudinal liquid passageway may be in fluid communication with, and extend from (especially at from 30 to 150 degrees to; more especially at from 60 to 120 degrees to; most especially at about 90 degrees to) the at least one transverse liquid passageway. The inlets to the treatment chamber may be provided by the outlets of the liquid disperser. In the second example, the disperser (especially manifold) may include at least one longitudinal liquid passageway in fluid communication with at least one transverse liquid passageway, wherein the at least one longitudinal liquid passageway and/or the at least one transverse liquid passageway include at least one inlet to the treatment chamber for entry of a liquid to be treated. The at least one inlet and/or disperser may be positioned beneath the plurality of electrodes (if the liquid substantially ascends as is passes through the treatment chamber).

The disperser may include a diffuser for evenly distributing the liquid exiting the disperser. However, depending on the results of the aforementioned CFD modelling or other factors, the diffuser may not be necessary.

The disperser may be made of any suitable material. In one embodiment, the disperser may be made of the same types of materials as previously described for the treatment chamber. In one embodiment, the disperser is made from welded polypropylene or polyethylene, polyester or epoxy resin fibreglass, a polymer, rubber, or cast or extruded components based on polymer plastic materials.

The apparatus may include a pretreater positioned prior to, and in fluid communication with the at least one inlet. The pretreater may be a filter to remove larger particulate solids from the fluid stream that could lodge between the electrodes and disrupt liquid flows or otherwise impede with the functioning of the device.

The apparatus may further include a flow aligner (or flow distributor) for aligning the flow of the liquid between the electrodes. The flow aligner may also be for distributing the liquid between the electrodes. The flow aligner may be positionable between the at least one inlet and the electrodes. A flow aligner may be advantageous as the liquid between the electrodes and the at least one inlet (or if the liquid substantially ascends through the treatment chamber, beneath the electrodes) may especially be turbulent. The flow aligner may assist the liquid in moving substantially or uniformly along the same longitudinal axis as the plurality of electrodes, which in turn may improve the contact time and hence electrochemical reaction between the liquid to be treated and the electrodes.

In a first example, the flow aligner may be in the form of at least one (especially a plurality of) baffles or baffle walls extending beneath the electrodes (or between the electrodes and the at least one inlet). The at least one baffle or baffle wall may extend substantially vertically beneath the electrodes (or in a plane perpendicular to the first wall of the treatment chamber). The at least one baffle or baffle wall may extend along substantially the same longitudinal axis as the electrodes. The at least one baffle or baffle wall may be positioned transversely or substantially perpendicularly to the electrodes. The flow aligner may integrally formed with the treatment chamber, or may be removable and/or replaceable. Each baffle or baffle wall may be in the form of a plate. Each baffle or baffle wall may be from 20 mm to 500 mm long, especially from 50 mm to 250 mm long or from 60 mm to 150 mm long, more especially from 80 mm to 120 mm long, most especially about 100 mm long.

In a second example, the flow aligner may be a partition (or wall or barrier) (especially a removable partition) defining a plurality of apertures for passage of the liquid. The apertures defined by the removable partition may be consistently spaced and sized so that liquid flows evenly through the partition. The flow aligner may extend between the side walls of the treatment chamber. The apparatus may be configured so that when in use, the liquid pressure on the side of the partition proximate to the at least one inlet is greater than the liquid pressure on the side of the partition proximate to the electrodes. In one embodiment, the wall or partition is configured to provide a greater liquid pressure on the side of the wall or partition proximate to the at least one inlet than on the side of the wall or partition proximate to the electrodes when the apparatus is in use. Advantageously, this may assist the even, uniform or laminar flow of liquid between the electrodes. In an alternative embodiment, the treatment chamber may have only one inlet. In this embodiment the volume of liquid beneath the flow aligner may be sufficiently large so that turbulence in the liquid is ameliorated after the liquid passes through the flow aligner. Depending on a range of fluid, electrode and cell design parameters, such further design refinement could be influenced or determined by the CFD modelling as described above.

In the second example, the flow aligner (or removable partition or wall) may be in the form of a plurality of segments, such that any one segment may be removed independently of the others. Each said segment may abut the adjoining segment, or each said segment may be in close proximity with the adjoining segment. In one embodiment, the apparatus includes a plurality of electrode holders and each said electrode holder includes a segment of the flow aligner. The flow aligner may be in the form of at least one plate (or panel) (especially a plurality of plates), wherein each said plate defines a plurality of apertures for passage of the liquid. The flow aligner may define a plurality of apertures each having a polygonal (especially hexagonal), circular or ovoid shape.

The combination of a disperser and a flow aligner (especially a disperser in the form of a perforated tube positioned within a trough or channel in the first wall, and a flow aligner in the form of a partition (or wall) defining a plurality of apertures for passage of the liquid) may promote the even, uniform or laminar flow of liquid between the electrodes, to thereby maximise the transfer of electrical charge and the efficiency of the electrochemical reaction. In this way, so-called "deadspots" in the flow of liquid through the reaction chamber can be minimised.

The flow aligner may be made of any suitable material, but especially may be made of a non-conductive material. The flow aligner may be made of the materials discussed above for the treatment chamber. The flow aligner may be especially made from a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix; a polymer plastic such as high density polyethylene (HDPE), polyethylene (PE), polyethylene terephthalate (PET), polyvinyl chloride (PVC); a phenolic polymer plastic; or be fabricated from a number of composite materials including carbon fibre (for example a carbon fibre insulated using a polymer plastic or a composite material) and variations thereof.

The inventors have performed computational fluid flow simulations on various treatment chamber configurations. The inventors have also studied fluid flow and pH variations within the treatment chamber during electrochemical treatments using pH sensitive indicators, and by inclusion of synthetic resin beads (of size less than 0.5 mm) in the fluid flow within the treatment chamber. These techniques were used to identify preferential channelling of the fluid flow. Advantageously, the inventors have found that inclusion of a flow aligner intermediate the at least one inlet and the electrodes, especially a flow aligner in the form of a partition defining a plurality of apertures provides decreased preferential channelling of the fluid flow, and increased uniformity of the fluid flow through the treatment chamber.

The apparatus may be configured to electrochemically treat the liquid in the presence of at least one treatment enhancer or at least one treatment agent.

As used herein, the term "treatment enhancer" refers to matter or energy (including radiation, sound or photons) that is capable of penetrating a solid wall of the treatment chamber to enhance reactions within the treatment chamber. Exemplary treatment enhancers include electromagnetic radiation and sonic waves. Electromagnetic radiation may include one or more of radiowaves, microwaves, infrared radiation, visible light, ultraviolet radiation (including ultraviolet-C light), X-rays and gamma rays. Sonic waves may include ultrasonic, infrasonic and audible waves. In one embodiment, the treatment enhancer may be a microwave or ultraviolet radiation, or ultrasonic sound waves. The treatment enhancer may accelerate or modify reactions in the treatment chamber (especially reactions involving contaminants) during the electrochemical treatment. The treatment enhancer may also reduce passivating accumulations on the electrodes (especially the cathodes; sonic waves may be suitable for this purpose, especially ultrasonic waves).

The at least one treatment agent may be a fluid (including a gas or a liquid) or a solid. The at least one treatment agent may be a plurality of treatment agents. The at least one treatment agent may assist in the treatment of the liquid. The at least one treatment agent may act as a reactant or a catalyst during the electrochemical treatment, or it may modify or adjust the properties of the reactants, the liquid (solvent) or the products of the electrochemical treatment, or it may be inert during the electrochemical treatment. The at least one treatment agent may be used to form a reactant or catalyst in situ during the electrochemical treatment. Each said at least one treatment agent may also perform multiple functions. For the avoidance of doubt, the term "treatment agent" does not include chemicals produced in the course of an electrochemical treatment (such as hydrogen gas, metal ions generated by a sacrificial anode, and hydroxyl ions and hydroxyl radicals produced at the cathode); the term "treatment agent" refers to chemical matter deliberately added to the liquid to be treated by an operator during, prior to or after the electrochemical treatment. Electrodes per se, for example, are not treatment agents, although an electrode may be doped with a treatment agent so that the treatment agent is released, or acts as a catalyst, during the electrochemical treatment as the anode corrodes.

The at least one treatment agent may be an oxidant, reductant or catalyst. The at least one treatment agent may form an oxidant, reductant or catalyst in situ in the treatment chamber during the electrochemical treatment. The at least one treatment agent may be selected from the group consisting of: an oxidant, a reductant, a homogenous or heterogeneous catalyst, a pH modifier (an acidifier (or acid) or a basifier (or base/alkali)), a surfactant, a defoaming agent, a conductivity modifier (for modifying the conductivity of the liquid to be treated), a chelant (for chelating with metal ions in the liquid), a viscosity modifier (for modifying the viscosity of the liquid or the floc), a ligand (for forming a catalyst), and a buoyant gas (which may advantageously improve or increase the liquid flow velocity between the electrodes and/or improve the reaction of components within this liquid).

Exemplary oxidants may include permanganate (such as potassium permanganate), hydrogen peroxide, an inorganic peroxide, a peroxysulfates, a disulfate, a peracid (such as an organic or inorganic peracid—an exemplary example is meta-chloroperoxybenzoic acid), oxygen gas, ozone, a halogen gas (such as fluorine or chlorine), nitric acid, sulfuric acid, a chlorite, a chlorate, a perchlorate, hypochlorite, and salts of the aforementioned oxidants. Exemplary reductants may include carbon monoxide, iron (II) compounds, hydrogen sulfide, disulfide, formic acid, sulfite compounds, boron reducing agents and hydrogen gas. Other oxidants and reductants would be known to a skilled person. The oxidant or reductant may assist in the electrochemical (or electrolytic) conversion of contaminants (especially to enable removal or recovery of the contaminants). The oxidant may assist in enhanced oxidative processes (EOP), such as for refractory contaminants.

Advantageously, the presence of an oxidant or reductant within the treatment chamber may encourage or facilitate the further electrochemical reactions of reduction or oxidation or may result in enhanced oxidation processes or enhanced reduction processes within the reaction chamber. In one example, the liquid to be treated may be refined during the electrochemical (or electrolytic) treatment by oxidative or reductive reactions in which the physical or chemical properties of contaminants in the liquid are altered by electrochemical processes, especially electrocoagulation processes.

The at least one treatment agent may be for reaction with certain contaminants in the liquid to be treated, may be used to adjust the properties of the liquid being treated (for example to adjust the pH of the liquid), or may be for adjusting the properties of the floc (for example the agglomeration, viscosity, flowability or settling velocity of the floc).

The at least one treatment agent may be a gas (which may be inert, an oxidant or a reductant, for example). The gas may be selected from one or more of the group consisting of: air, hydrogen, oxygen, ozone, carbon monoxide, carbon dioxide, sulphur dioxide, hydrogen sulfide, nitrogen, chlorine, fluorine, chlorine dioxide, ammonia, or a combination thereof; especially hydrogen, hydrogen sulfide, ozone, chlorine, carbon monoxide, air, carbon dioxide, or a combination thereof; more especially air, carbon dioxide, hydrogen sulfide, ozone, hydrogen, carbon monoxide, or a combination thereof. A plurality of treatment agents may enter the treatment chamber, such as an inert gas and an oxidant or reductant.

A said at least one treatment agent may be added to the liquid after the chemical treatment (either before or after the liquid exits the treatment chamber). For example, if the liquid provided after the electrochemical treatment is transferred to a tank (such as a clarification tank) a said at least one treatment agent may be added to encourage the separation (typically by gravity settling) of floc.

The apparatus may be adapted to provide at least one treatment agent in the treatment chamber during electrochemical (or electrolytic) treatment of the liquid. The at least one treatment agent may be provided within the treatment chamber in any suitable way.

In a first example, a said at least one treatment agent may be mixed with the liquid to be treated before the liquid enters the treatment chamber. The apparatus may include a mixer in fluid communication with the at least one inlet for a liquid to be treated, wherein the mixer is for mixing at least one treatment agent (which may be a liquid, gas or solid) with the liquid to be treated, before the liquid to be treated passes through the at least one inlet. Alternatively, the treatment agent may be provided on a liquid conduit to the treatment chamber, such as a pipe or manifold for transferring the liquid to be treated to the treatment chamber.

In a second example, a said at least one treatment agent may be provided on a surface within the treatment chamber. For example, a catalyst may be provided on an inner side wall of the treatment chamber, on the walls at which the electrodes are held (e.g. on an electrode holder), or within at least one of the electrodes (such as via a doped-electrode), in which the treatment agent may be chemically alloyed within or physically attached, laminated or layered to the electrode materials. Said treatment agent may be released from the doped electrode when the electrode functions as an anode (at which time the anode releases metal ions into the liquid)). An exemplary doped electrode is a cerium doped electrode, although several other rare earth or precious metals when coated onto inert electrodes such as titanium, will be known to those skilled in the art.

In a third example, a said at least one treatment agent may be provided following electrochemical treatment.

In a fourth example, a said at least one treatment agent may enter the treatment chamber through at least one treatment inlet. The treatment chamber may include at least one treatment inlet (or a plurality of treatment inlets, especially in fluid communication with each other) for each or each mixture of treatment agents. The treatment chamber may include at least 10 treatment inlets, especially at least 15 inlets, more especially at least 20 inlets, and most especially at least 30 inlets.

The at least one treatment inlet may be at least one fluid treatment inlet (the fluid may include gases and liquids, and for example, liquids including suspended solids). The at least one fluid treatment inlet may be in the form of a fluid treatment disperser. The at least one fluid treatment inlet may be at least one liquid treatment inlet. The at least one liquid treatment inlet may be in the form of a liquid treatment disperser. The liquid treatment disperser may be as described above for the liquid disperser.

The at least one treatment inlet may be an inlet for a gas treatment agent (i.e. a gas inlet). The treatment chamber may further include a gas treatment disperser having a plurality of gas inlets to the treatment chamber. Said gas treatment disperser may be for evenly dispersing the gas relative to the electrodes in the treatment chamber, and may especially be a gas manifold.

The gas disperser may include a plurality of gas passageways, wherein each said gas passageway includes at least one inlet for entry of a gas. Said plurality of gas passageways may include at least one longitudinal gas passageway and/or at least one transverse gas passageway. Any suitable type of gas disperser may be used. For example, the gas disperser may include at least one gas entry point, and at least one longitudinal gas passageway and/or at least one transverse gas passageway. Each of the gas passageways may include at least one and preferably a plurality of gas inlets. The gas passageways may be arranged in any suitable way. Typically, the at least one transverse gas passageway may be in gaseous communication with the at least one longitudinal gas passageway. The at least one gas entry point may be in gaseous communication with or abut either the at least one longitudinal gas passageway, or the at least one transverse gas passageway. The at least one longitudinal gas passageway may be in gaseous communication with, and extend from (especially at from 30 to 150 degrees to; more especially at from 60 to 120 degrees to; most especially at about 90 degrees to) the at least one transverse gas passageway. The at least one gas inlet to the treatment chamber may be provided by outlets of the gas disperser. The treatment chamber may include at least 20 gas inlets.

The at least one treatment inlet may be positioned at any suitable point or points in the treatment chamber. In one embodiment, the at least one treatment inlet is positioned between the electrodes and the first wall (especially between the flow aligner and the first wall). If the liquid substantially ascends as it passes through the treatment chamber, then the at least one treatment inlet may be positioned beneath the electrodes (especially so that the treatment agent substantially rises as it travels through the treatment chamber). In one embodiment, the at least one treatment inlet (including a fluid treatment disperser) is integral with the first wall (or base) of the treatment chamber. In another embodiment, the at least one treatment inlet (including a fluid treatment disperser) is removable from the treatment chamber.

The treatment chamber may include at least one treatment inlet (or a plurality of treatment inlets in fluid communication with each other) for each or each mixture of treatment agents. When the treatment chamber includes treatment inlets for different types of treatment agents (for example, a liquid treatment disperser and a gas disperser), these may be positioned relative to each other and to the at least one liquid inlet in any suitable way. For example, if the apparatus includes a liquid disperser and a gas disperser, the liquid disperser may be adjacent or proximate to the gas disperser (for example, the liquid disperser may be on top of, beneath, or beside the gas disperser). Similarly, if the apparatus includes a liquid treatment disperser and a liquid disperser, the liquid treatment disperser may be adjacent or proximate to the liquid disperser (for example, the liquid disperser may be on top of, beneath, or beside the liquid treatment disperser).

The at least one outlet for exit of electrochemically (or electrolytically) treated liquid may be located in any suitable position in the treatment chamber. However, the at least one outlet especially may be located such that the electrodes are positioned intermediate the at least one outlet and the at least one inlet. In one embodiment, the at least one outlet is located in or is positioned adjacent the second wall of the treatment chamber.

In a first example, the at least one outlet may include at least two outlets, especially two outlets. The at least two outlets may include at least one floc outlet for exit of floc, and at least one liquid outlet for exit of electrochemically treated liquid. This arrangement may be particularly advantageous when the liquid substantially ascends as it passes through the treatment chamber (i.e. so that the at least one outlet is positioned above the plurality of electrodes). The floc outlet may be positioned above the liquid outlet. For the avoidance of doubt, some liquid may exit the treatment chamber at the floc outlet with the floc, and some floc may exit the treatment chamber through the liquid outlet (although substantially all floc especially exits the treatment chamber through the floc outlet).

In this example, the liquid outlet may be positioned relative to the floc outlet in any suitable way. In one embodiment, the floc outlet is positioned above the liquid outlet. The liquid outlet may be in the form of an aperture or passageway extending from a side wall of the treatment chamber. The treatment chamber may include one, two, three, four or five liquid outlets. One or more valves may be associated with the liquid outlets so that each liquid outlet may be selectively closed or partially closed. Advantageously, this may allow adjustment of the liquid flow rate through the treatment chamber. The floc outlet may be a weir or spillway. The spillway may include a baffle (especially an adjustable baffle) which may form the lower lip of the spillway. The adjustable baffle may be raised or lowered to adjust the separation of the floc from the electrochemically treated liquid. The adjustable baffle may be a plate. The apparatus may include one, two, three or four floc outlets, especially on different sides of the treatment chamber. The floc outlet may be positioned at substantially the intended height of the liquid within the treatment chamber.

In a second example, the at least one outlet is one outlet. In this embodiment the floc may be separated from the treated liquid after the liquid exits the treatment chamber. For example, the apparatus may further include a vessel in fluid communication with the at least one outlet (a defoaming chamber, as discussed below, may be intermediate the at least one outlet and the vessel). Electrochemically treated liquid exiting the liquid outlet may flow to the vessel for separation of the floc from the liquid. In one embodiment, the vessel may be a clarifier for clarifying the liquid. The vessel may include at least one liquid outlet and at least one floc outlet. Features of the liquid outlet and the floc outlet may be as described in the preceding two paragraphs.

The apparatus may also include a floc mover for moving floc, especially on the surface of the liquid in the treatment chamber (or alternatively on the surface of the vessel in fluid communication with the at least one outlet). The floc mover may be configured for moving the floc towards the at least one floc outlet, and may assist in providing a horizontal flow for the liquid at the top of the treatment chamber (or at the top of the vessel). The floc mover may be a floc skimmer. The floc mover may be positioned substantially above or below the surface of the liquid in the treatment chamber.

The floc mover may include at least one floc driver for driving the floc towards the at least one floc outlet, and especially a plurality of floc drivers (these may be in the form of a paddle or projection). The at least one floc driver may be mounted to or mounted relative to a belt, strap, chain or cable. The belt, strap, chain or cable may be turned by a belt drive. The belt drive may be partly flexible. The belt drive may include at least one wheel, especially at least two wheels, more especially two wheels. The at least one wheel may include teeth, and may be in the form of a cog or sprocket.

A separator may be in fluid communication with the floc outlet to separate floc from the liquid. The separated floc may be disposed of, further treated, or otherwise used. The separated liquid may be combined with the liquid exiting the treatment chamber (or vessel) via the liquid outlet; returned to the treatment chamber for further treatment; or diverted elsewhere (for example by the use of a float or sensor actuated submersible sludge pump) for further treatment, or release to the environment.

The separator may be in the form of a filter. In one embodiment, the filter may be a filtration bag, especially a filtration bag made of a polymeric material, more especially a filtration bag having woven polymeric fibres which trap some or substantially all of the solids and permit the free flow of separated liquid.

The apparatus may also include a defoamer. The defoamer may be for decreasing the volume of foam (or bubbles) after the electrochemical treatment. During electrochemical treatment foam is frequently generated from, for example, gas bubbles generated at the cathode. As these bubbles pass through the liquid they can generate foam which can be difficult to manage and can cause overflowing in liquids high in organic compounds (such as carrageenan, xanthate or guar derived vegetable gums). The defoamer may include one or more nozzles for spraying liquid onto the foam. As the liquid is sprayed onto the foam, the liquid droplets pierce the foam, releasing the trapped gas and decreasing the foam volume. The nozzle may be adjustable to modify the velocity of the sprayed liquid and the size of the sprayed liquid droplets. Advantageously, the properties of the foam produced in the electrochemical treatment may vary depending on the composition of the liquid, and an adjustable nozzle may allow for effective defoaming for a variety of liquid types. For example, if guar gum is present in the liquid during electrochemical treatment then the foam created may have very elastic bubbles, which requires larger droplets and/or a higher velocity to penetrate. The apparatus may include one, or a plurality of defoamers. The nozzle may produce a jet, or produce a mist. The liquid sprayed by the nozzle may be electrochemically treated liquid from the treatment chamber. The defoamer may include a pump for pumping the liquid through the nozzles.

The defoamer may be positioned above the surface of the treatment chamber (or vessel) to defoam floc on the surface of the liquid. The defoamer may also be present in a defoaming chamber (the apparatus may include a defoaming chamber which includes a defoamer). In one embodiment, the apparatus may further include a defoaming chamber (or a defoaming vessel which defines a defoaming chamber). Liquid exiting the treatment chamber through the at least one outlet may flow to the defoaming chamber. The liquid exiting the treatment chamber may pass through the defoaming chamber to an outlet at the base of the defoaming chamber. One, or a plurality of defoamers may be positioned (especially vertically positioned) within the defoaming chamber to spray liquid on foam passing (or falling) through the chamber. The defoaming chamber may also include one or more (especially one or two) flow diverters. The flow diverters may be positioned within the defoaming chamber to divert the flow of liquid to thereby increase the liberation of gas from the liquid. The flow diverters may be a plate, especially a substantially vertically mounted plate within the defoaming chamber.

At least a first flow diverter may provide a weir inside the defoaming chamber. A second flow diverter may be positioned intermediate said first flow diverter and the inlet to the defoaming chamber (which may be the outlet of the treatment chamber). The second flow diverter may provide an underflow weir (under which the fluid passing through the defoaming chamber passes). The bottom of the second flow diverter may extend lower than the top of the first flow diverter. The first and/or second flow diverter may be substantially vertical. The first and/or second flow diverter may be a wall or plate. Advantageously, the first and second flow diverters may trap foam entering the defoaming chamber between the second flow diverter and the defoaming chamber inlet. Fluid entering the defoaming chamber may fall onto the trapped foam to assist in decomposing the foam.

The defoaming chamber may include an outlet for exit of defoamed liquid. Said defoaming chamber outlet may be located at the base of the defoaming chamber.

Advantageously, during an electrochemical treatment gases such as hydrogen may evolve at the electrodes, with the amount observed depending on the liquid composition. These gases have the potential to produce foams which (in the case of a treatment chamber without a lid) has the potential to overflow. Furthermore, if foam is present in the fluid introduced into a pump it can create difficulties due to the trapped gas within the foam (for example creating air locks). The use of a defoaming chamber may ameliorate these possibilities.

The plurality of electrodes may be selected from the group consisting of an anode, a cathode and an electrical conductor. In use, the apparatus includes at least one anode and at least one cathode. However, the electrodes may all be of similar structure and only become an anode, a cathode or an electrical conductor by virtue of the power connected to the electrode (or lack thereof in the case of an electrical conductor). Each said at least one electrical conductor may be positioned between at least one anode and at least one cathode.

The apparatus may include from 10 to 1000 electrodes; especially from 20 to 500 electrodes; more especially from 30 to 250 electrodes; most especially from 40 to 100 electrodes.

In one embodiment, from 2 to 12 electrodes in the apparatus are connected to a power source; especially from 2 to 10 or from 2 to 8 electrodes in the apparatus are connected to a power source; more especially from 2 to 6 or from 2 to 4 electrodes in the apparatus are connected to a power source; most especially three electrodes in the apparatus are connected to a power source. If three electrodes in the apparatus are connected to a power source, the two terminal electrodes (i.e. at each end of the plurality of electrodes) will have the same polarity (i.e. either an anode or a cathode) and an electrode intermediate the terminal electrodes (especially substantially equidistant between the terminal electrodes) will have the opposite polarity (i.e. either an anode or a cathode). The remaining electrodes in the plurality of electrodes will be electrical conductors. In one embodiment, the apparatus is configured so that from 5% to 25% of the electrodes in the apparatus are anodes or cathodes; especially from 8% to 20% of the electrodes in the apparatus are anodes or cathodes; more especially from 10% to 20% of the electrodes in the apparatus are anodes or cathodes or from 10% to 15% of the electrodes in the apparatus are anodes or cathodes. In another embodiment, the apparatus is configured so that from 0.5% to 25% of the electrodes in the apparatus are anodes or cathodes; especially from 0.5% to 15% of the electrodes in the apparatus are anodes or cathodes; more especially from 0.5% to 10% of the electrodes in the apparatus are anodes or cathodes or from 0.5% to 5% of the electrodes in the apparatus are anodes or cathodes. In one embodiment, about 2.5% of the electrodes in the apparatus are anodes or cathodes.

Each electrode, a set of electrodes, or the plurality of electrodes may be replaceable and/or removable. For example, the electrodes may be removable from the treatment chamber by means of an overhead gantry. The electrodes may be removed for temporary storage as a set (for example in horizontal racks above the unit), or can be replaced individually such as when an electrode loses its anodic potential through diminished surface area, for example by corrosion.

Each electrode may be of any suitable shape, although certain shapes facilitate easy removal from the treatment chamber. For example, each electrode may be curved or planar, especially planar. Each electrode may also be, for example, of square, rectangular, trapezoidal, rhomboid, or polygonal shape; especially of rectangular or square shape. Each electrode may also be of solid construction, or may include a plurality of apertures. Each electrode may be especially of solid construction. In one embodiment, each electrode is a plate. In another embodiment, a said electrode or a portion of the plurality of electrodes may be of circular, ovoid, or elliptical cross section. In this embodiment, the electrodes in the portion of the plurality of electrodes may be positioned so that one electrode is inside the adjacent electrode. For example, a portion of the plurality of electrodes may be concentrically positioned (especially when said electrodes are cylindrical in shape).

Each electrode may be made of any suitable material. Exemplary materials include aluminium, iron, steel, stainless steel, steel alloy (including mild carbon steel), magnesium, titanium and carbon. In another embodiment, each electrode may be made of an alloy of or containing a material selected from the group consisting of: aluminium, iron, steel, magnesium, titanium and carbon. Each electrode may be selected depending upon the liquid to be treated, the contaminants in the liquid, the floc to be created and the relative cost of the various metallic electrodes at the time. Each said electrode within the apparatus may be the same or different, and may include the same metal or different metals (for example depending on the desired performance). A said or each electrode may also include one or more treatment agents for release during the electrochemical treatment. A said or each electrode may also include one or more treatment agents to catalyse specific reactions, especially oxidative reactions, during the electrochemical treatment.

The electrodes may be positionable above or below the level of the liquid in the treatment chamber. However, the electrodes are especially positionable below the level of the liquid in the treatment chamber. If the liquid substantially ascends as it passes through the treatment chamber, this arrangement may advantageously not impede liquid or floc horizontal flow at the surface of the liquid.

The electrodes may be positionable within the reaction chamber at any suitable angle. For example, the electrodes or a portion of the electrodes (such as an upper portion) may be angled from a vertical plane (obliquely configured) or a plane perpendicular to the first wall of the treatment chamber. The electrodes may be positioned substantially vertically or at an angle of from 10 to 30 degrees from the vertical or a plane perpendicular to the first wall of the treatment chamber, especially at an angle of 10 to 15 degrees or about 15 degrees from the vertical or a plane perpendicular to the first wall of the treatment chamber. In one example, the electrodes or a portion of the electrodes (such as an upper portion or portion proximate to the at least one outlet) may be positioned at an angle of from 5 to 40 degrees from the vertical or a plane perpendicular to the first wall of the treatment chamber, especially from 5 to 35 degrees from the vertical or a plane perpendicular to the first wall of the treatment chamber, more especially from 10 to 30, 10 to 15 or 15 to 30 degrees from the vertical or a plane perpendicular to the first wall of the treatment chamber. In other examples, the electrodes or a portion of the electrodes (such as an upper portion or portion proximate to the at least one outlet) may be positioned at less than 40 degrees from the vertical or a plane perpendicular to the first wall of the treatment chamber, more especially less than 35, 30, 25, 20, 15, 10 or 5 degrees from the vertical or a plane perpendicular to the first wall of the treatment chamber. In further examples, the electrodes or a portion of the electrodes (such as an upper portion or portion proximate to the at least one outlet) may be positioned at greater than 5, 10, 15, 20, 25, 30 and 35 degrees from the vertical or a plane perpendicular to the first wall of the treatment chamber. In other embodiments, the electrodes may be substantially vertical (or in a vertical plane) or substantially in a plane perpendicular to the first wall of the treatment chamber. The inventors have found that different liquids react differently to different electrode angles. For the avoidance of doubt, as used herein if the first wall includes a trough or a channel then the phrase "a plane perpendicular to the first wall of the treatment chamber" refers to a plane perpendicular to the base of the trough or channel.

When the liquid substantially ascends through the treatment chamber, positioning the electrodes within the treatment chamber at an angle may result in a number of advantages. First, positioning the electrodes at an angle may mean that the liquid flows against the electrodes as it rises through the treatment chamber (also gases may travel against the electrode as the gas rises through the treatment chamber). This may assist, for example, in reductive processes within the treatment chamber or may assist in preventing build-up of material (such as floc) on the electrodes. This may be especially advantageous when the polarity of the electrode, particularly a cathode, can be reversed during the passage of a reductive gas along or over its surface.

Secondly, positioning the electrodes at an angle results in a horizontal movement being applied to the liquid as it travels through the treatment chamber. This can assist in directing the liquid through the at least one outlet, and especially floc through the floc outlet. In one example, the horizontal or essentially tangential movement applied to particles suspended or dispersed within the liquid forces any coagulated sediment or floc away from the treatment chamber thereby providing a clear disposal path for the floc from the treatment chamber.

Thirdly, positioning the electrodes at an angle may assist in agglomerating floc. For example, as liquid rises through the treatment chamber, the floc may flow against the electrodes. This means that floc is more concentrated against the electrodes which assist in further agglomeration. In an exemplary embodiment, if the floc includes oil particles, the rising oil particles may be coalesced into larger droplets as a result of partial entrainment by friction beneath the electrodes. This does not generally occur when the plates are in a vertical configuration, and in this exemplary embodiment the dissolved or emulsified oil particles in the liquid may contact the underside of the electrodes where they accumulate and combine with other forming oil particles at the charged interface until such time as a larger (coalesced) droplet forms which then floats to the surface aided by the predominantly diagonal and vertical (but tangential to the droplet) liquid flow.

Each electrode may be of any suitable thickness, for example from 1 mm to 20 mm thick, especially from 1 mm to 10 mm thick, more especially from 1 mm to 5 mm thick, most especially about 3 mm thick. In some embodiments, each electrode is less than 20 mm thick, especially less than 19, 18, 17, 16, 15, 14, 13, 12, 11, 10, 9, 8, 7, 6, 5, 4, 3 or 2 mm thick. In other embodiments, each electrode is greater than 0.5 mm thick, especially greater than 1, 2, 3, 4, 5, 6, 7, 8, 9, 10, 11, 12, 13, 14, 15, 16, 17, 18 or 19 mm thick. In a further embodiment, thickness of the electrode may be a range in which the upper and lower limits are as previously described. In one embodiment, the electrodes are from 1 mm to 10 mm thick, especially about 3 mm thick.

The electrodes may be spaced at any suitable distance. For example, the electrodes may be (especially on average) from 1 mm to 150 mm apart, especially from 1 mm to 100 mm apart or from 1 mm to 50 mm apart, more especially from 1 mm to 10 mm apart. The electrodes may be (especially on average) from 1 mm to 5 mm apart, or from 1.5 mm to 4.5 mm apart; more especially about 3 mm apart. In some embodiments, the electrodes are (especially on average) less than 150 mm apart, especially less than 140, 130, 120, 110, 100, 90, 80, 70, 60, 50, 40, 30, 25, 20, 15, 10, 9, 8, 7, 6, 5, 4 or 3 mm apart. In other embodiments, the electrodes are (especially on average) greater than 1, 2, 3, 4, 5, 6, 7, 8, 9, 10, 15, 20, 25, 30, 40, 50, 60, 70, 80, 90, 100, 110, 120, 130 or 150 mm apart. The electrodes may also be a range apart in which the upper and lower limits are as previously described. When the treatment chamber includes more than 2 electrodes, each electrode may be the same distance apart or different distances apart.

The electrodes may be held apart in any suitable way. For example, the treatment chamber may include guides for holding the electrodes in position. In one embodiment, the guides may be grooves or slots positioned in opposite walls of the treatment chamber. The guides may be made from a high-density, electrically insulating polymeric material, such as HDPE or PVC, or a material as discussed below for the electrode holder.

In one embodiment, the electrodes are from 1 mm to 10 mm thick, more especially from 1 mm to 5 mm thick; and the electrodes are from 1 mm to 10 mm apart, more especially from 1 mm to 5 mm apart. Using thinner electrodes positioned close together enables a greater number of electrodes to be positioned within the treatment chamber. This increases the surface area of the electrodes in contact with the liquid, which may enhance the electrochemical treatment of the liquid.

To improve fluid flow, the electrodes may have a tapered lower edge or edge proximate to the at least one inlet. The lower edge (or edge proximate to the at least one inlet) of the electrodes may be tapered to an angle of about 4, 5, 6, 7, 8, 9, 10, 11, 12, 13, 14, 15, 16, 17, 18, 19 or 20 degrees relative to the longitudinal axis of the electrode. The taper may extend less than 40%, 30%, 20%, 15%, 10%, 9%, 8%, 7%, 6%, 5%, 4% or 3% of the length of the electrode. The lower edge of the electrode or edge proximate to the at least one inlet may be tapered on one or more sides, such as two opposed longitudinal sides, more especially one longitudinal side. If the lower edge of the electrode or edge proximate to the at least one inlet is tapered on more than one side, then the taper on each side may be the same or different.

The apparatus may also include at least one non-conductive element positioned within the treatment chamber. The non-conductive element may alter the electrical field (amperage and voltage) within the treatment chamber. The position, shape and configuration of the non-conductive element may be as described above for the electrodes. However, the non-conductive element is made of a material that does not conduct electricity, such as, for example, a material selected from the group consisting of: a polymer plastic (such as polyvinyl chloride (PVC), high density polyethylene (HDPE), low density polyethylene (LDPE), acrylonitrile butadiene styrene (ABS), polypropylene (PP)); a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix, or a combination of the aforementioned materials. In one embodiment the apparatus does not include any non-conductive elements.

The apparatus may further include at least one electrode holder for holding a plurality of electrodes. The at least one electrode holder may be positionable within the treatment chamber. The treatment chamber may be configured to engage (especially releasably engage) with the at least one electrode holder. The treatment chamber may include at least one guide for guiding the electrode holder into position. The treatment chamber may include at least one (or a plurality of) grooves for slidable engagement of the electrode holder in the treatment chamber. The treatment chamber may include at least one power connector for connecting power to the electrode holder or to at least one electrode held by the electrode holder. The treatment chamber may include a plurality of power connectors (for example of the same or different polarity) for connecting power to each electrode holder or to electrodes held by the electrode holder.

The treatment chamber may include at least one power connector for connecting power to the electrode holder, to thereby power at least one of the electrodes held by the electrode holder. For each electrode holder, the treatment chamber may include at least one power connector for connecting power to at least one anode in the electrode holder (especially one or two power connectors) and at least one power connector for connecting power to at least one cathode (especially one or two power connectors) in the electrode holder.

In a first exemplary embodiment, the at least one power connector may be located on a wall of the treatment chamber (especially a side wall or the first wall), especially in a groove in which the electrode holder may be slideably engaged. Only one wall of the treatment chamber may include a power connector for each electrode holder. The at least one power connector may be made of a metal, especially bronze.

In a second exemplary embodiment, the treatment chamber includes at least one power connector that is adapted to contact the working face of at least one (for example one or two) electrodes. As used herein, the term "working face" refers to the surface of the electrode that contacts the liquid during the electrochemical treatment. In this embodiment, at least one (especially one or two) power connectors may be positioned adjacent one or more side walls of the treatment chamber, especially one or more side walls parallel to the working face of the electrodes. At least one power connector may be positioned between electrode holders in the treatment chamber. At least one power connector may be positioned intermediate two electrode holders, and the at least one power connector may be positioned intermediate to the working face of a terminal electrode of each electrode holder (in this case, one power connector may power one electrode in each electrode holder. In this case, the at least one power connector may be housed within a power connector housing located intermediate two electrode holders). In this embodiment, the at least one power connector may include a biasing mechanism for biasing the power connector against an electrode. The biasing mechanism may include a compression spring. The at least one power connector may be made of a metal, especially a resilient metal, such as steel, more especially stainless steel, most especially spring steel. Advantageously, the use of a biasing mechanism in the power connector may improve the contact between the electrode and the power connector, assist in holding the electrode holder in place, and avoid the need for screwed connectors when replacing electrode holders. In one embodiment, the power connector may traverse a wall of the treatment chamber (especially a side wall) to provide a tab for connection to a power source (possibly via the current controller, as described further below). The at least one power connector may have or include a corrugated shape.

The treatment chamber may be configured to releasably engage with from 1 to 100 electrode holders, especially from 2 to 50 electrode holders, more especially from 2 to 40, from 2 to 30, from 2 to 20, or from 2 to 10 electrode holders.

Each said electrode holder may include a frame, and the frame may include a handle and at least two side walls. The handles of the electrode holders, once placed in the treatment chamber, may form the lid of the treatment chamber. The electrode holder handles may sealingly abut each other in the treatment chamber. The frame may also include a flow aligner (or a segment of a flow aligner). In one embodiment, the flow aligner is a wall or partition defining a plurality of apertures for passage of the liquid, and wherein the treatment chamber includes a shelf upon which the electrode holder rests when the electrode holder is releasably engaged with the treatment chamber. The frame may be substantially U-shaped, with the base of the "U" forming the handle and the sides of the "U" forming the side walls. Alternatively, the frame may be of substantially square or rectangular-shaped, with two opposite side walls of the square/rectangle forming the side walls of the frame, and the other opposed sides forming a flow aligner and a handle. The electrode holder may be in the form of a cartridge. Accordingly, each said electrode holder (or at least one said electrode holder) may include a flow aligner, as described above. The flow aligner may be positioned between the electrodes and the at least one inlet. The electrode holder handle may include an electrode holder remover (such as a strap (or strap loop), especially a cable, string or thread) to assist in removing the electrode holder from the treatment chamber.

The electrode holder, especially the at least two side walls of the electrode holder may be configured to releasably engage with the treatment chamber. The electrode holder (especially the at least two side walls) may be slideably engageable with the treatment chamber. The electrode holder (especially the at least two side walls) may be releasably engageable in the treatment chamber by friction, by a clamp, or by another suitable fastener. In another embodiment, the treatment chamber may include a shelf upon which the electrode holder rests when in position.

In one embodiment, the treatment chamber or the electrode holder may include a clamp for releasably clamping the electrode holder in position. The electrode holder (especially at least one of the at least two side walls or the side of the holder proximate to the first wall of the treatment chamber) may be configured to accept power, especially from a wall of the treatment chamber. The electrode holder (especially at least one of the at least two side walls) may be configured to supply power along a longitudinal edge of at least one electrode held by the electrode holder. The treatment chamber may also be configured to provide power longitudinally along the working face of at least one electrode. Providing power along a longitudinal edge of at least one electrode, or longitudinally along the working face of at least one electrode, may provide superior flow of power than if power was only supplied to the at least one electrode at a single point.

The electrode holder may include a power connector for connecting with a power connector from the treatment chamber. If present, power connectors in the electrode holder and the treatment chamber may connect in any suitable way. For example, the two power connectors may connect by way of abutting surfaces or projections, or by way of a male-female connection.

The electrode holder may hold a plurality of electrodes. The electrodes within the electrode holder may be replaceable and/or removable. In one embodiment, the electrodes within the electrode holder may not be replaceable and/or removable. The electrode holder may include slots machined to enable the electrodes to slide in and out of the electrode holder as required. This may enable replacement of the electrodes within the electrode holder whilst the apparatus is in operation. The electrodes, properties of the electrodes, orientation of the electrodes, and the relationship between two electrodes (e.g. the distance between electrodes) in the electrode holder may be as described above. For the avoidance of doubt, the electrode holder may also include at least one non-conductive element. Therefore, the electrode holder may hold one or more electrodes and one or more non-conductive elements.

Any suitable number of electrodes may be held by the electrode holder. In one embodiment, the electrode holder may hold from 3 to 100 electrodes; especially from 3 to 50 electrodes; more especially from 3 to 25 electrodes; most especially from 5 to 15 electrodes or from 8 to 15 electrodes, about 10 electrodes or about 13 electrodes. In one embodiment, the electrode holder holds at least 3, 4, 5, 6, 7, 8, 9 or 10 electrodes. In another embodiment, the electrode holder holds less than 100, 90, 80, 70, 80, 70, 60, 50, 40, 30, 20 or 15 electrodes.

The electrode holder or the electrodes within the electrode holder may be positionable within the treatment chamber at any suitable angle. The orientation of the electrode holder may be as described above for the angle of electrodes within the treatment chamber.

In one embodiment, the electrode holder may be positionable substantially vertically within the treatment chamber. This may be particularly advantageous if the liquid substantially ascends through the treatment chamber. In this embodiment, the electrodes may be held substantially vertically by the electrode holder, or the electrodes may be held at an angle from the vertical by the electrode holder. In another embodiment, the electrode holder is positionable at an angle within the treatment chamber.

The electrodes within the electrode holder may be positionable in the same plane as the electrode holder, or the electrodes may be positionable at an angle relative to the longitudinal plane of the electrode holder. For example, the electrodes may be positionable at an angle of from 0-20 degrees from the longitudinal plane of the electrode holder, more especially from 0-15 degrees or from 0-10 degrees, most especially from 0-5 degrees or 0-3 degrees or 0 degrees from the longitudinal plane of the electrode holder.

The electrode holder advantageously may allow for the easy and rapid exchange of electrodes in the apparatus. The electrode holder may overcome the delays inherent in changing individual electrodes within the reaction chamber and may be particularly advantageous in areas of low head height.

The frame of the electrode holder may be made of any suitable material, but especially may be made of a non-conductive material. The frame of the electrode holder may be made of the materials discussed above for the treatment chamber. The frame of the electrode holder may be especially made from a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix; or a polymer plastic such as high density polyethylene (HDPE), polyethylene (PE), polyethylene terephthalate (PET) or polyvinyl chloride (PVC); a phenolic polymer plastic; or a carbon fibre insulated using a polymer plastic or a composite material.

The electrode holder may be removable from the treatment chamber by way of a removal device (especially a lifting device which lifts the electrode holder from the treatment chamber). In one example, the lifting device may lift the electrode holder substantially vertically before allowing for horizontal movement of the electrode holder above the apparatus. The lifting device may be slideably mounted on at least one (especially two) rails. In one embodiment, the electrode holder may be removable using an overhead gantry.

The apparatus may further include a liquid pump for pumping liquid to be treated through the at least one inlet for entry of a liquid to be treated, and/or at least one treatment agent pump (which may be a liquid pump and/or a gas pump) for pumping the treatment agent through the at least one treatment inlet. Said pump may be a variable speed pump. Any suitable pump may be used. For example, the gas pump may be an entrained air pump or a centrifugal, diaphragm, peristaltic, geared or similar pump. A liquid pump may or may not be necessary, depending on the pressure of the liquid delivered to the treatment chamber. However, a liquid pump, particularly a geared or diaphragm pump, may be advantageous as this may permit greater control over the liquid flow rates within the treatment chamber.

The apparatus may further include one or more sensors for sensing: flow velocity through the treatment chamber; volume of liquid in the treatment chamber (including the liquid height, especially when the liquid substantially ascends through the treatment chamber); formation of products in the treatment chamber or exiting the treatment chamber (including gases, especially explosive gases); presence of contaminants in the treatment chamber or exiting the treatment chamber; passivating accumulations on one or more electrodes; and the conductivity of the liquid in the treatment chamber.

In one embodiment, the apparatus includes a system for regulating the electrochemical treatment. The system may be automated and include one or more sensors as outlined in the preceding paragraph and one or more devices for regulating the electrochemical treatment, wherein the one or more devices are in communication with the one or more sensors to thereby automate the treatment. The system may be controlled by a controller (such as a programmable logic controller (PLC)). The one or more devices may include at least one selected from the group consisting of: a pump (especially a variable speed pump) for regulating the flow of liquid into the treatment chamber; a current controller for controlling the electrical current to the electrodes (especially for controlling the polarity of the current and its reversal to thereby provide cathodes and anodes, and/or the voltage of the current); treatment enhancer applicator for applying a treatment enhancer to the treatment chamber (for example, an electromagnetic radiation source or a sonic generator); a valve for draining the treatment chamber (and optionally a pump in fluid communication with the valve); a treatment agent applicator for applying one or more treatment agents to the treatment chamber (this may include a treatment agent pump); fluid jets (including liquid and gas jets) for reducing passivating accumulations on the electrodes (the fluid jets may be high-pressure fluid jets); an electrode holder remover and inserter; and an electrode plate remover and inserter.

As outlined above, the current controller may control the polarity of the current and its reversal to thereby provide cathodes and anodes. In one embodiment the polarity of the electrodes is reversed during the electrochemical treatment. Any suitable electrical current may be applied to the plurality of electrodes. The polarity of the electrodes may advantageously be alternated to thereby reduce passivating accumulations on the electrodes and create a reversible electrical field within the treatment chamber. The polarity switching of the electrodes may allow specific chemical reactions to be delayed or accelerated as required. During the electrochemical treatment the anodes typically are sacrificial and gradually reduce in size. In contrast the cathodes typically undergo passivation and accumulate matter on their surfaces. By regularly reversing the polarity of the current flowing to the electrodes the same electrode will successively function as a cathode and an anode. In this way the passivating surface of the cathode becomes the eroding surface of the anode, which reduces passivating accumulations on the electrode and slows the reduction in size of the electrode. In one embodiment, the current source applied to the apparatus is direct current, but due to the alternating polarity of the current by the current controller, the current applied to the electrodes is alternating current. In other words, the current applied to the plurality of electrodes may be a direct current of adjustable frequency of alternation. The current controller may also modify the sinewave ramping angles during the electrochemical treatment, and/or modify the rate of current application to the electrodes during the electrochemical treatment.

Accordingly, the current controller may control the frequency of current reversal to the electrodes. The current controller may also control the relative proportion of cathodes and anodes in the electrochemical apparatus. Control of the relative proportion and hence surface area of cathodes and anodes may be advantageous, as this will alter the chemistry of the electrochemical treatment. For example, if the total surface area of the anodes exceeds (especially by a significant degree) the surface area of the cathodes then an oxidising environment is created within the treatment chamber. Alternatively, if the total surface area of the cathodes exceeds (especially by a significant degree) the surface area of the anodes, then a reducing environment is created within the treatment chamber. The electrical current controller may apply a voltage to the treatment chamber to apply an effective voltage to each cell of from 0.1 to 50 V; especially from 0.1 to 40 V, from 0.5 to 30 V, or from 0.5 to 20 V; more especially from 1 to 10 V or from 1 to 5 V or from 2 to 4 V; most especially about 2-3 V or about 3 V (the "effective voltage to each cell" is the voltage between two adjacent electrodes in the treatment chamber).

The inventors have found that the effective voltage to each cell may be adjusted by adjusting the voltage applied to the electrodes by the electrical current controller, by adjusting the number of electrodes connected to an electrical current, by positioning a non-conductive element within the treatment chamber, and/or by altering the number of electrodes in the treatment chamber (for example using an electrode holder remover and inserter, and/or an electrode plate remover and inserter). The electrical current may be provided by a voltage source. In one embodiment, the apparatus further includes a voltage source. The conductivity of the liquid in the treatment chamber may vary, and this conductivity may affect the extent and type of reactions occurring in the treatment chamber during the electrochemical treatment. For example, the electrochemical treatment may provide the same (or similar) effect when treating a highly conductive liquid with fewer electrodes, as when treating a poorly conductive liquid with a greater number of electrodes. A sensor for sensing the conductivity of the liquid in the treatment chamber may be in communication (such as via a PLC) with the current controller, an electrode holder remover and inserter, and/or an electrode plate remover and inserter to thereby control the effective voltage to each cell (this may occur in an automated manner).

In a tenth aspect, the present disclosure relates to an electrode holder for an electrochemical liquid treatment apparatus, wherein the electrode holder is configured for holding a plurality of electrodes and to engage (especially releasably engage) with an electrochemical treatment chamber (especially the treatment chamber of the apparatus of the ninth aspect of the present disclosure). In one embodiment of the tenth aspect, the present disclosure provides an electrode holder for an electrochemical liquid treatment apparatus, the electrode holder holding a plurality of electrodes and being configured to releasably engage with a treatment chamber of the electrochemical liquid treatment apparatus, wherein said electrode holder includes a flow aligner for aligning the flow of the liquid between the electrodes. In one embodiment, the flow aligner is for distributing the liquid between the electrodes. In another embodiment, the flow aligner is a wall defining a plurality of apertures for passage of the liquid.

The electrode holder may include a plurality of electrodes. The electrode holder may be in the form of a cartridge. The electrode holder may be slideably engageable with the treatment chamber. The electrode holder may be configured to accept power from a wall of the treatment chamber. The electrode holder may be configured to supply power along a longitudinal edge of at least one electrode held by the electrode holder. The electrode holder may be configured so that power is applied to the working face of at least one electrode in the electrode holder. Features of the electrode holder of the tenth aspect of the present disclosure may be as described for the electrode holder of the first to ninth aspects of the present disclosure.

The electrode holder may further include a flow aligner, for aligning the flow of the liquid between the electrodes or distributing the flow of liquid between the electrodes. The flow aligner may be as described above. The flow aligner may be in the form of at least one (especially a plurality of) baffles or baffle walls extending beneath the electrodes. The at least one baffle or baffle wall may extend substantially vertically beneath the electrodes. The at least one baffle or baffle wall may extend along substantially the same longitudinal axis as the electrodes. The at least one baffle or baffle wall may be positioned transversely or substantially perpendicularly to the electrodes. The flow aligner may also be a wall or partition defining a plurality of apertures for passage of the liquid.

The electrode holder or the electrodes within the electrode holder may be positionable within the treatment chamber at any suitable angle, especially at an angle of from 10 to 30 degrees from the vertical, more especially at an angle of 10 to 15 degrees or about 15 degrees from the vertical. The electrodes within the electrode holder may be from 1 mm to 10 mm apart, especially about 3 mm apart. The electrodes within the electrode holder may be replaceable and/or removable. Features of the electrodes in the electrode holder may be as defined for the first to ninth aspects of the present disclosure.

In an eleventh aspect, the present disclosure relates to a method of electrochemically treating a liquid, the method including the steps of:
 introducing a liquid to be treated into the apparatus of any one of the first to ninth aspects of the present disclosure;
 applying a voltage to at least two of said plurality of electrodes to provide at least one cathode and at least one anode to thereby electrochemically treat the liquid; and
 removing electrochemically treated liquid from the apparatus.

The method of the eleventh aspect may also include the step of generating floc as the liquid is electrochemically treated, and removing floc from the apparatus. The method may also include the step of introducing at least one treatment agent into the apparatus, especially in which the treatment agent is a gas or an oxidant or reductant. The method may also include the step of applying a treatment enhancer to the treatment chamber. In a further embodiment, the method includes the step of reversing the polarity of the at least one cathode and the at least one anode during the electrochemical treatment. The method of the eleventh aspect may be a method of electrolytically treating a liquid.

Features of the eleventh aspect of the present disclosure may be as described for the first to ninth aspects of the present disclosure.

In a twelfth aspect, the present disclosure relates to a method of inserting or removing an electrode holder holding a plurality of electrodes (as provided in the tenth aspect of the present disclosure) into the apparatus of the seventh aspect of the present disclosure.

In a thirteenth aspect, the present disclosure provides a water treatment system including the apparatus of the first to ninth aspects of the present disclosure. The water treatment system may also include the electrode holder of the tenth aspect of the present disclosure. The water treatment system may further include one or more of the following components: a balance tank, a treatment tank (such as an acid tank, a base tank, a treatment agent tank), a clarifier, a screw (sludge dewatering) press, a drop tank, a storage tank, and a filtration system. The filtration system may include one or more of: a sand filter, a carbon filter and one or more of a series of membrane filters (such as a membrane for ultrafiltration, microfiltration, nanofiltration or reverse osmosis, including separate spiral-wound membranes, as required for further polishing of treated water).

BRIEF DESCRIPTION OF DRAWINGS

Examples of the invention will now be described by way of example with reference to the accompanying figures, in which:

FIG. 13 is a top view of the electrochemical/electrolytic liquid treatment apparatus in the system of FIGS. 11 and 12;

FIG. 14 is a side view of the electrochemical/electrolytic liquid treatment apparatus of FIG. 13;

FIG. 15 is a perspective view of the electrochemical/electrolytic liquid treatment apparatus of FIG. 13;

FIG. 20 is a perspective view of a fourth example electrochemical/electrolytic liquid treatment apparatus;

FIG. 21 is cross sectional view of the apparatus of FIG. 20, through the liquid entry point and defoaming chamber outlet;

FIG. 23 is a perspective view of the electrode holder in the apparatus of FIG. 20;

FIG. 24 is a bottom perspective view of the electrode holder of FIG. 23;

FIG. 25 is a cross sectional view through the electrode holder of FIG. 23;

Figure 1:
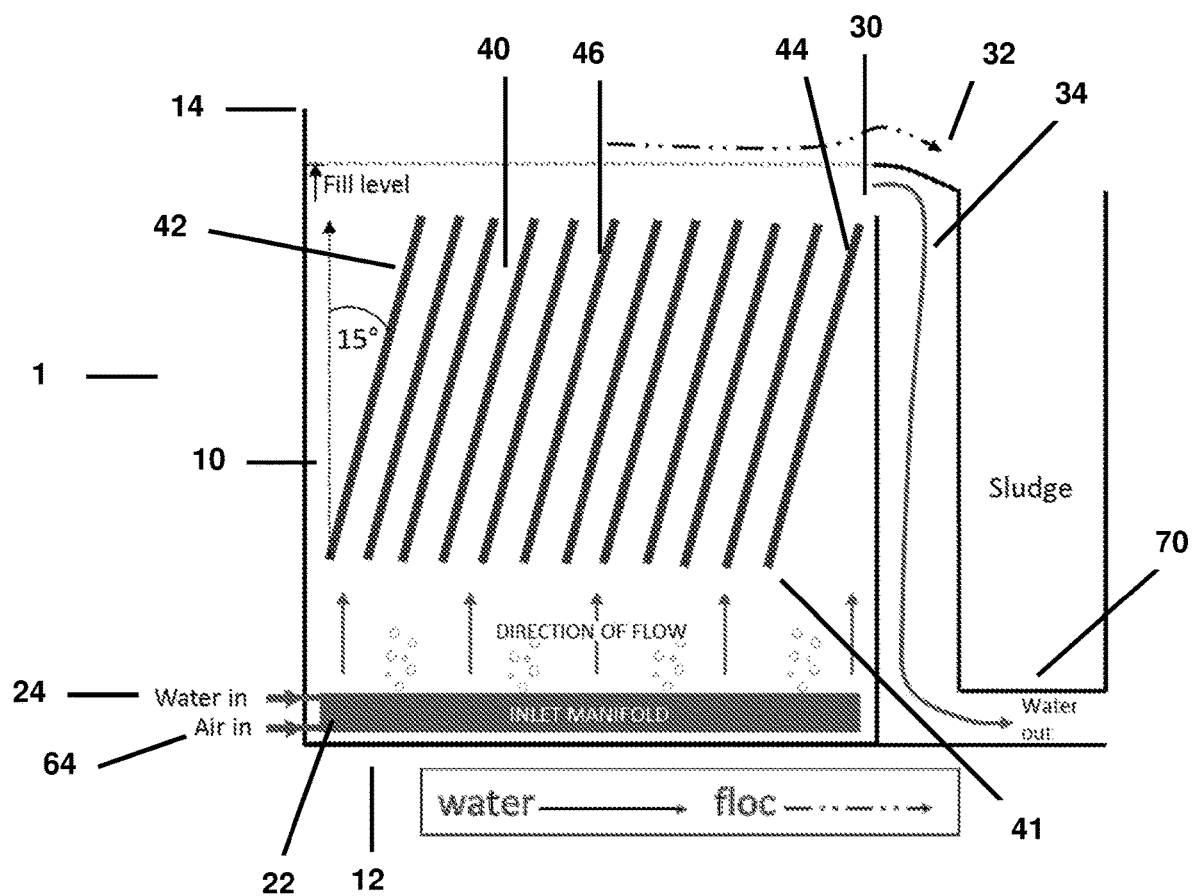
FIG. 1 is a side view of a first example electrochemical/electrolytic liquid treatment apparatus.

Preferred features, embodiments and variations of the invention may be discerned from the following Description which provides sufficient information for those skilled in the art to perform the invention. The following Description is not to be regarded as limiting the scope of the preceding Summary of the Invention in any way.

DESCRIPTION OF EMBODIMENTS

Embodiments of the invention will now be described with reference to FIGS. 1 to 33. In the figures, like reference numerals refer to like features.

FIGS. 1 to 7 illustrate three different electrochemical/electrolytic liquid treatment apparatuses 1. Each apparatus 1 includes a treatment chamber 10 having at least one inlet 20 and at least one outlet 30. Positioned within the treatment chamber 10 are a plurality of electrodes 40. The plurality of electrodes include at least one cathode 42 and at least one anode 44.

The apparatus 1 illustrated in the figures is especially adapted for electrocoagulation processes, but it would be appreciated that the apparatus 1 may also be used in other electrochemical/electrolytic processes such as for performing electrochemical reactions on the liquid or on the contaminants within the liquid. The electrochemical reactions may change the state of specific components within the liquid (for example by reductive or oxidative processes). Similarly, the apparatus 1 illustrated in the figures is particularly intended for use with aqueous solutions (such as those defined above), but any suitable liquid may be used in the apparatus 1.

The liquid may be an aqueous solution, especially brine or an aqueous oil solution (including in the form of a suspension or emulsion) or the liquid may be a liquid including a refractory organic, a sulfate, a chloride, a hydroxide, a nitrate, a bicarbonate, a carbonate or another anion or cation. The liquid may be wastewater from the dewatering of any oil or gas deposit (including coal seam and unconventional gas) (this water may be moderately saline).

Another type of liquid for use with the apparatus 1 is liquid with sulfate ion species. For such liquids hydrogen generated at the anode 44 may reduce the sulfate ion from $SO_4^{2-}$ to $HS^-$ ions. $HS^-$ ions may preferentially combine with divalent metallic species, especially at above pH 7.0, to provide ecologically immobile sulfide minerals. This may be particularly advantageous for divalent metal species which can act as serious environmental contaminants such as those arising from acid mine drainage (AMD) and electroplating wastes.

A further type of liquid is an aqueous oil solution (especially an emulsion). When such oil solutions are electrolytically treated, the oil particles may rise to the surface of the liquid and coalesce.

In another example, the liquid to be treated may be a marine or freshwater algae or algal biomass, and treatment of this liquid may result in disruption of the cell wall to thereby release algal components into the water stream. Such components may include vegetable derived colourings such as carotene, chlorophyll or xanthophyll or valuable hydrocarbons such as kerogen to be commercially recovered from algae and similar materials.

As used herein, the term "floc" relates to any coagulated, precipitated matter or sludge (which, for example, may be solid or gelatinous in form, or may be or include oils) produced during the electrolytic treatment. Floc produced by the apparatus 1 of the present disclosure differs in significant ways from floc generated by chemical coagulation. A floc produced in the present disclosure typically contains substantially less bound water, is more shear resistant and is more readily filterable than flocs produced by conventional chemical coagulation processes. The process of electrolytic treatment to form the floc causes impurities in the liquid (especially water) to be easily removable or separable from the floc.

The application of an electrical field between the electrodes 40 (between the at least one cathode 42 and the at least one anode 44) in the treatment chamber 10 may result in the creation of highly charged polymeric metal hydroxide species (these are typically created at the at least one anode 44). These species typically neutralise the electrostatic charges on contaminants in the liquid (such as suspended solids or oil droplets) and facilitate their coagulation or agglomeration and resultant separation from the liquid. In prior art apparatuses, electrolytic treatment typically results in the precipitation of certain metals, salts and amphoteric species as coagulated particles within the apparatus and especially on the surface of the electrodes 40. This surface fouling or passivation of the electrodes 40 is a significant disadvantage of prior art apparatuses.

In one embodiment, the liquid rises (or ascends) as it travels through the treatment chamber 10. In a further embodiment, the liquid obliquely rises as it travels through the treatment chamber 10.

The treatment chamber 10 may be of any suitable shape. In FIGS. 1, 3 to 5 and 7, the treatment chamber 10 has a square cross-section, but the chamber 10 also may be, for example, of circular, ovoid, elliptical, polygonal or rectangular cross-section. The treatment chamber 10 typically has a base 12, a top or lid 14 and one or more side walls.

The base 12 of the treatment chamber 10 illustrated in FIGS. 1, 3 to 5 and 7 is flat or planar, but the base 12 may also be of any suitable shape, for example to accommodate other components of a liquid treatment system. Similarly, the top 14 of the treatment chamber 10 illustrated in FIGS. 1, 3 to 5 and 7 is open, but the treatment chamber 10 may be fully or partially closed or be closable with a lid. If the chamber 10 is closed or closable, then the top 14 or lid of the chamber 10 may include a vent or other outlet for exit of gases which evolve during the electrocoagulation process. In a further embodiment, the top 14 of the treatment chamber 10 is of the same dimensions as the base 12.

The treatment chamber 10 may be of any suitable size. In one embodiment, the treatment chamber 10 accommodates from 125 kL to 500 kL of liquid, especially about 250 kL. The apparatus 1 may be configured for a liquid flow rate of at least 10 L/s, especially about 23 L/s. The residence time of the liquid in the treatment chamber 10 may be less than 2 minutes, especially about 30 seconds.

Figure 2:
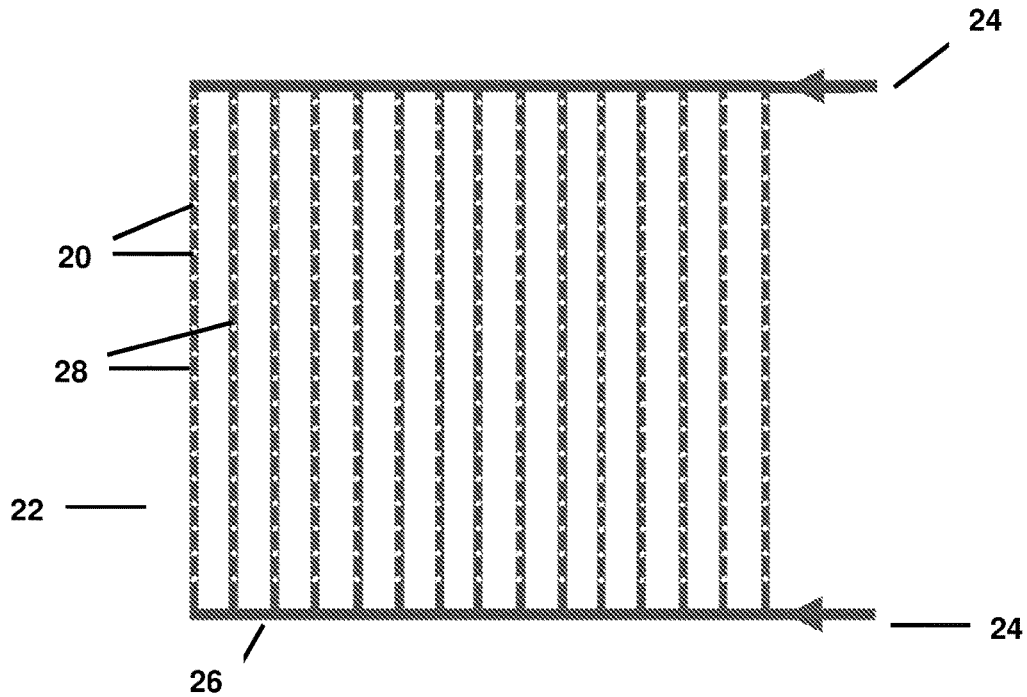
FIG. 2 is a top view of a liquid disperser for use in the first example apparatus.

An exemplary disperser 22 is illustrated in FIG. 2 (in the form of a liquid manifold). In this disperser there are two liquid entry points 24 in fluid communication with two longitudinal liquid passageways 26. Between the two longitudinal liquid passageways 26 extend a plurality of transverse liquid passageways 28. Each of the transverse liquid passageways include a plurality of inlets 20. In an alternative exemplary embodiment, the disperser may include one liquid entry point 24 in fluid communication with one transverse liquid passageway 28. A plurality of longitudinal liquid passageways 26 may then be in fluid communication with, and extend from the transverse liquid passageway 28. Each longitudinal liquid passageway 26 may include a plurality of inlets 20 to the treatment chamber 10. There may be one, two, three, four, five, six, seven, eight, nine, ten or more than ten longitudinal liquid passageways 26 and/or transverse liquid passageways 28.

The disperser 22 may further include a diffuser, for evenly distributing the liquid exiting the disperser 22. A diffuser may further improve the movement of the liquid to be treated into the treatment chamber 10. For example, when a liquid enters the disperser the pressure may be higher at the liquid entry point 24 than at a position on the disperser 22 furthest from the liquid entry point 24. To counter this, one solution may be to vary the size of the inlet 20 openings, so that the inlet 20 openings are larger at the liquid entry point 24 end of the disperser 22, and the inlet 20 openings are smaller at the position on the disperser 22 furthest from the liquid entry point 24.

In FIGS. 1, 3, 4, and 7 the at least one inlet 20 and/or disperser 22 is positioned beneath the electrodes 40, especially so that the liquid substantially rises as it travels through the treatment chamber 10. The disperser 22 may be integral with or removable from the base 12 of the treatment chamber 10.

At least one treatment agent may be used to assist in the treatment of the liquid. The at least one treatment agent may be a fluid (including a gas or a liquid) or a solid. The at least one treatment agent may be an oxidant or reductant.

The at least one treatment agent may be for reaction with certain contaminants in the liquid to be treated, may be used to adjust the properties of the liquid being treated (for example to adjust the pH of the liquid), or may be for adjusting the properties of the floc (for example the agglomeration, viscosity or flowability of the floc).

The at least one treatment agent may be a gas (which may be inert, an oxidant or a reductant, for example). The gas may be advantageously used to improve or increase the liquid flow velocity between the electrodes and/or to increase or improve the reaction of components within the liquid. The gas may, in particular, create favourable conditions at the face of the electrodes 40 wherein reduction or oxidation processes can be better controlled by the presence of gaseous reactants, which can include either reactive or inert gaseous reactants.

Increasing the liquid flow velocity between the electrodes 40 may be advantageous for several reasons. First, increased liquid flow velocity between the electrodes 40 may reduce the accumulation of dangerous gases, such as hydrogen, chlorine and hydrogen sulfide at the electrodes 40. Although such gases are typically formed in the electrocoagulation process, in the absence of high current densities the formation rate of such gases is usually so low that poor clearance of these gases occurs. The addition of a buoyant gas to the treatment chamber 10 improves the clearance of such dangerous gases.

A second and related advantage of increasing the liquid flow velocity between the electrodes 40 is that passivation of the at least one cathode 42 may be reduced, as higher liquid flow rates decreases the potential for material build-up (such as floc) on the at least one cathode 42.

A third advantage of increasing the liquid flow velocity between the electrodes 40 is that the liquid is more likely to push any floc (including, for example, coalescing oil droplets) being formed to the top 14 of the treatment chamber 10, where the floc may be efficiently removed or recovered for further processing or sale. This prevents the floc from settling on the base 12 of the treatment chamber 10.

The gas introduced to the treatment chamber 10 may also be used to contribute to chemical reactions occurring within the treatment chamber 10, allowing for the formation of additional compounds to assist in treatment or purification of the liquid. For example, and as discussed above, the gas selected may be used as an oxidant or a reductant. Specific types of gases may be selected for removal of targeted ionic species.

Examples of gases that may be used in the apparatus 1 include air, hydrogen, oxygen, ozone, carbon monoxide, carbon dioxide, sulphur dioxide, hydrogen sulfide, nitrogen, chlorine, fluorine, chlorine dioxide, ammonia, or a combination thereof; especially hydrogen, hydrogen sulfide, ozone, chlorine, carbon monoxide, air, carbon dioxide, or a combination thereof; more especially air, carbon dioxide, hydrogen sulfide, ozone, hydrogen, carbon monoxide, or a combination thereof. The gas may be especially known for its ability to display enhanced reactivity in an electric field with ionic species present in such water and wastewater systems. The gas may be a buoyant gas.

In one example, if the liquid to be treated is concentrated brine from a reverse osmosis system, carbon dioxide may be introduced into the treatment chamber 10, and depending on the pH chosen, the resulting reaction products may be sodium sesquicarbonate (where sodium is the dominant ion), and/or mixed magnesium carbonate, magnesium hydroxy-carbonate-hydroxy-chloride (where magnesium is the dominant ion). In a variation to this arrangement, the electrodes 40 may include metallic alloys containing aluminium and magnesium such that magnesium enters the liquid from anode consumption or dissolution, and reactive gases such as hydrogen may form as the anode is consumed or dissolved.

A plurality of treatment agents may enter the treatment chamber 10, such as an inert gas and an oxidant or reductant.

The at least one treatment agent may be introduced into the treatment chamber 10 in any suitable way. For example, if the treatment agent is a solid, the solid may be added directly to the treatment chamber 10, such as by dropping the solid into the treatment chamber 10 at the top 14 of the treatment chamber 10. In another example, the at least one treatment agent (which may be a solid, liquid or gas) may be mixed with the liquid to be treated before the liquid enters the treatment chamber. If the at least one treatment agent is a solid, the solid treatment agent may be dissolved in the liquid to be treated, or a suspension or colloid may be formed. If the at least one treatment agent is a gas, the gas treatment agent may be added to, or dissolved within, the liquid to be treated (for example this may be achieved under pressure). The added gas may form microbubbles in the treatment chamber 10 (for example in suspension as the pressure is progressively reduced), and these microbubbles may rise through the treatment chamber 10. As the microbubbles contact the electrodes 40, turbulent mixing conditions may be provided, along with a reducing or oxidative environment as required. The microbubbles may entrain materials forming at the electrodes 40 so as to keep the electrodes 40 clear of reaction products or may for example provide gases for reductive or oxidative processes at the face or reactive surface of the electrodes 40. In one embodiment, the apparatus 1 includes a mixer in fluid communication with the at least one inlet for a liquid to be treated 20, wherein the mixer is for mixing at least one treatment agent (which may be a liquid, gas or solid) with the liquid to be treated, before the liquid to be treated passes through the at least one inlet 20.

The at least one treatment agent may enter the treatment chamber 10 through at least one treatment inlet for entry to the treatment chamber 10 of the at least one treatment agent. The treatment chamber 10 may include at least one treatment inlet (or a plurality of treatment inlets in fluid communication with each other) for each or each mixture of treatment agents. Advantageously, the at least one treatment inlet may allow for further control over the rate of addition or concentration of the at least one treatment agent within the treatment chamber 10 (and if the at least one treatment agent is an oxidant or reductant, for example, the at least one treatment inlet may allow control over the rate at which electrochemical oxidation or reduction reactions may occur). The at least one treatment agent may, for example, be mixed with a liquid (such as a portion of the liquid to be treated) before it passes through the at least one treatment inlet. The at least one treatment agent may be mixed with the liquid as discussed in the previous paragraph before it passes through the at least one treatment inlet.

In one embodiment, the at least one treatment inlet is a plurality of treatment inlets for dispersing the treatment agent into the treatment chamber 10, especially for evenly dispersing the treatment agent throughout the treatment chamber 10. The treatment chamber 10 may include at least 20 inlets.

Advantageously, by using a plurality of inlets for entry of a treatment agent, the treatment agent may evenly enter the treatment chamber 10. This may permit a consistent concentration and/or distribution of the treatment agent in the liquid before the treatment agent is proximate to the electrodes 40, which in turn may allow for improved reaction of the liquid to be treated. When the treatment agent is a gas, a plurality of inlets for a gas treatment agent may improve even fluid flow throughout the treatment chamber 10 and may maximise efficient contact between the electrodes 40 positioned within the treatment chamber 10 and the liquid being treated. A plurality of inlets for a gas treatment agent may also improve the distribution of the gas within the liquid being treated, which in turn may improve the effect of the gas in chemical/electrochemical reactions within the treatment chamber 10 (for example, when the gas is an oxidant or reductant, the performance of the apparatus 1 in treatment, separation or recovery of contaminants may be improved).

The at least one treatment inlet may be at least one fluid treatment inlet (the fluid may include gases and liquids, and for example, the liquids may include suspended solids). For avoidance of doubt, the term "fluid treatment inlet" does not mean that the treatment agent is in fluid form (although it may be), only that a fluid at least including the treatment agent passes through the fluid treatment inlet. The at least one fluid treatment inlet may be in the form of a fluid treatment disperser. The at least one fluid treatment inlet may be at least one liquid treatment inlet (again, the term "liquid treatment inlet" means that a liquid at least including the treatment agent passes through the liquid treatment inlet). The at least one liquid treatment inlet may be in the form of a liquid treatment disperser. The liquid treatment disperser may be as described above for the liquid disperser.

Figure 6:
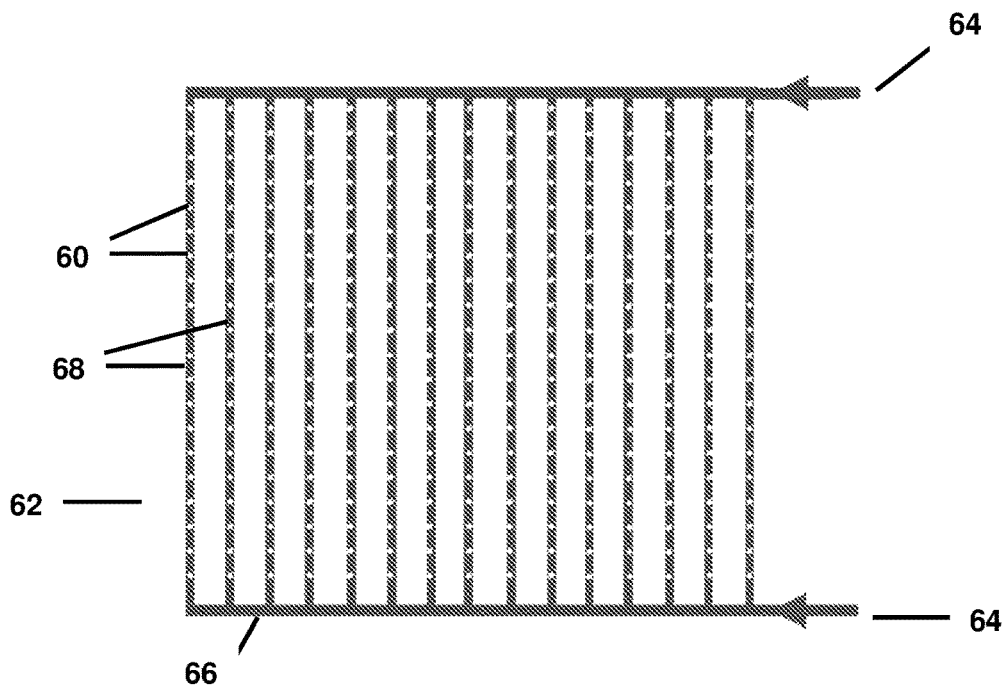
FIG. 6 is a top view of a gas disperser for use in the first example apparatus.

The at least one treatment inlet may be an inlet for a gas treatment agent (i.e. a gas inlet 60). The treatment chamber 10 may include a gas disperser 62, especially in the form of a gas manifold, the gas disperser 62 having a plurality of gas inlets 60. The gas disperser 62 may be for evenly dispersing the gas relative to the electrodes 40 in the treatment chamber 10. An exemplary gas disperser 62 is illustrated in FIG. 6, in the form of a gas manifold. In this disperser there are two gas entry points 64 in gaseous communication with two longitudinal gas passageways 66. Between the two longitudinal gas passageways 66 extend a plurality of transverse gas passageways 68. At least one or each of the transverse gas passageways include a plurality of gas inlets 60. In an alternative exemplary embodiment, the gas disperser 62 may include one gas entry point 64 in gaseous communication with one transverse gas passageway 68. A plurality of longitudinal gas passageways 66 may then be in gaseous communication with, and extend from the transverse gas passageway 68. Each longitudinal gas passageway 66 may include a plurality of gas inlets 60. There may be one, two, three, four, five, six, seven, eight, nine, ten or more than ten longitudinal gas passageways 66 and/or transverse gas passageways 68. The gas disperser 62 may be positioned beneath the electrodes 40 in the treatment chamber 10.

In further embodiments, the apparatus 1 may include a liquid pump for pumping liquid through the at least one liquid inlet 20, and/or at least one treatment agent pump (which may be a liquid pump and/or a gas pump) for pumping the treatment agent through the at least one treatment inlet.

The at least one outlet 30 may be positioned above the electrodes 40 (especially at the top 14 of the treatment chamber 10), especially so that the liquid substantially rises as it travels through the treatment chamber 10. In one embodiment, the at least one outlet 30 includes a floc outlet 32 for exit of floc, and/or a liquid outlet 34 for exit of electrochemically/electrolytically treated liquid. The floc outlet 32 may be positioned above the liquid outlet 34.

The liquid outlet 34 may be positioned in any suitable way within the treatment chamber 10, provided that substantially no floc is able to exit the treatment chamber 10 through the liquid outlet 34. In the embodiment illustrated in FIGS. 1, 3 to 5 and 7, the liquid outlet 34 is positioned directly beneath the floc outlet 32. However, this need not be the case. The liquid outlet 34 may be positioned, for example, lower in the treatment chamber 10, such as below the top of the electrodes 40.

The liquid outlet 34 may be in the form of an aperture in the side of a wall of the treatment chamber 10 (as illustrated in FIGS. 1, 3 to 5 and 7). The treatment chamber 10 may include one, two, three, four or five liquid outlets 34. One or more valves may be associated with the liquid outlets 34 so that each liquid outlet 34 may be selectively closed or partially closed. This would allow for adjustment of the liquid flow rate through the treatment chamber 10.

In the embodiment illustrated in FIGS. 1, 3 to 5 and 7, the floc outlet 32 is in the form of a weir or spillway above the electrodes. The at least one inlet 20 is also provided in a disperser 22 positioned beneath the electrodes 40. This arrangement results in the liquid rising past the plurality of electrodes 40 within the treatment chamber 10 when the apparatus 1 is in operation. Furthermore, the electrodes 40 are positioned beneath the liquid level within the treatment chamber 10. This means that once the liquid being treated passes above the electrodes, the liquid moves horizontally in the direction of the weir. By virtue of the design of the apparatus 1 illustrated in the Figures, floc collects on the surface of the liquid which allows substantially all floc to exit the treatment chamber 10 over the weir or spillway. Therefore, in another embodiment, the at least one outlet 30 is positioned in the upper portion of the treatment chamber 10, and the at least one inlet 20 is positioned in the lower portion of the treatment chamber 10. In one embodiment, the at least one outlet 30 is positioned at a different height to the at least one inlet 20 in the treatment chamber 10 (this arrangement may avoid overly turbulent flow of the liquid through the apparatus).

Advantageously, apparatus 1 may allow substantially all coagulated floc to rise to the surface of the liquid, where the floc can be separated after passing through the floc outlet 32. This is in marked difference to many existing electrochemical/electrolytic liquid treatment apparatuses, in which floc often settles at the bottom of the apparatus, where it needs to be removed via a drain.

In one example, the apparatus 1 includes at least one floc outlet 32, especially in the form of a weir or spillway. In other examples, the apparatus 1 includes two, three or four floc outlets 32, especially in the form of a weir or spillway. In a further example, there may be a floc outlet 32 on each side of the treatment chamber 10 (again, especially in the form or a weir or spillway). The floc outlet 32 may include an adjustable baffle, which may be in the form of a plate. The adjustable baffle may form the lower lip of a weir or spillway, and the baffle may be raised or lowered to adjust the separation of the floc from the electrochemically (or electrolytically) treated liquid. For example, by raising the baffle typically less electrochemically (or electrolytically) treated liquid would pass through the floc outlet 32.

Figure 7:
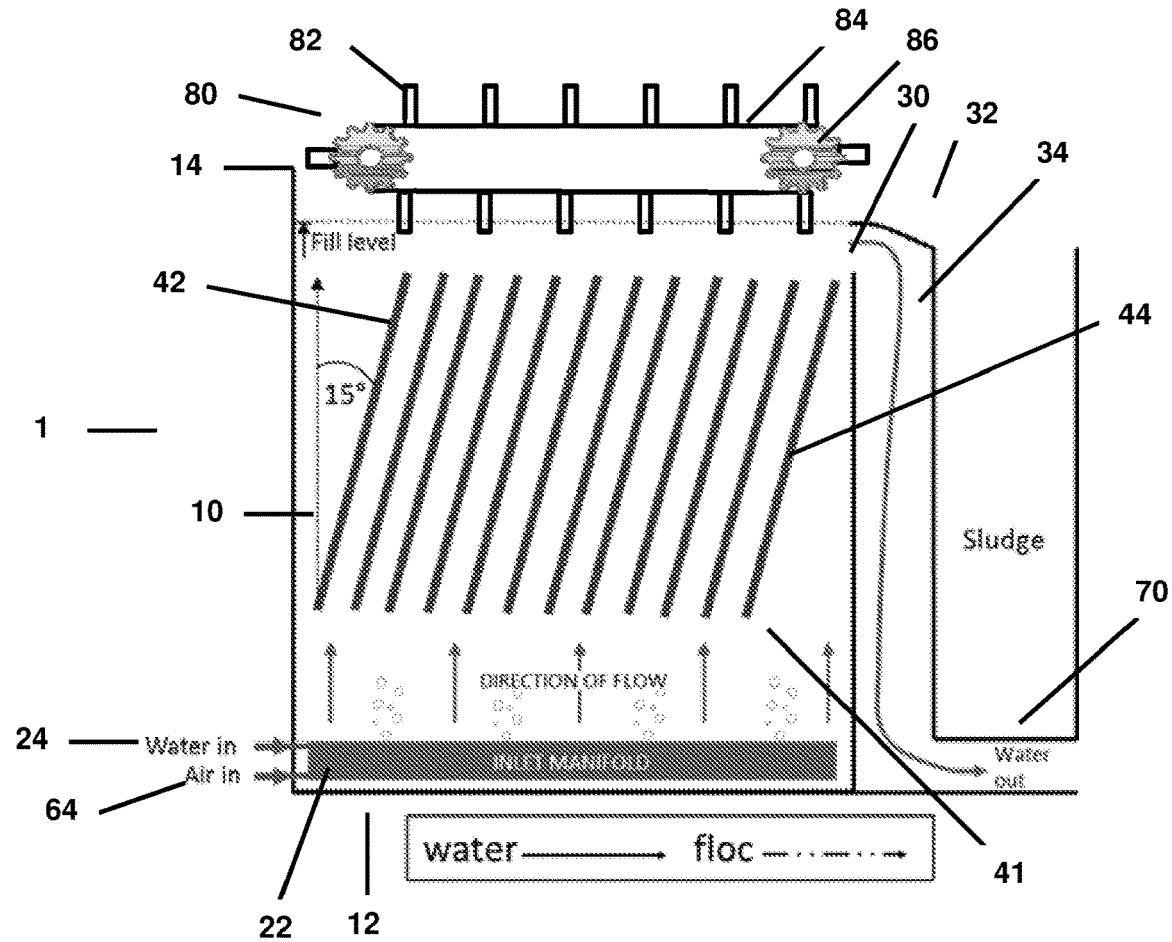
FIG. 7 is a side view of a third example electrochemical/electrolytic liquid treatment apparatus.

The apparatus 1 may also include a floc mover 80 (especially in the form of a floc skimmer as illustrated in FIG. 7) for moving floc, especially on the surface of the liquid in the treatment chamber 10. The floc mover 80 may be configured to move floc towards the at least one floc outlet 32, and may assist in providing a horizontal flow for the liquid at the top 14 of the treatment chamber 10, especially on the surface of the liquid in the treatment chamber 10. The floc mover 80 may be positioned substantially above or below the surface of the liquid in the treatment chamber 10, especially substantially above the surface of the liquid (as in FIG. 7). An exemplary floc mover 80 is illustrated in FIG. 7. This floc mover 80 includes a plurality of floc drivers 82 mounted to a belt, strap, chain or cable 84, which is turned by wheels 86. As the wheels 86 turn, floc rising to the surface of the liquid is skimmed and moved towards and through the at least one floc outlet 32.

The floc outlet 32 may be especially at the top 14 of the treatment chamber 10, and may be especially positioned substantially at the intended height of the liquid within the treatment chamber 10.

A separator 70 may be positioned in fluid communication with the floc outlet 32 to separate floc from the liquid. The separated floc may be disposed of, further treated, or otherwise used. The separated liquid may be combined with the liquid exiting the treatment chamber 10 via the liquid outlet 34; returned to the treatment chamber 10 for further treatment; or diverted elsewhere (for example by the use of a float or sensor actuated submersible sludge pump) for further treatment or release to the environment.

The separator 70 may be in the form of a filter. In one embodiment, the filter may be a filtration bag, especially a filtration bag made of a polymeric material, more especially a filtration bag having woven polymeric fibres which trap the solids and permit the free flow of separated liquid.

The plurality of electrodes 40 may be selected from the group consisting of an anode 44, a cathode 42 and an electrical conductor 46. In use, the apparatus includes at least one anode 44 and at least one cathode 42. However, the electrodes 40 may all be of similar structure and only become an anode 44, a cathode 42 or an electrical conductor 46 by virtue of the power connected to the electrode 40 (or lack thereof in the case of an electrical conductor 46; the electrical conductor 46 is not intended to accept power from a power source external to the treatment chamber 10. However, due to the electrical current resulting from the application of power to the anode 44 and cathode 42 and the movement of ions in the liquid, when the apparatus 1 is in use the at least one electrical conductor 46 will carry charge). The at least one electrical conductor 46 is especially positioned between at least one anode 44 and at least one cathode 42.

In one embodiment, from 2 to 12 electrodes 40 in the apparatus 1 are connected to a power source; especially from 2 to 10 or from 2 to 8 electrodes 40 in the apparatus 1 are connected to a power source; more especially from 2 to 6 or from 2 to 4 electrodes 40 in the apparatus 1 are connected to a power source; most especially three electrodes 40 in the apparatus 1 are connected to a power source. If three electrodes 40 in the apparatus 1 are connected to a power source, the two terminal electrodes (i.e. at each end of the plurality of electrodes 40) will have the same polarity (i.e. either an anode 44 or a cathode 42) and an electrode 40 intermediate the terminal electrodes 40 (especially substantially equidistant between the terminal electrodes 40) will have the opposite polarity (i.e. either an anode 44 or a cathode 42). The remaining electrodes 40 in the plurality of electrodes 40 will be electrical conductors 46. The apparatus 1 may include from 10 to 1000 electrodes 40; especially from 20 to 500 electrodes 40; more especially from 30 to 250 electrodes 40; most especially from 40 to 100 electrodes 40.

The electrodes 40 may be replaceable and/or removable. For example, the electrodes 40 may be removable from the treatment chamber 10 by means of an overhead gantry. The electrodes 40 may be removed for temporary storage as a set (for example in horizontal racks above the unit), or can be replaced individually such as when an electrode 40 loses its anodic potential through corrosion.

Each electrode 40 may be of any suitable shape, although certain shapes facilitate easy removal from the treatment chamber 10. For example, each electrode 40 may be curved or planar, especially planar (as in the embodiment exemplified in FIGS. 1, 3-5 and 7). Each electrode 40 may also be, for example, of square, rectangular, trapezoidal, rhomboid, or polygonal shape; especially of rectangular or square shape. Each electrode 40 may also be of solid construction, or may include a plurality of apertures. Each electrode 40 may be especially of solid construction. In one embodiment, each electrode 40 is a plate.

Each electrode 40 may be made of any suitable material. Exemplary materials include aluminium, iron, steel, stainless steel, steel alloy (including mild carbon steel), magnesium, titanium and carbon. In another embodiment, each electrode may be made of an alloy of or containing a material selected from the group consisting of: aluminium, iron, steel, magnesium, titanium and carbon. Each electrode 40 may be selected depending upon the liquid to be treated, the contaminants in the liquid, the floc to be created and the relative cost of the various metallic electrodes at the time. Each said electrode 40 within the apparatus 1 may be the same or different, and may include the same metal or different metals (for example depending on the desired performance).

The electrodes 40 may be positionable above or below the level of the liquid in the treatment chamber 10. However, the electrodes 40 are especially positionable below the level of the liquid in the treatment chamber 10 so as not to impede any liquid or floc horizontal flow at the surface of the liquid.

The electrodes 40 may be positionable within the reaction chamber at any suitable angle. For example, the electrodes 40 or a portion of the electrodes 40 (such as an upper portion) may be angled from a vertical plane (obliquely configured). In the example illustrated in FIGS. 1, 3, 4 and 7 the electrodes 40 are positioned at an angle of about 15 degrees to the vertical. In other examples, the electrodes 40 or a portion of the electrodes 40 (such as an upper portion) may be positioned at an angle of from 5 to 40 degrees from the vertical, especially from 5 to 35 degrees from the vertical, more especially from 10 to 30, 10 to 15 or 15 to 30 degrees from the vertical. In other examples, the electrodes 40 or a portion of the electrodes 40 (such as an upper portion) may be positioned at less than 40 degrees from the vertical, more especially less than 35, 30, 25, 20, 15, 10 or 5 degrees from the vertical. In further examples, the electrodes 40 or a portion of the electrodes 40 (such as an upper portion) may be positioned at greater than 5, 10, 15, 20, 25, 30 and 35 degrees from the vertical. In other embodiments, the electrodes 40 may be substantially vertical (or in a vertical plane). The inventors have found that different liquids react differently to different electrode angles 40.

Positioning the electrodes 40 within the treatment chamber 10 at an angle may result in a number of advantages. First, positioning the electrodes 40 at an angle may mean that the liquid flows against the electrodes 40 as it rises through the treatment chamber 10 (also gases may travel against the electrode 40 as the gas rises through the treatment chamber 10). This assists in preventing build-up of material (such as floc) on the electrodes 40.

Secondly, positioning the electrodes 40 at an angle results in a horizontal movement being applied to the liquid as it travels through the treatment chamber 10. This can assist in directing the liquid through the at least one outlet 30, and especially floc through the floc outlet 32. In one example, the horizontal movement applied to the liquid forces any coagulated sediment or floc away from the treatment chamber 10 thereby providing a clear disposal path for the floc from the treatment chamber 10.

Thirdly, positioning the electrodes 40 at an angle may assist in agglomerating floc. For example, as liquid rises through the treatment chamber 10, the floc may flow against the electrodes 40. This means that floc is more concentrated against the electrodes 40 which assist in agglomeration. In an exemplary embodiment, if the floc includes oil particles, the rising oil particles may be coalesced into larger droplets as a result of entrainment beneath the electrodes 40. This does not generally occur when the plates are in a vertical configuration, and in this exemplary embodiment the dissolved or emulsified oil particles in the liquid may contact the underside of the electrodes 40 where they accumulate and combine with other forming oil particles at the charged interface until such time as a larger (coalesced) droplet forms which then floats to the surface aided by the predominantly diagonal and vertical liquid flow.

In one embodiment of the present disclosure, the floc is or includes oil particles (which may arise when the liquid to be treated is an oily emulsion). In one example, during electrolytic treatment the coalesced oil rises to the surface of the liquid and is evacuated from the treatment chamber 10 by means of a horizontal flow imparted by a combination of the natural buoyancy of the oil droplet, the lower density or specific gravity of the entrained oil droplet and the angled electrodes 40. In a further example, during electrolytic treatment the coalescing oil droplets forming beneath the electrodes 40 are forced to the surface with an additional flow of gas and, combined with the horizontal flow imparted by the angled electrodes 40, are cleared from the treatment chamber 10. In another example, during electrolytic treatment the coalesced oil droplets are forced to the surface of the liquid via the forced, circulating flow of liquid and a horizontal moment imparted on the liquid via the angle of the electrodes 40.

Each electrode 40 may also be of any suitable thickness, for example from 1 mm to 20 mm thick, especially from 1 mm to 10 mm thick, more especially from 1 mm to 5 mm thick, most especially about 3 mm thick. In some embodiments, each electrode 40 is less than 20 mm thick, especially less than 19, 18, 17, 16, 15, 14, 13, 12, 11, 10, 9, 8, 7, 6, 5, 4, 3 or 2 mm thick. In other embodiments, each electrode 40 is greater than 0.5 mm thick, especially greater than 1, 2, 3, 4, 5, 6, 7, 8, 9, 10, 11, 12, 13, 14, 15, 16, 17, 18 or 19 mm thick. In a further embodiment, the thickness of the electrode 40 may be a range in which the upper and lower limits are as previously described.

The electrodes 40 may be spaced at any suitable distance. For example, the electrodes 40 may be from 1 mm to 150 mm apart, especially from 1 mm to 100 mm apart or from 1 mm to 50 mm apart, more especially from 1 mm to 10 mm apart. The electrodes 40 may be from 1 mm to 5 mm apart, more especially about 3 mm apart. In some embodiments, the electrodes 40 are less than 150 mm apart, especially less than 140, 130, 120, 110, 100, 90, 80, 70, 60, 50, 40, 30, 25, 20, 15, 10, 9, 8, 7, 6, 5, 4 or 3 mm apart. In other embodiments, the electrodes 40 are greater than 1, 2, 3, 4, 5, 6, 7, 8, 9, 10, 15, 20, 25, 30, 40, 50, 60, 70, 80, 90, 100, 110, 120, 130 or 150 mm apart. The electrodes 40 may also be a range apart in which the upper and lower limits are as previously described. When the treatment chamber includes more than 2 electrodes, each electrode 40 may be the same distance apart or different distances apart. The electrodes 40 may be held apart in any suitable way. For example, the treatment chamber 10 may include guides for holding the electrodes 40 in position. In one embodiment, the guides may be grooves or slots positioned in opposite walls of the treatment chamber 10. The guides may be made from a high-density, electrically insulating polymeric material, such as HDPE or PVC, or a material as discussed below for the electrode holder 100.

In one embodiment, the electrodes 40 are from 1 mm to 10 mm thick, more especially from 1 mm to 5 mm thick; and the electrodes 40 are from 1 mm to 10 mm apart, more especially from 1 mm to 5 mm apart. Using thinner electrodes 40 positioned close together enables a greater number of electrodes 40 to be positioned within the treatment chamber 10. This increases the surface area of the electrodes 40 in contact with the liquid, which may enhance the electrochemical (or electrolytic) treatment of the liquid.

To improve fluid flow, the electrodes 40 may have a tapered lower edge 41. The lower edge 41 of the electrodes

40 may be tapered to an angle of about 4, 5, 6, 7, 8, 9, 10, 11, 12, 13, 14, 15, 16, 17, 18, 19 or 20 degrees relative to the longitudinal axis of the electrode. The taper may extend less than 40%, 30%, 20%, 15%, 10%, 9%, 8%, 7%, 6%, 5%, 4% or 3% of the length of the electrode 40. The lower edge 41 of the electrode 40 may be tapered on one or more sides, such as two opposed longitudinal sides, more especially one longitudinal side. If the lower edge 41 of the electrode 40 is tapered on more than one side, then the taper on each side may be the same or different.

Any suitable electrical current may be applied to the plurality of electrodes 40. However, the current applied to the plurality of electrodes 40 may especially be a direct current of adjustable frequency of alternation. This means that the electrodes 40 functioning as the at least one cathode 42 and the at least one anode 44 may switch during the electrochemical (or electrolytic) treatment. This enables the electrodes 40 to create a reversible electrical field within the treatment chamber 10, which may assist the electrodes 40 in remaining clear of debris or reaction products that might otherwise inhibit the electrochemical (or electrolytic) treatment by electro passivation. The polarity switching of the electrodes 40 may allow specific chemical reactions to be delayed or accelerated as required. Therefore, in one embodiment the polarity of the electrodes 40 is reversed during the electrochemical (or electrolytic) treatment.

In a further embodiment, the voltage and amperage of the electrical field within the treatment chamber 10 may be adjusted as necessary by placing selected electrodes 40 in electrical contact with a voltage source. The voltage source may be a separate, proprietary manufactured transformer.

The apparatus 1 may also include at least one non-conductive element positioned within the treatment chamber 10. This non-conductive element may be used to alter the electrical field (amperage and voltage) within the treatment chamber 10. The position, shape and configuration of the non-conductive element may be as described above for the electrodes 40. However, the non-conductive element is made of a material that does not conduct electricity, such as, for example, a material selected from the group consisting of: a polymer plastic (such as polyvinyl chloride (PVC), high density polyethylene (HDPE), low density polyethylene (LDPE), acrylonitrile butadiene styrene (ABS), polypropylene (PP)); a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix, or a combination of the aforementioned materials. In one embodiment the apparatus 1 does not include any non-conductive elements.

The apparatus 1 may further include a flow aligner 90 for aligning the flow of the liquid between the electrodes 40, the flow aligner being positioned or positionable within the treatment chamber 10. A flow aligner 90 may be advantageous as the liquid beneath the electrodes 40 in the treatment chamber may especially be turbulent. The flow aligner 90 may assist the liquid in moving substantially along the same longitudinal axis as the plurality of electrodes 40, which in turn may improve the reaction between the liquid to be treated and the electrodes 40.

The flow aligner 90 may be in the form of at least one (especially a plurality of) baffles or baffle walls 92 extending beneath the electrodes 40. The at least one baffle or baffle wall 92 may extend substantially vertically beneath the electrodes 40. The at least one baffle or baffle wall 92 may extend along substantially the same longitudinal axis as the electrodes 40. The at least one baffle or baffle wall 92 may be positioned transversely or substantially perpendicularly to the electrodes 40. The flow aligner 90 may integrally formed with the treatment chamber 10, or may be removable and/or replaceable. Each baffle or baffle wall 92 may be in the form of a plate. Each baffle or baffle wall 92 may be from 20 mm to 500 mm long, especially from 50 mm to 250 mm long or from 60 mm to 150 mm long, more especially from 80 mm to 120 mm long, most especially about 100 mm long.

The flow aligner 90 may be made of any suitable material, but especially may be made of a non-conductive material. The flow aligner 90 may be made of the materials discussed above for the treatment chamber 10. The flow aligner 90 may be especially made from a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix; a polymer plastic such as high density polyethylene (HDPE), polyethylene (PE), polyethylene terephthalate (PET), polyvinyl chloride (PVC); a phenolic polymer plastic; or be fabricated from a number of composite materials including carbon fibre (for example a carbon fibre insulated using a polymer plastic or a composite material) and variations thereof.

The treatment chamber 10 may be configured to releasably engage with at least one electrode holder 100 holding a plurality of electrodes 40 for electrochemical (or electrolytic) treatment of the liquid. The treatment chamber 10 may include at least one guide for guiding the electrode holder 100 into position. The treatment chamber 10 may include at least one (or a plurality of) grooves for slidable engagement of the electrode holder 100 in the treatment chamber. The treatment chamber 10 may include at least one power connector for connecting power to the electrode holder, to thereby power at least one of the electrodes 40 held by the electrode holder. The treatment chamber 10 may include a plurality of power connectors (for example of different polarity) for connecting power to each electrode holder. For example, if the apparatus 1 includes one electrode holder 100, then the treatment chamber 10 may include at least one power connector for connecting power to at least one anode 44 (especially one or two power connectors) and at least one power connector for connecting power to at least one cathode 46 (especially one or two power connectors). The at least one power connector may be located on a wall of the treatment chamber, especially in a groove in which the electrode holder 100 may be slideably engaged. In one embodiment, only one wall of the treatment chamber 10 includes a power connector for each electrode holder 100.

The treatment chamber may be configured to releasably engage with from 1 to 100 electrode holders 100, especially from 2 to 50 electrode holders 100, more especially from 2 to 40, from 2 to 30, from 2 to 20, or from 2 to 10 electrode holders 100.

Figure 8:
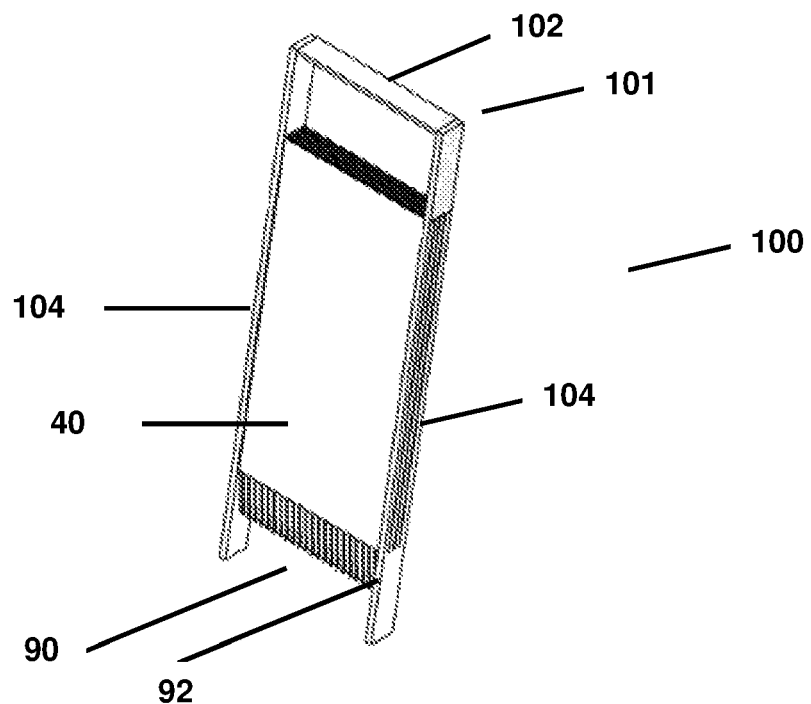
FIG. 8 is a perspective view of an example electrode holder.
Figure 9:
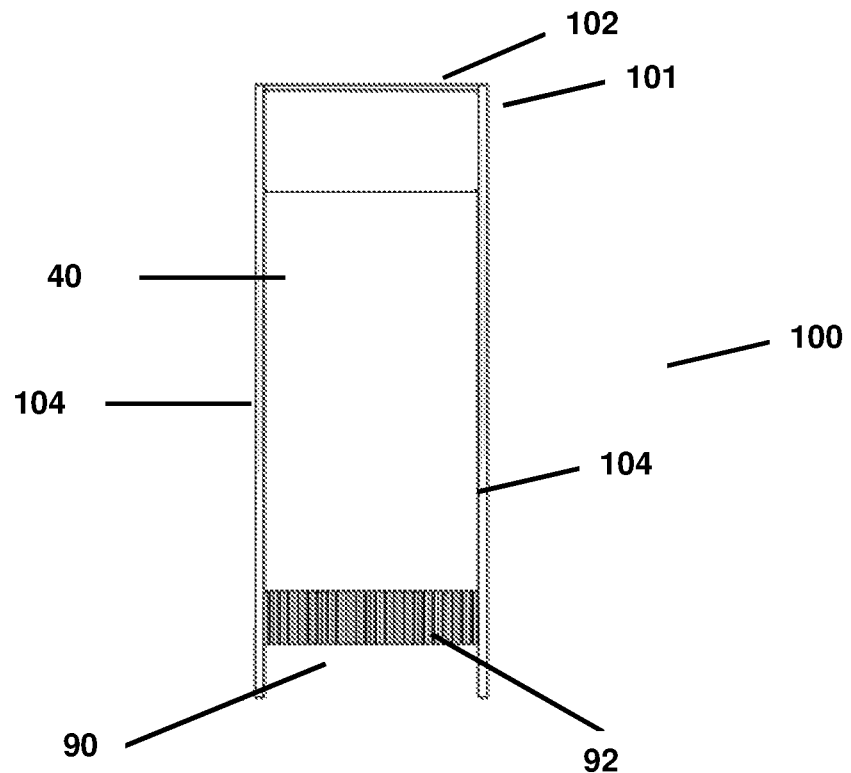
FIG. 9 is a front view of the example electrode holder of FIG. 8.
Figure 10:
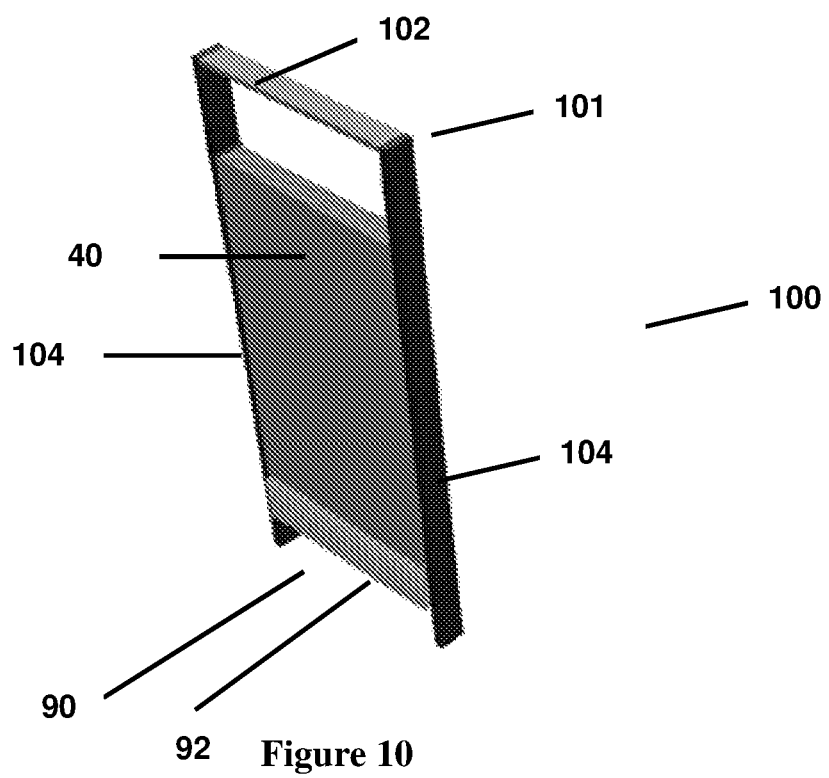
FIG. 10 is a perspective view of the example electrode holder of FIG. 8.

The apparatus 1 may further include an electrode holder 100 (an exemplary electrode holder 100 is illustrated in FIGS. 8 to 10). The electrode holder 100 may include a frame 101, and the frame 101 may include a handle 102 and at least two side walls 104. The frame 101 may be substantially U-shaped, with the base of the "U" forming the handle 102 and the sides of the "U" forming the side walls 104. The electrode holder 100 may be in the form of a cartridge.

The electrode holder 100, especially the at least two side walls 104 of the electrode holder 104 may be configured to releasably engage with the treatment chamber 10. The electrode holder 100 (especially the at least two side walls 104) may be slideably engageable with the treatment chamber 10. The electrode holder 100 (especially the at least two side walls 104) may be releasably engageable in the treatment chamber 10 by friction, by a clamp, or by another suitable fastener. In one example, the treatment chamber 10 or the electrode holder 100 may include a clamp for releasably clamping the electrode holder 100 in position. The electrode holder 100 (especially at least one of the at least two side walls 104) may be configured to accept power, especially from the wall of the treatment chamber 10, more especially by way of a power connector located in the electrode holder 100 (especially a side wall 104 of the electrode holder 100). The electrode holder 100 (especially at least one of the at least two side walls 104) may be configured to supply power along a longitudinal edge of at least one electrode 40 held by the electrode holder. Providing power along a longitudinal edge of at least one electrode 40 may provide superior flow of power than if power was only supplied to the at least one electrode 40 at a single point.

Power connectors in the electrode holder 100 and the treatment chamber 10 may connect in any suitable way. For example, the two power connectors may connect by way of abutting surfaces or projections, or by way of a male-female connection.

The electrode holder 100 may hold a plurality of electrodes 40. The electrodes 40 within the electrode holder 100 may be replaceable and/or removable. In one embodiment, the electrodes 40 within the electrode holder 100 may not be replaceable and/or removable. The electrode holder 100 may include slots machined to enable the electrodes 40 to slide in and out of the electrode holder 100 as required. This may enable replacement of the electrodes 40 within the electrode holder 100 whilst the machine continues to operate with a prior electrode holder 100. The electrodes 40 may be as described above. Furthermore, the spacings between the electrodes in the electrode holder 100 may be as described above for the spacings for the electrodes 40 in the treatment chamber 10.

The electrode holder 100 may include a flow aligner 90, as described above. The flow aligner 90 may be positioned opposite to the handle 102, beneath the electrodes 40.

Any suitable number of electrodes 40 may be held by the electrode holder 100. In one embodiment, the electrode holder may hold from 3 to 100 electrodes 40; especially from 3 to 50 electrodes 40; more especially from 3 to 25 electrodes 40; most especially from 5 to 15 electrodes 40 or about 10 electrodes 40. In one embodiment, the electrode holder 100 holds at least 3, 4, 5, 6, 7, 8, 9 or 10 electrodes 40. In another embodiment, the electrode holder 100 holds less than 100, 90, 80, 70, 80, 70, 60, 50, 40, 30, 20 or 15 electrodes 40.

The electrode holder 100 or the electrodes 40 within the electrode holder 100 may be positionable within the treatment chamber 10 at any suitable angle. In one embodiment, the electrode holder 100 is positionable substantially vertically within the treatment chamber 10. In this embodiment, the electrodes 40 may be held substantially vertically by the electrode holder 100, or the electrodes 40 may be held at an angle from the vertical by the electrode holder 100. In another embodiment, the electrode holder is positionable at an angle within the treatment chamber 10. In this embodiment, the electrodes 40 may be held substantially vertically by the electrode holder 100 (i.e. the longitudinal axis of the electrodes 40 held by the electrode holder 100 may be substantially the same as the longitudinal axis of the electrode holder 100). Alternatively in this embodiment, the electrodes 40 may be held at angle within the electrode holder 100. The angle of the electrode holder 100, or the angle of the electrodes 40 within the electrode holder 100 may be as described above for the angle of the electrodes 40 within the treatment chamber 10. For example, the electrodes 40 within the electrode holder 100 may be held at an angle of from 10 to 30 degrees from the vertical, especially at an angle of 10 to 15 degrees or about 15 degrees from the vertical. In another example, the electrode holder 100 may be held at an angle of from 10 to 30 degrees from the vertical, especially at an angle of 10 to 15 degrees or about 15 degrees from the vertical. The electrodes 40 within the electrode holder 100 may be from 1 mm to 10 mm apart, especially about 3 mm apart. The electrodes 40 within the electrode holder 100 may be replaceable and/or removable.

The electrode holder 100 advantageously may allow for the easy and rapid exchange of electrodes 40 in the apparatus 1. The electrode holder 100 may overcome the delays inherent in changing individual electrodes 40 within the reaction chamber and may be particularly advantageous in areas of low head height.

The frame of the electrode holder 100 may be made of any suitable material, but especially may be made of a non-conductive material. The frame of the electrode holder 100 may be made of the materials discussed above for the treatment chamber 10. The frame of the electrode holder 100 may be especially made from a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix; or a polymer plastic such as high density polyethylene (HDPE), polyethylene (PE), polyethylene terephthalate (PET) or polyvinyl chloride (PVC); a phenolic polymer plastic; or a carbon fibre insulated using a polymer plastic or a composite material.

The electrode holder 100 may be removable by way of a lifting device which lifts the electrode holder 100 substantially vertically before allowing for horizontal movement of the electrode holder 100 above the apparatus 1. The lifting device may be slideably mounted on at least one (especially two) rails. In one embodiment, the electrode holder 100 may be removable using an overhead gantry.

In a further embodiment, the apparatus 1 may include a current controller for controlling the amperage and voltage applied to the at least one anode 44 and the at least one cathode 42.

Figure 3:
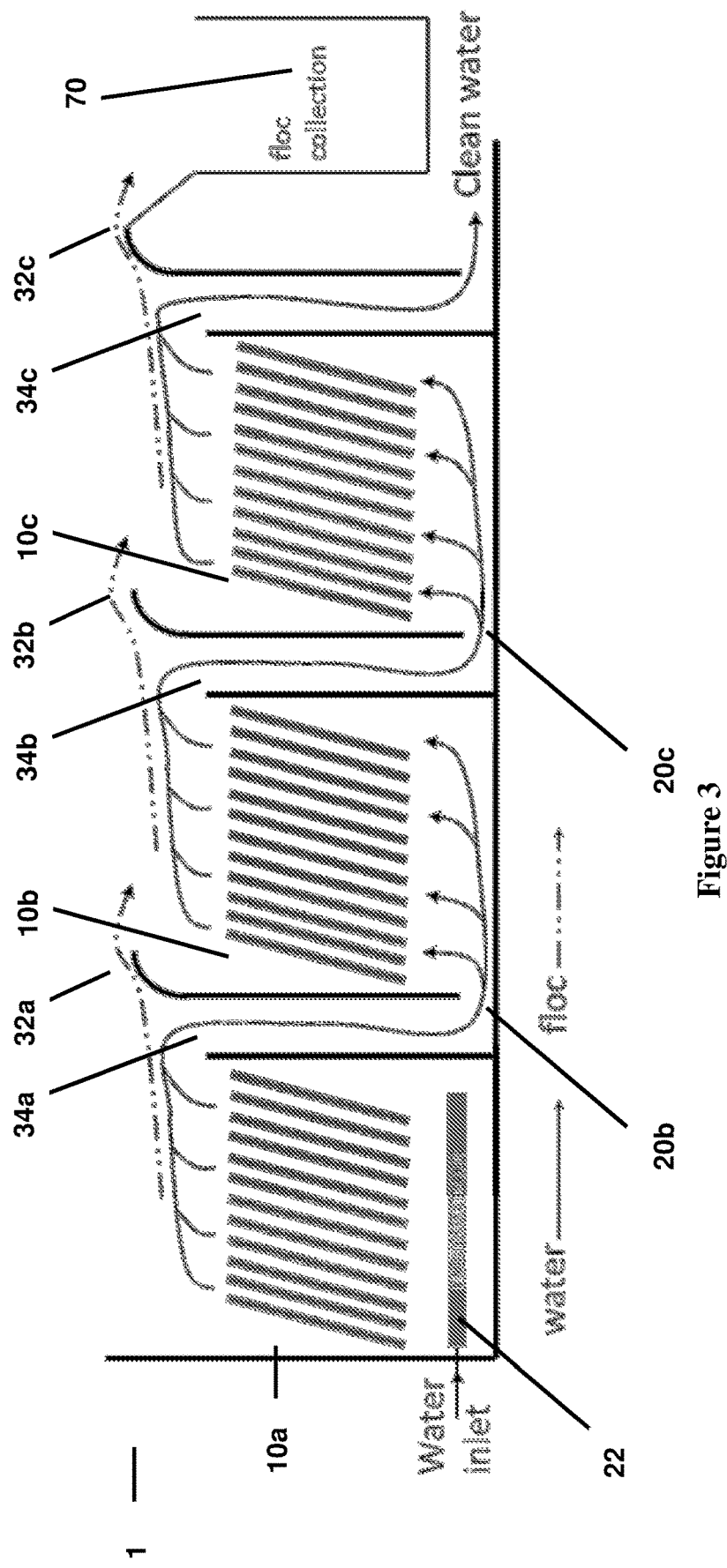
FIG. 3 is a side view of a second example electrochemical/electrolytic liquid treatment apparatus.
Figure 4:
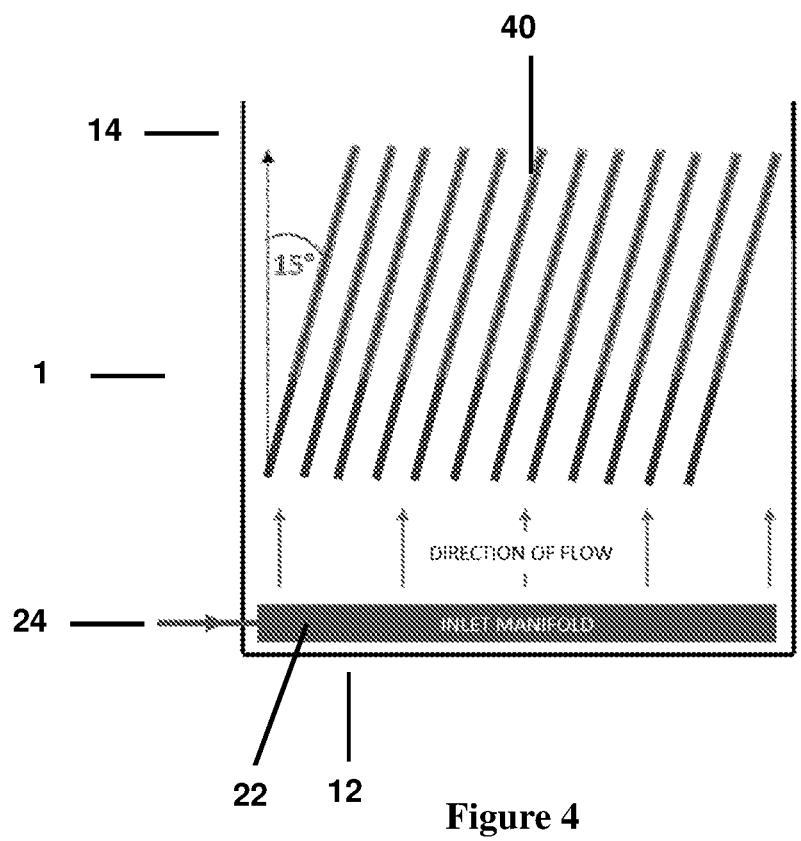
FIG. 4 is a side view of one treatment chamber in the second example electrochemical/electrolytic liquid treatment apparatus.
Figure 5:
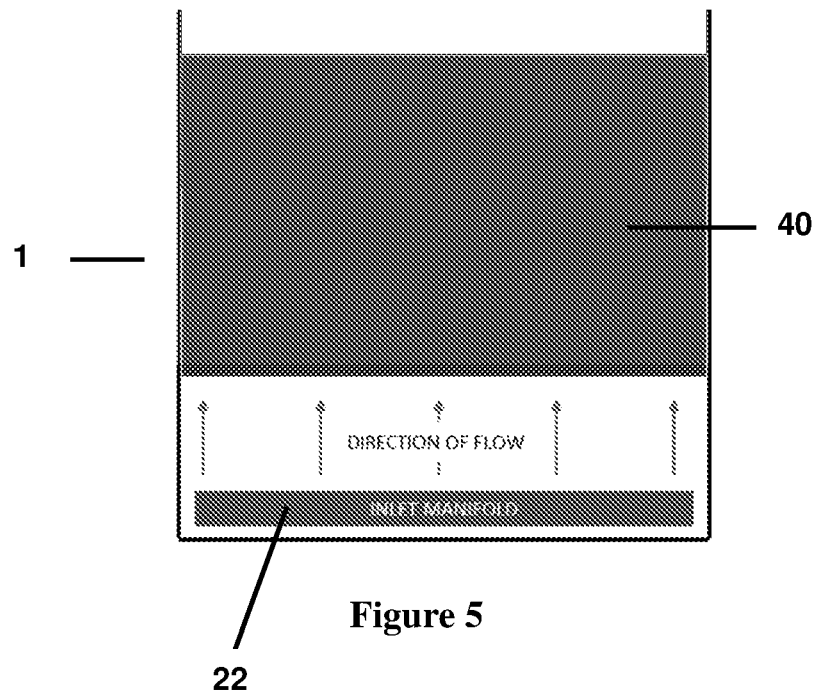
FIG. 5 is a front view of the second example electrochemical/electrolytic liquid treatment apparatus.

In a further embodiment, the apparatus 1 may include a plurality of treatment chambers 10. This is illustrated in FIG. 3. The apparatus 1 of FIG. 3 is configured so that liquid from the liquid outlet 34a of a first treatment chamber 10a flows into the inlet 20b of a second treatment chamber 10b. Following this, the liquid from the liquid outlet 34b of the second treatment chamber 10b flows into the inlet 20c of a third treatment chamber 10c. The floc produced flows over successive floc outlets 32a, 32b, 32c until it passes to filter 70 for collection.

In another embodiment, the floc exiting a first treatment chamber 10a through a floc outlet 32a is diverted so that this floc does not travel to the second treatment chamber 10b, and similarly the floc exiting the second treatment chamber 10b through a floc outlet 32b is diverted so that this floc does not travel to the third treatment chamber 10c. However, in this embodiment the liquid from the liquid outlet 34a of a first treatment chamber 10a flows into the inlet 20b of a second treatment chamber 10b, and the liquid from the liquid outlet 34b of the second treatment chamber 10b flows into the inlet 20c of a third treatment chamber 10c.

The apparatus 1 may include a pretreater positioned prior to, and in fluid communication with the liquid inlet 20. The pretreater may be, for example, a filter to remove larger particulate solids from the fluid stream that could lodge between the electrodes and disrupt liquid flows or otherwise impede with the functioning of the device. However, such pretreatment is typically not necessary.

The apparatus 1 of the present disclosure may also form one component of a larger water treatment system.

When the apparatus 1 is used, the liquid to be treated enters the treatment chamber 10 through the at least one inlet 20 and a voltage is applied to the plurality of electrodes 40 (especially to provide at least one anode 44 and at least one cathode 42), to thereby electrochemically treat the liquid. Floc may be generated as the liquid is electrochemically treated, and the floc may rise to the surface of the liquid. The floc may exit the treatment chamber 10 at the floc outlet 32 (for subsequent separation of the floc from liquid, such as by filtering) and the electrochemically treated liquid may exit the treatment chamber 10 at the liquid outlet 34. A treatment agent may be introduced into the treatment chamber 10 during the electrochemical treatment. A treatment enhancer may be applied to the treatment chamber 10 during the electrochemical treatment.

The apparatus 1 may be operable at any suitable temperature and pressure. However, the apparatus 1 is especially operable at atmospheric temperature and pressure. In another embodiment, the apparatus 1 is operable at greater than atmospheric pressure, or less than atmospheric pressure, as defined elsewhere in the specification.

Further examples of the present disclosure are illustrated with reference to FIGS. 11 to 33. FIGS. 11 to 15 describe a water treatment system 200 and components thereof in the form of a trailer.

Figure 11:
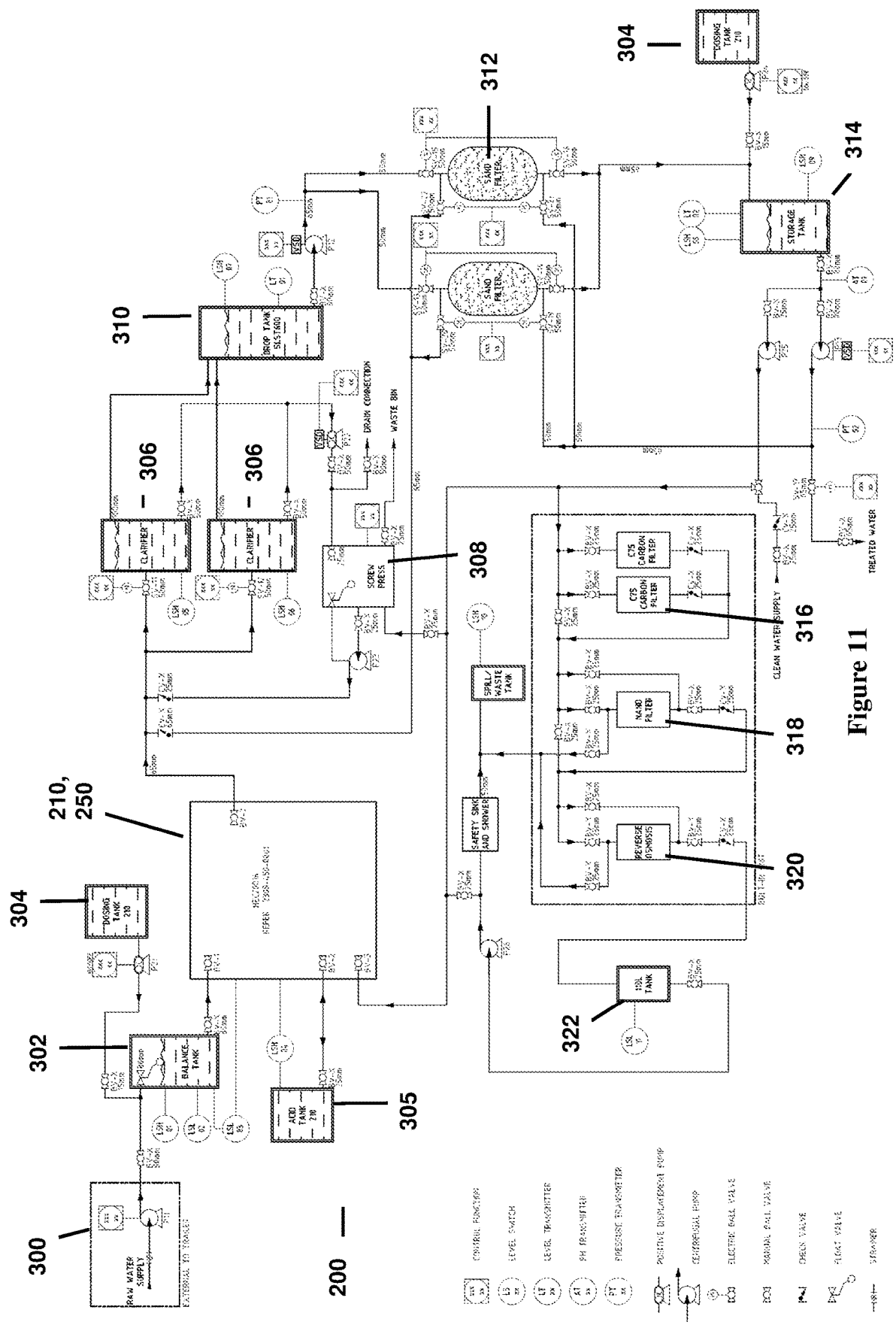
FIG. 11 is a process flow diagram of a water treatment system including an electrochemical/electrolytic liquid treatment apparatus (HEC20016)
Figure 12:
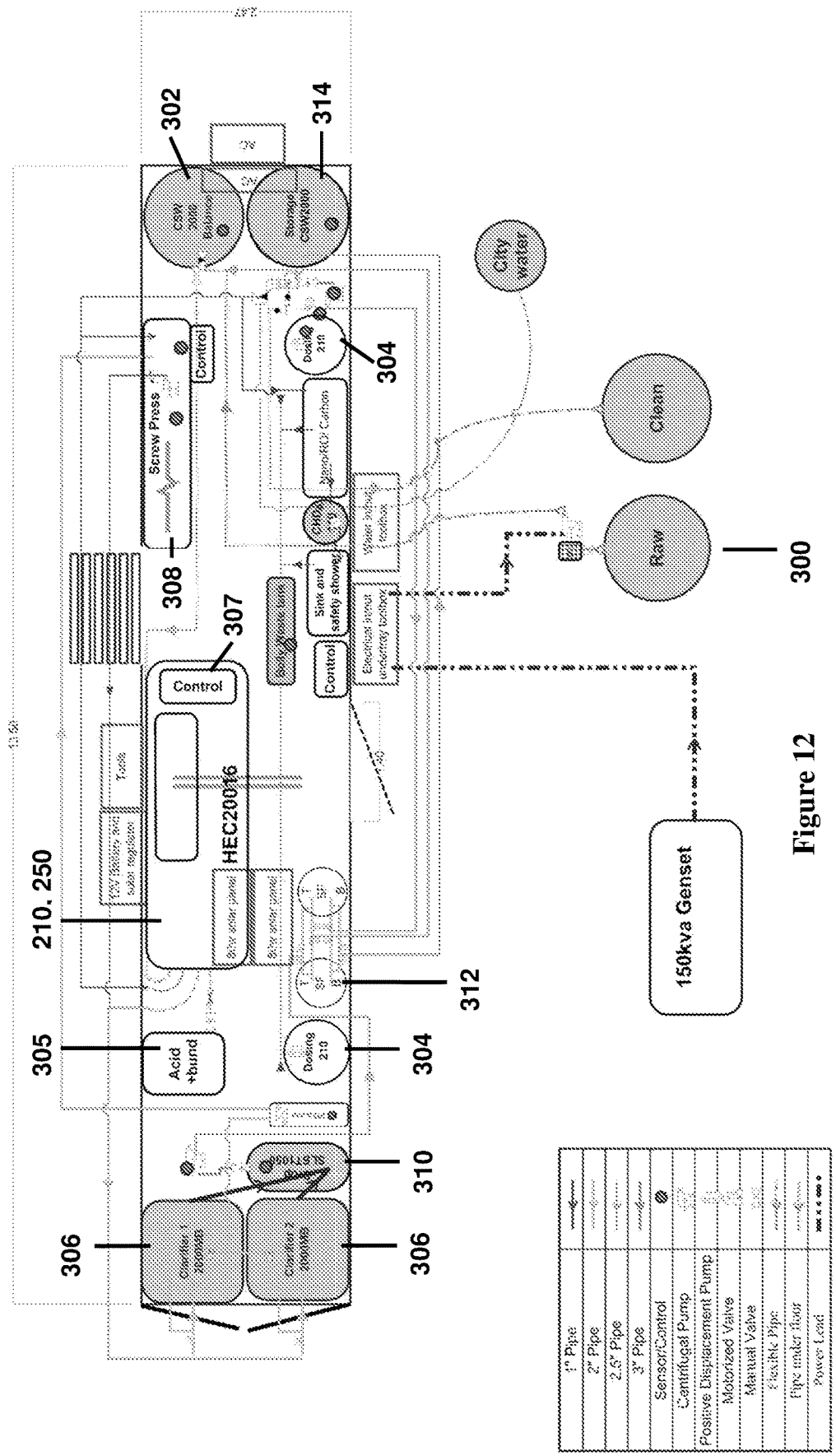
FIG. 12 is a top view of the layout of a trailer including the water treatment system of FIG. 11.
Figure 16:
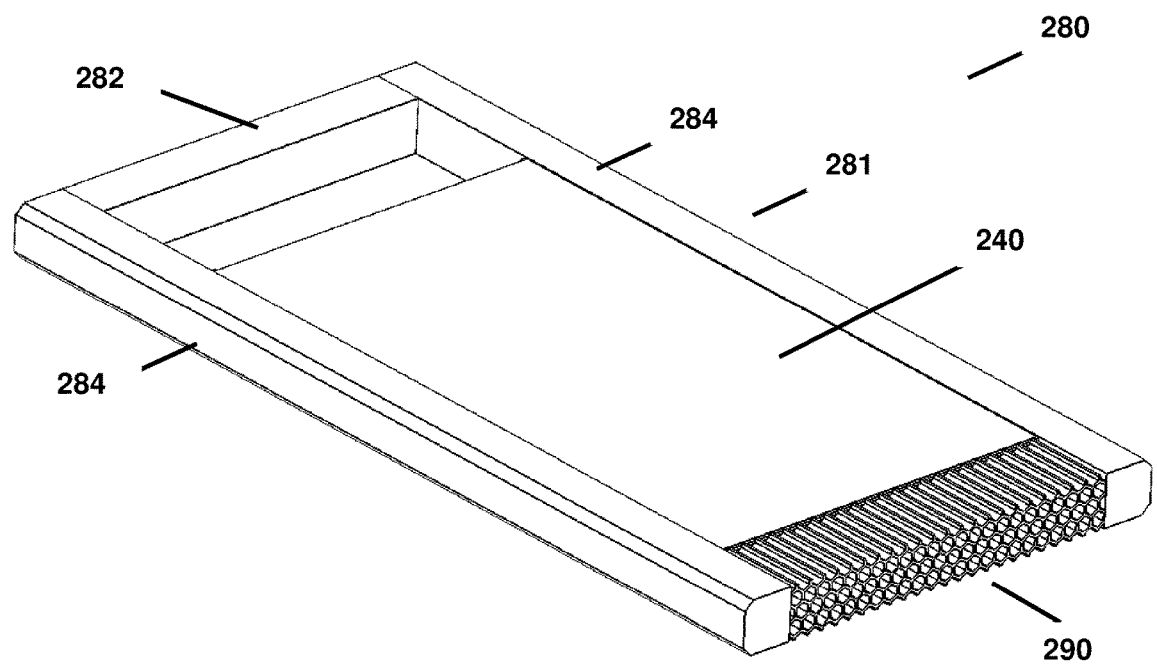
FIG. 16 is a perspective view of a second example electrode holder.
Figure 17:
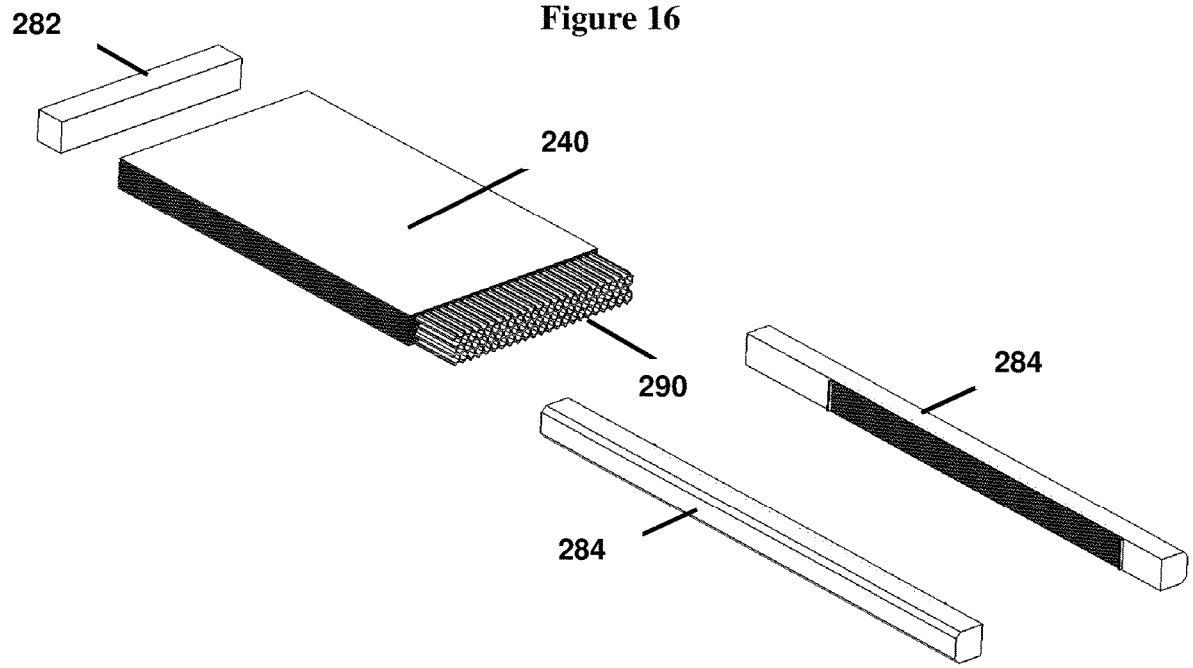
FIG. 17 is an exploded perspective view of the electrode holder of FIG. 16.

FIGS. 11 to 15 illustrate a water treatment system 200 including an electrochemical liquid treatment apparatus 201. In FIGS. 11 and 12, the treatment chamber 210 and defoaming chamber 250 are provided within the component labelled HEC20016 (this component is illustrated, for example, in FIGS. 13-15 and 31-33).

As shown in FIG. 11, raw water 300 external to the trailer is supplied to a balance tank 302 using a centrifugal pump. At least one treatment agent (stored in a dosing tank 304) may be added to the water flowing to the balance tank 302 using a positive displacement pump. Manual ball valves are in the conduit between the raw water 300 and balance tank 302 (80 mm manual ball valve), and between the conduit between the dosing tank 304 and the balance tank 302 (15 mm manual ball valve). The balance tank includes an 80 mm float valve, as well as a level switch.

The water then flows through ball valves (the first of which is an 80 mm valve) to the treatment chamber 210 where electrochemical treatment occurs. The pH of the liquid during the electrochemical treatment may be controlled by the introduction of an acid from acid tank 305. The electrochemically treated water then flows to the defoaming chamber 250. The electrochemical process may be controlled via a system for regulating the electrochemical treatment (which includes a controller (PLC) 307). Electrochemically treated water then flows to clarifiers 306 (which have a level switch) through a 65 mm conduit and 50 mm electric ball valves.

Clarified water (and floc) may exit the clarifiers 306 via 50 mm ball valves before passing through a positive displacement pump and then to successive 50 mm ball valves to a drain connection. Alternatively, the clarified water (and floc) from the clarifiers 306 may pass to a screw press 308 having a float valve. Pressed floc exits the screw press through a 25 mm ball valve to a waste bin. Liquid exiting the screw press 306 passes through a 25 mm ball valve to centrifugal pump, and then through a 25 mm check valve before passing back to clarifiers 306.

Clarified water may be passed from clarifiers 306 via a 100 mm conduit to a drop tank 310 (in which the tank has a level transmitter and a level switch). Fluid exiting drop tank 310 passes through a centrifugal pump and then to sand filters 312 (for separation of floc from the water) or optionally back through clarifiers 306 by way of 50 mm ball vales and 65 mm check valve. After sand filtration the water may be passed to a storage tank 314 (where is it optionally treated by a treatment agent (stored in a dosing tank 304, in which the treatment agent may be pumped into the storage tank 314 by way of a positive displacement pump)), passing through 50 mm ball valves and a 65 mm conduit. From storage tank 314 the treated water may pass through 80 mm ball valves and centrifugal pump before being released. Alternatively, water from the storage tank 314 may pass through ball valves (80 mm and 25 mm), through centrifugal pump and then to: (i) further components of a filtration system, including a carbon filter 316, nanofilter 318, and reverse osmosis system 320; (ii) screw press 308; or (iii) treatment chamber 210 and defoaming chamber 250. The filtered water may pass to a storage tank 322 before re-electrochemical treatment or disposal. In FIGS. 11 and 12, the electrochemical liquid treatment apparatus 201 includes balance tank 302, acid tank 305, dosing tank 304, treatment chamber 210, defoaming chamber 250, and clarifiers 306. As illustrated in FIGS. 11 to 15, there are various pumps 324 and valves associated with the system 200 and apparatus 201.

Figure 31:
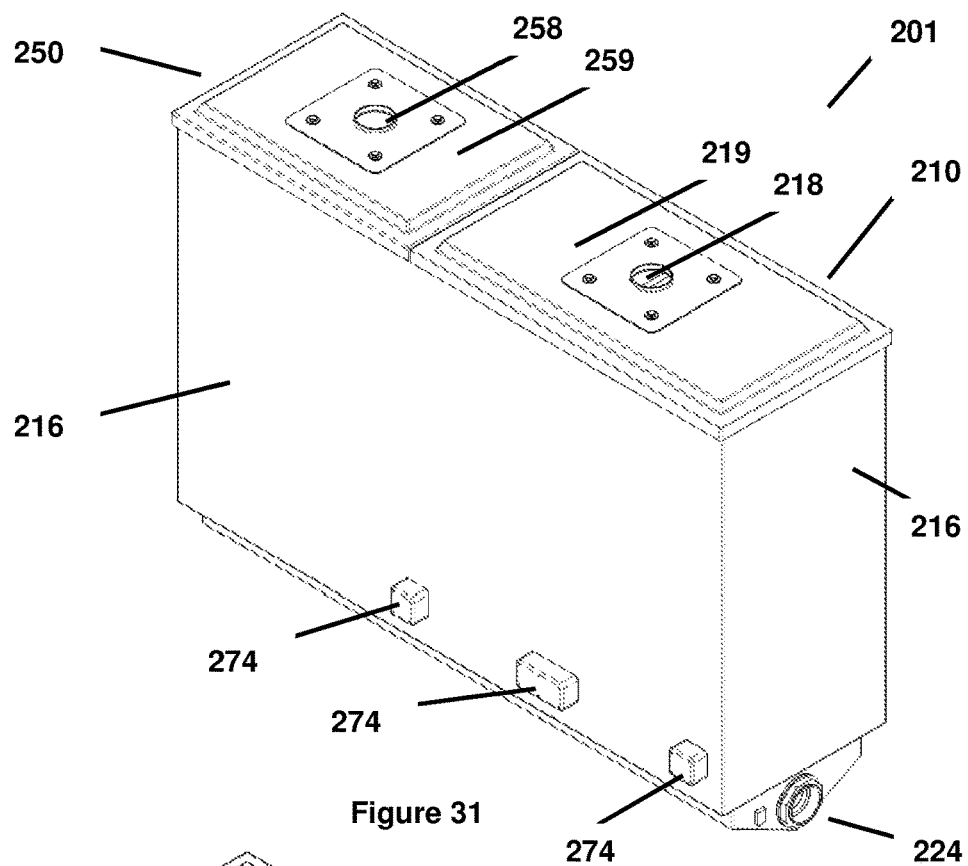
FIG. 31 is a perspective view of a fifth example electrochemical/electrolytic liquid treatment apparatus.
Figure 32:
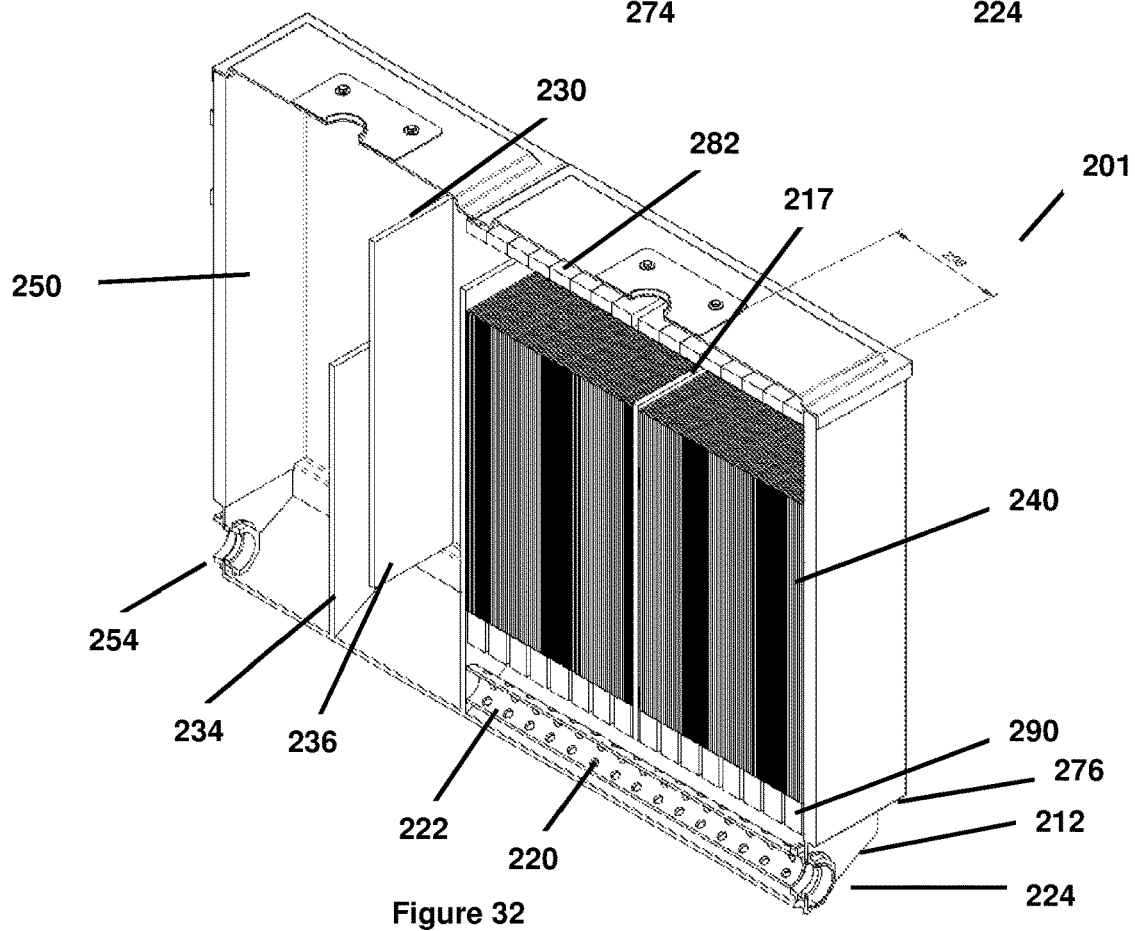
FIG. 32 is a cross sectional view of the apparatus of FIG. 31.
Figure 33:
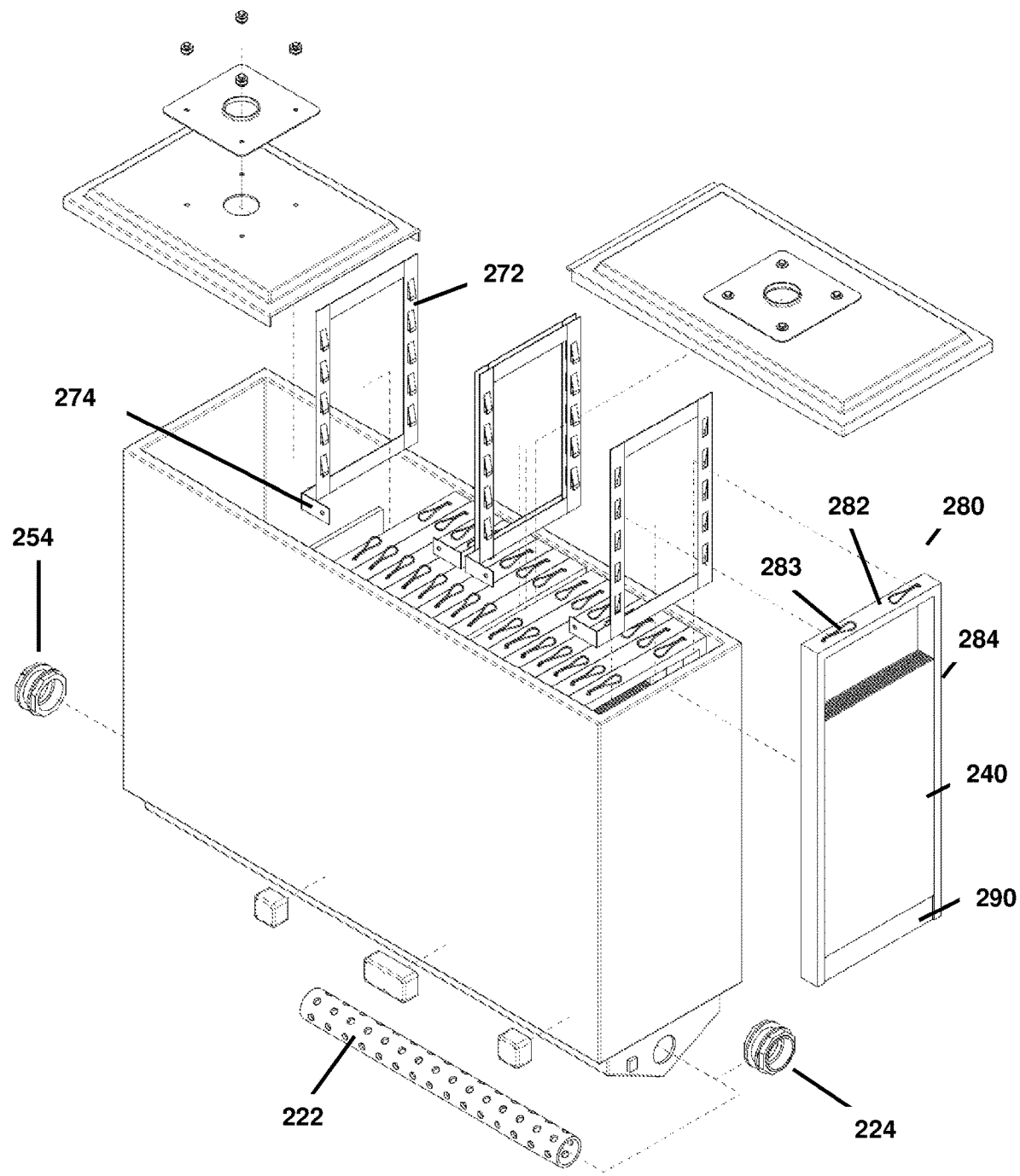
FIG. 33 is an exploded perspective view of the apparatus of FIG. 31.

Three example treatment chambers 210, electrode holders 280, and defoaming chambers 250 are illustrated in FIGS. 16 to 33; a first at FIGS. 16-19, a second at FIGS. 20-30, and a third at FIGS. 31-33. The treatment chamber 210 illustrated in FIGS. 20-22 and 26-30 is capable of only accommodating one electrode holder 280. The treatment chamber 210 illustrated in FIGS. 16-19 is capable of accommodating 10 electrode holders 280, and the treatment chamber 210 illustrated in FIGS. 31-33 is capable of accommodating 16 electrode holders 280. The electrode holders 280 illustrated in FIGS. 16 and 17 and 31-33 are each capable of holding 10 electrodes 240, whereas the electrode holder 280 illustrated in FIGS. 20-25, 29 and 30 is capable of holding 13 electrodes 240. The treatment chamber 210, defoaming chamber 250 and electrode holders 280 in the treatment system 200 illustrated in FIGS. 11-15 is of similar design to those in FIGS. 16-33. However, in the treatment system 200 of FIGS. 11-15, the treatment chamber 210 is capable of accommodating 400 electrodes (which equates to between 30 and 40 electrode holders 280) or the treatment chamber 210 is capable of accommodating 160 electrodes (equating to 16 electrode holders 280). In one embodiment, the treatment chamber 210, defoaming chamber 250 and electrode holders 280 in the treatment system 200 illustrated in FIGS. 11-15 is the treatment chamber 210, defoaming chamber 250 and electrode holders 280 illustrated in FIGS. 31-33. Context permitting, the apparatus 201 of FIGS. 11 to 33 may be used in the same manner, and for the same liquids, as for description above for FIGS. 1-10.

The treatment chamber 210 in the apparatus 201 of FIGS. 11-15 and 31-33 is about 500 L, and can accept a liquid flow rate of about 14 L/second. The residence time of the liquid in the treatment chamber 210 in the apparatus 201 of FIGS. 11-15 and 31-33 is typically about 30 s.

Figure 18:
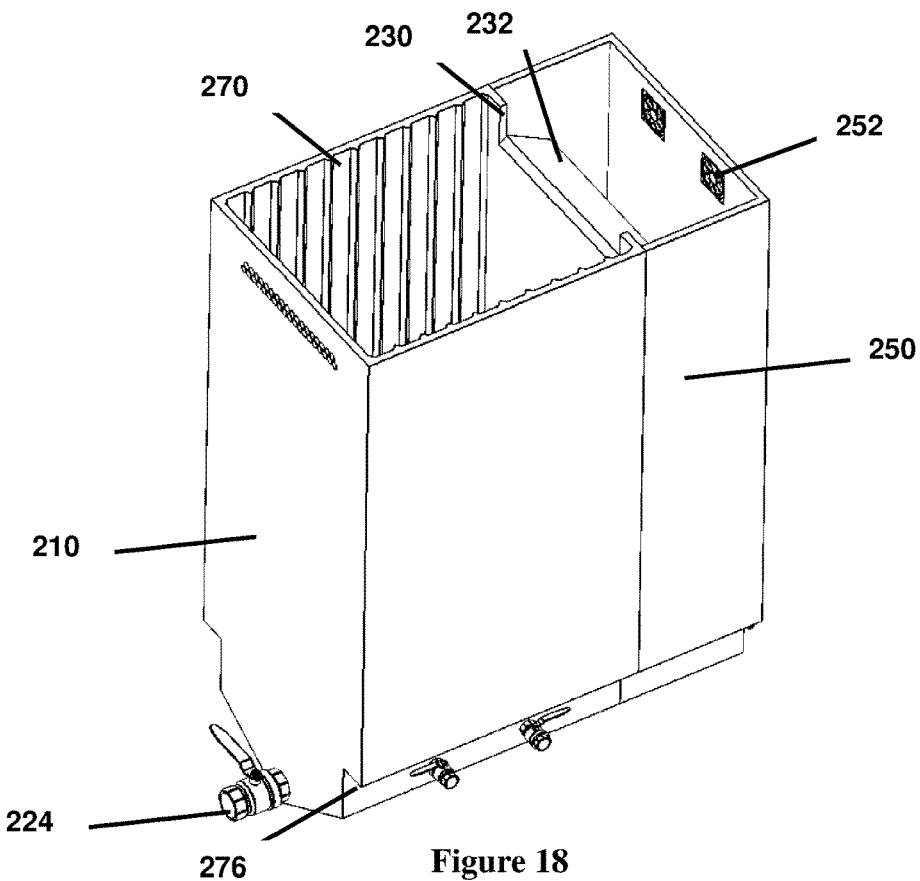
FIG. 18 is a perspective view of an exemplary treatment chamber and defoaming chamber.
Figure 19:
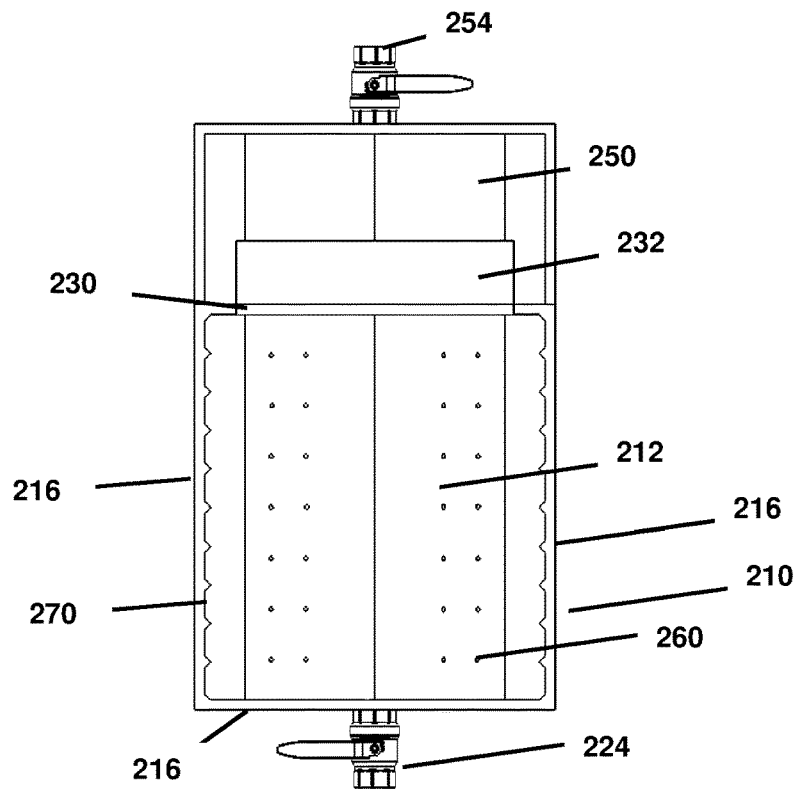
FIG. 19 is a top view of the treatment chamber and defoaming chamber of FIG. 18.
Figure 22:
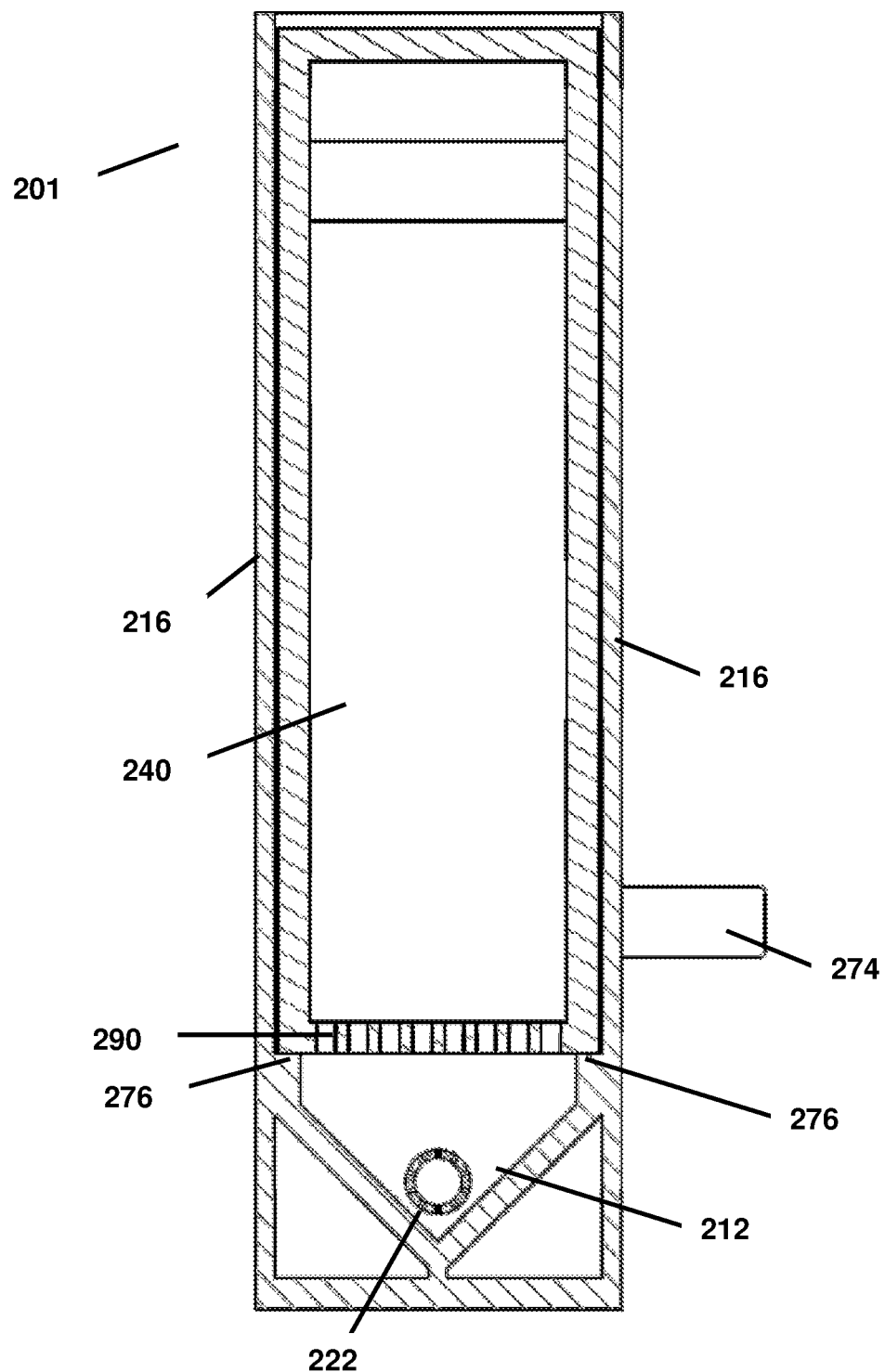
FIG. 22 is a cross sectional view of the apparatus of FIG. 20, through the treatment chamber.
Figure 26:
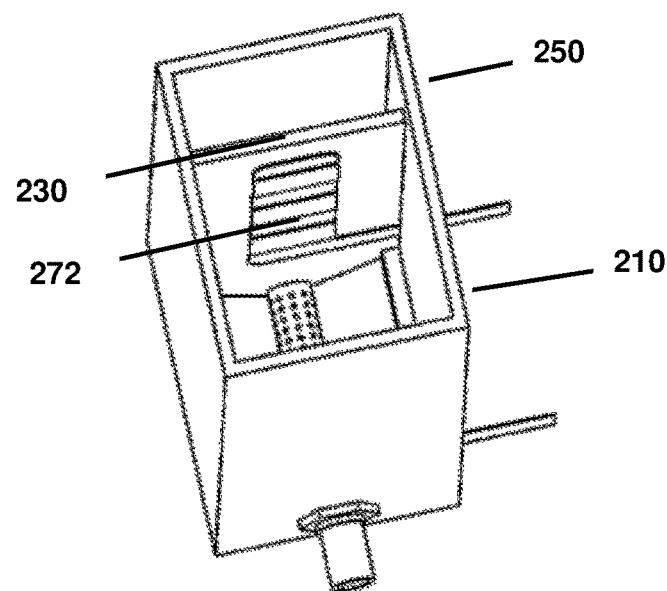
FIG. 26 is a top perspective view of the treatment chamber and defoaming chamber in the apparatus of FIG. 20.
Figure 27:
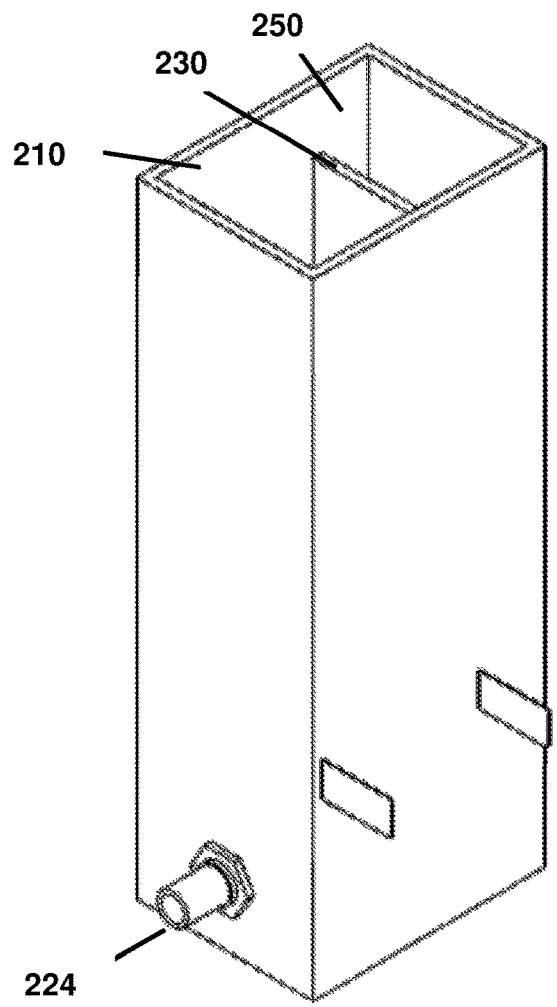
FIG. 27 is a perspective view of the treatment chamber and defoaming chamber of FIG. 26.
Figure 28:
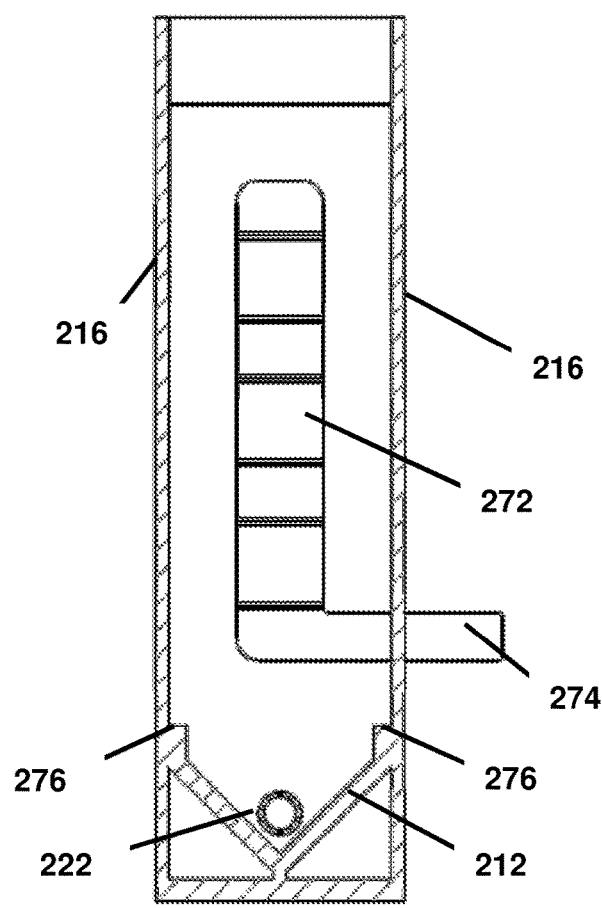
FIG. 28 is a cross sectional view through the treatment chamber of FIG. 26.
Figure 29:
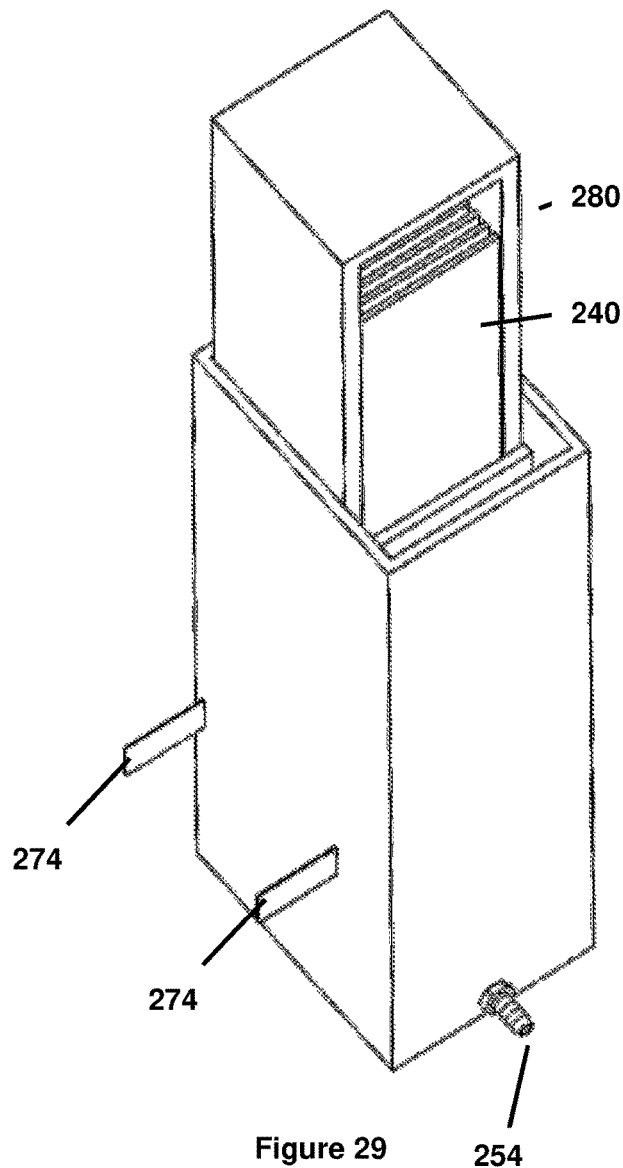
FIG. 29 is a perspective view of the apparatus of FIG. 20 with the electrode holder partly removed.
Figure 30:
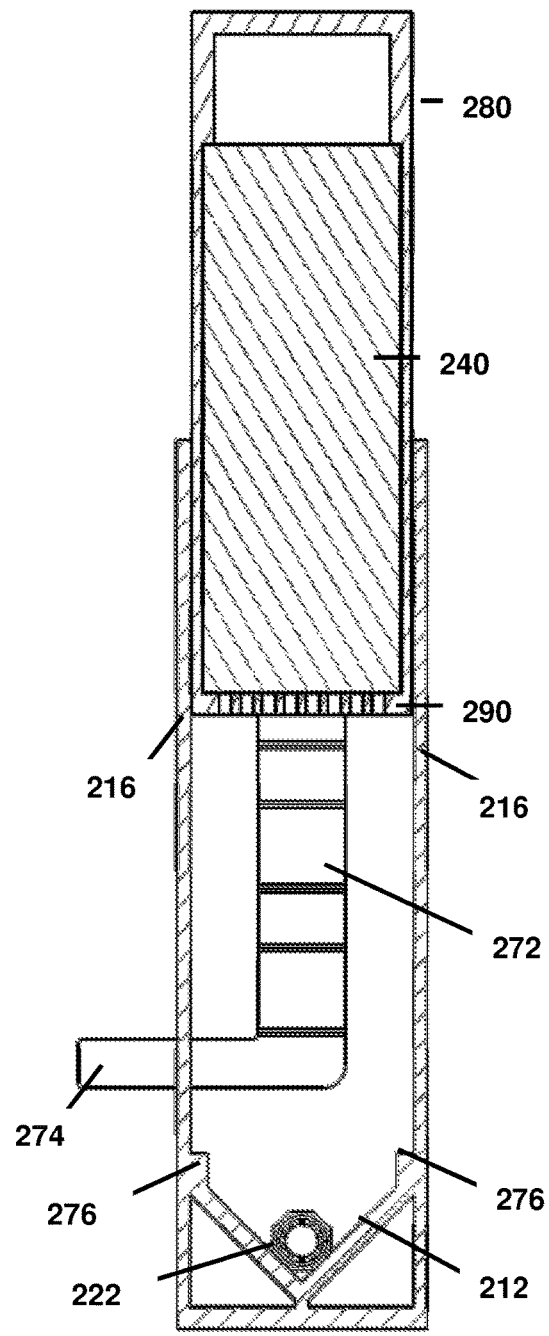
FIG. 30 is a cross sectional view through the treatment chamber and electrode holder of FIG. 20 with the electrode holder partly removed.

The treatment chamber 210 in FIGS. 18 and 19 is about 220 L, and can accept a liquid flow rate of about 5 L/second. The residence time of the liquid in the treatment chamber 210 of FIGS. 11-15 is typically about 30 s.

The treatment chamber 210 in FIGS. 20-22 and 27-30 is about 1 L, and can accept a liquid flow rate of about 2 L/minute. The residence time of the liquid in the treatment chamber 210 of FIGS. 20-22 and 27-30 is typically about 30 s.

The apparatuses 201 illustrated in FIGS. 11-30 are configured to operate at atmospheric temperature and pressure. The apparatus 201 illustrated in FIGS. 31-33 may be configured to operate at atmospheric temperature and pressure, or at reduced or elevated pressures (by applying suction or pressure at ports 218 and 258).

In the examples of FIGS. 11-33, the apparatus 201 is configured so that the liquid rises (or ascends) as it passes through the treatment chamber 210. As illustrated in FIGS. 18-22 and 27-33, the treatment chamber 210 includes a base 212 (or first wall), and four side walls 216.

In FIGS. 18-22 and 27-30 the treatment chamber does not include a second wall (or lid), although a lid may be formed by the handle(s) of the electrode holders 280 (see FIGS. 20 and 21 for example). However, in FIGS. 31-33 the treatment chamber 210 and defoaming chamber 250 include a lid 219, 259. The lids 219, 259 include ports 218, 258 as discussed above. The ports 218, 258 may be for extracting gas.

The treatment chambers 210 in FIGS. 18-33 are generally of substantially rectangular (or square) cross section. Each side wall 216 is planar. However, the bases 212 include a trough or channel and are substantially V-shaped.

The treatment chambers 210 include a disperser 222, and the disperser 222 includes a tube with one liquid entry point 224 and a plurality of inlets 220. The disperser 222 illustrated in the apparatuses 201 of FIGS. 20-33 is a tube perforated along its length to provide a plurality of inlets 220 into the treatment chamber 210 (see FIGS. 21 and 33 in particular). A similar disperser 222 is used in the treatment chamber 210 of FIGS. 18 and 19. The disperser 222 is positioned within the trough or channel in the base 212.

The apparatuses 201 further include a flow aligner 290. The flow aligner 290 is connected to the electrode holders 280 (see FIGS. 16, 17, 23-24, 32 and 33). The flow aligner 290 is in the form of a wall or partition defining a plurality of apertures for passage of the liquid. In use, liquid flows (or is pumped) through the inlets 220 into the lower portion of the treatment chamber 210. The rate at which the liquid flows through the inlets 220 is set so that the liquid pressure on the side of the flow aligner 290 proximate to the at least one inlet is greater than the liquid pressure on the side of the flow aligner 290 proximate to the electrodes 240. The inventors have advantageously found that the combination of the pressure differential across the flow aligner 290 and the consistently spaced and sized apertures across the flow aligner 290 provides an even flow of liquid between the electrodes 240, minimising so-called "dead spots" in between the electrodes 240.

The flow aligner 290 in the apparatuses 201 of FIGS. 11-19 and 31-33 is segmented (with one segment per electrode holder 280). When the electrode holders 280 are in position in the treatment chamber 210, each flow aligner 290 segment is in close proximity with the adjoining segment, so that the electrode holders 280 collectively form the flow aligner 290.

The flow aligner 290 in FIGS. 16, 17 and 31-33 have polygonal (hexagonal) apertures, and the flow aligner 290 in FIGS. 20 to 25, 29 and 30 have ovoid apertures.

The apparatus 201 may be configured to electrochemically treat the liquid in the presence of at least one treatment enhancer or at least one treatment agent. The at least one treatment enhancer is capable of penetrating a solid wall of the treatment chamber, and consequently the at least one treatment enhancer (such as ultraviolet radiation, microwave radiation or ultrasonic waves) may be applied to a side wall 216 of the treatment chamber 210. The at least one treatment agent may enter the treatment chamber 210 through at least one treatment inlet, such as through a gas inlet 260 (see FIG. 19). The gas inlets 260 may be part of a gas disperser, which may be integral with the base 212 of the treatment chamber 210. The types and function of such gases may be as previously described. Alternatively, the at least one treatment inlet may be mixed with the liquid to be treated before the liquid enters the treatment chamber 210. As illustrated in FIG. 11, in the illustrated system 200 the dosing tank 304 may include a treatment agent which is mixed with the liquid in balance tank 302 before the liquid enters the treatment chamber. Also, at least one treatment agent may be added to the liquid entering the storage tank 314 after electrochemical treatment from dosing tank 304. Furthermore, in FIG. 11 at least one treatment agent (in the form of a pH modifier (an acid)) may be added to the treatment chamber 210 during the electrochemical treatment from acid tank 305.

The treatment chamber 210 also includes at least one outlet 230 for exit of electrochemically treated liquid. In the apparatuses 201 of FIGS. 18-22 and 27-33 the at least one outlet 230 is one outlet. As shown in FIGS. 18, 19, 21 and 32, in these apparatuses 201 the outlet 230 is positioned so that the electrodes 240 are configured to be positioned intermediate the at least one inlet 220, and the at least one outlet 230, and the at least one inlet 220 is positioned in a lower portion of the treatment chamber 210 and the at least one outlet 230 is positioned in an upper portion of the treatment chamber 230.

In the apparatuses 201 of FIGS. 18-22 and 27-33 the at least one outlet 230 is in the form of a weir or spillway. The outlet 230 is positioned at the intended height of liquid in the treatment chamber 210. In the apparatuses 201 of FIGS. 18-22 and 27-33, after exiting the treatment chamber 210 at outlet 230, the liquid passes to a defoaming chamber 250.

In the apparatus 201 of FIGS. 18 and 19, the outlet 230 is in association with a flow diverter 232 in the defoaming chamber 250 over which the electrochemically treated liquid (and floc) flows as it exits the treatment chamber 210. In FIGS. 18 and 19, the flow diverter 232 extends the weir or spillway formed by the outlet 230. The flow diverter 232 is intended to divert the flow of electrochemically treated liquid to thereby increase the liberation of gas from the liquid. As illustrated in FIG. 18 the defoaming chamber 250 may include at least one defoamer 252. The defoamer 252 may include one or more nozzles for spraying liquid onto the foam. The sprayed liquid is intended to penetrate the foam bubbles to thereby release the gas trapped in the foam. The liquid exits the defoaming chamber 250 through an outlet 254 at the base of the chamber 250.

In the apparatus 201 of FIGS. 20-22 and 27-30, the defoaming chamber 250 does not include a defoamer 252. After flowing through outlet 230, the liquid descends through defoaming chamber 250 and then through an outlet 254 at the base of the chamber 250.

In the apparatus 201 of FIGS. 31-33, the defoaming chamber 250 includes a first flow diverter 234 and a second flow diverter 236. The first flow diverter 234 provides a weir inside the defoaming chamber 250. The second flow diverter 236 provides an underflow weir (under which fluid passes when flowing through the defoaming chamber 250). The bottom of the second flow diverter 236 extends below than the top of the first flow diverter 234. Both the first and second flow diverters 234, 236 are substantially vertical and are in the form of a wall or plate. In the arrangement illustrated in FIG. 32, electrochemically treated fluid exits the treatment chamber 210 through outlet 230. The fluid then falls into the space between the second flow diverter 236 and the outlet 230, and in use fluid fills this space to at least the height of the first flow diverter 234. As foam floats, the foam is trapped in this space, and the fluid falling into this space over outlet 230 penetrates the foam to thereby release trapped gas. Meanwhile, defoamed fluid passes beneath the second flow diverter 236 and then over the first flow diverter 234 before exiting the defoaming chamber 250 through outlet 254.

In FIGS. 11 and 12, after exiting the defoaming chamber 250 the liquid flows to a vessel for separation of the floc from the liquid (clarifier 306). A floc mover 80 (as described above) may be used with the vessel (or clarifier 306) to assist in separating the floc.

In the apparatuses of FIGS. 11-33, the electrodes 240 are added or removed from the treatment chamber 210 via electrode holders 280. In the apparatus 201 of FIGS. 18 and 19 the treatment chamber 210 includes grooves 270 for slideable engagement of the electrode holder 280 in the treatment chamber 210. However, in the apparatus 201 of FIGS. 31-33 no such grooves 270 are present. In the apparatuses 201 of FIGS. 18-22 and 27-33 the treatment chamber 210 also includes a shelf 276 upon which the electrode holders 280 rest when in position.

Within each electrode holder 280 only two or three electrodes 240 may be connected to power (and thereby become anodes and cathodes). The remaining electrodes may all be electrical conductors. In each electrode holder 280 each electrode 240 is substantially planar and is of solid construction. The electrodes 240 may have a tapered lower edge, as previously described. The apparatuses 201 of FIGS. 11-33 are configured so that the electrodes 240 are positionable below the level of the liquid in the treatment chamber 210. The apparatuses 201 of FIGS. 11-33 are configured so that the electrodes 240 are positioned substantially vertically (substantially in a plane perpendicular to the first wall 212) within the treatment chamber 210 (although it may also be advantageous to position the electrodes 240 (or a portion of the electrodes) at an angle as previously described).

As illustrated in FIGS. 16, 17, 23-25 and 33, the electrode holder 280 includes a frame 281, and the frame 281 includes a handle 282 and two side walls 284. The frame 281 is substantially "U" shaped. The frame also includes a flow aligner 290 (or a segment thereof).

The treatment chamber 210 of FIGS. 13-15, 18, 19, 20-22, and 29-33 further includes at least one power connector 272 for connecting power to an electrode holder 280 or to at least one electrode 240 held by the electrode holder 280. In the treatment chamber 210 exemplified in FIGS. 18 and 19, the treatment chamber 210 includes a power connector for each electrode holder 280, and the power connectors extend from the base 212 of the treatment chamber 210 (not shown in the Figures). In this example, the electrode holder 280 includes an electrode holder power connector extending towards the base 212 of the treatment chamber 210. The treatment chamber power connector and electrode holder power connector may be configured for mating arrangement with each other. The power connectors may be made of any suitable material, but in this example may be made of bronze. In the electrode holder 280 of FIGS. 16 and 17, the power flows from the power connector up the side wall(s) 284 of the electrode holder 280 and then to selected electrodes 240.

A different mechanism for connecting power to the electrodes 240 is illustrated in the treatment chamber 210 of FIGS. 20-22 and 26-30. In FIGS. 20-22 and 26-30, the treatment chamber 210 is configured to supply power longitudinally along the working face of at least one electrode 240. In this example, the power connector 272 is adapted to contact the working face of at least one electrode 240. The power connector 272 includes a corrugated spring steel strip. In this example, the power connector 272 also traverses the wall of the treatment chamber 210 to provide a tab 274 for connection to a power source. A similar arrangement may be used with a plurality of electrode holders 280 (such as in the treatment chamber 210 of FIGS. 11-15), as in this case each power connector 272 may be positioned intermediate to the working face of a terminal electrode 240 held by two electrode holders 280. The crests (and troughs) of the power connector 272 may be positioned so that the crests of the power connector 272 contact one terminal electrode 240, and the troughs of the power connector 272 contact the other terminal electrode 240.

A similar mechanism for connecting power to the electrodes 240 is illustrated in the treatment chamber 210 of FIGS. 31-33. In FIGS. 31-33 the treatment chamber 210 is also configured to supply power longitudinally along the working face of at least one electrode 240. However, while the power connector 272 illustrated in FIGS. 20-22 and 27-30 includes one corrugated spring steel strip per electrode 240, in FIGS. 31-33 the power connector 272 includes two corrugated spring steel strips per electrode 240 (see FIG. 33). The treatment chamber 210 in the apparatus 201 of FIGS. 31-33 includes four power connectors 272, and each power connector provides power to only one electrode 240.

In FIGS. 16, 17, 20-25 and 29-33, the electrodes 240 are, on average, 3 mm thick and 3 mm apart. However, alternative thicknesses and distances may also be used in the apparatus 201.

In the apparatus 201 of FIGS. 20-22 and 26-30 two of the 13 electrodes 240 (or about 15% of the electrodes 240) are connected to power. The remaining nine electrodes 240 are all electrical conductors.

In the apparatus 201 of FIGS. 31-33, four of the 160 electrodes 240 (or about 2.5% of the electrodes 240) are connected to power. The remaining 156 electrodes 240 are all electrical conductors.

The treatment chamber 210 in FIGS. 31-33 also includes a divider wall (or plate) 217 positionable between the electrode holders 280. The electrode holders 280 in FIGS. 31 and 33 also include an electrode holder remover 283 (in the form of a cable loop or string) to assist in removing the electrode holder 280 from the treatment chamber 210.

As illustrated in FIGS. 13-15, the apparatus 201 may further include a liquid pump 324 for pumping liquid to be treated through the at least one inlet for entry of a liquid to be treated, and a further pump 324 for pumping liquid from the defoaming chamber 250 (see FIG. 13). In FIG. 13, 326 is a treated water outlet (DN80), 328 is a fresh water inlet (DN25), 330 is a clean in place connection (DN25), 332 is a drain outlet (DN25) and 334 is a raw water inlet (DN80). The power supply to the apparatus 201 of FIGS. 13-15 is 415 V, 50 Hz and 150 A.

The apparatus 201 of FIGS. 11-15 further includes sensors for sensing the level of liquid in the treatment chamber 210, and a variable speed pump 324 to control the flow rate of liquid exiting the treatment chamber 210. The sensors and variable speed pump 324 may form part of a system for regulating the electrochemical treatment, which may be controlled by controller (PLC) 307. The controller 307 may control the polarity of the current and its reversal to thereby switch the electrodes 240 between anodes and cathodes. The controller 307 may also control the sinewave ramping angles during the electrochemical treatment, and/or modify the rate of current application to the electrodes 240 during the electrochemical treatment. Similar components may be used in the apparatuses 201 discussed in FIGS. 18-33.

Any suitable current may be applied to the electrodes 240 during the electrochemical treatment, however the voltage applied to each electrode holder 280 in the treatment chamber 210 in FIGS. 11-33 is typically between about 20 and 45 V, especially about 26 V or about 40 V. The effective voltage to each cell is typically around 2-3 V, especially about 2.6 V or about 3 V. For the apparatus 201 of FIGS. 31-33, the total voltage applied to the treatment chamber 210 may be about 415 V, resulting in an effective voltage to each cell (given there are 160 electrodes 240) of about 2.6 V.

In use, liquid is pumped into the treatment chamber 210 via the at least one inlet 220, and liquid pressure builds beneath flow aligner 290. Liquid passes through the flow aligner 290 and between the electrodes 240 where the liquid is electrochemically treated and floc is generated. The floc and electrochemically treated liquid then flow to the upper portion of the treatment chamber 210, and gas bubbles (from gas inlets 260, for example) may assist in driving the floc and electrochemically treated liquid vertically. The floc and electrochemically treated liquid then pass through the at least one outlet 230 and into the defoaming chamber 250, over/around flow diverter(s) 232 and optionally past defoamers 252. This process leads to defoaming of the floc/electrochemically treated liquid. The floc/electrochemically treated liquid then flows out the outlet 254 in the defoaming chamber 250 and then to a vessel for separation of the floc (e.g. clarifier 306).

The apparatus 1, 201 defined in preferred embodiments of the present invention (as for example illustrated in FIGS. 1 to 33) provides several advantages. These, for example, may include:
  Reduced passivation or surface fouling of the electrodes 40, 240;
  Even dispersal of liquid relative to the electrodes 40, 240 throughout the treatment chamber 10, 210, which may maximise efficient contact between the electrodes 40, 240 and the liquid being treated;
  Minimisation of so-called "dead-spots" within the treatment chamber 10, 210, where flow of the liquid is reduced;
  The liquid substantially rises as it passes through the treatment chamber 10, 210 such that substantially all floc travels to the top 14 of the treatment chamber 10, 210, rather than settling at the bottom as in many prior art apparatuses;
  The presence of an oxidant or reductant (or other treatment agent) within the treatment chamber 10, 210 may encourage or facilitate the further electrochemical reactions of reduction or oxidation or may result in enhanced oxidation processes or enhanced reduction processes within the treatment chamber 10, 210;
  The floc mover 80 (especially floc skimmer) may assist in providing a horizontal flow for the liquid at the top 14 of the treatment chamber 10 (or top of a vessel (such as a clarifier) in which floc is separated) to thereby assist in removing floc;
  The angled electrodes 40 may provide a number of advantages including: (i) preventing passivation (build-up of floc) on the electrodes 40; (ii) applying a horizontal movement to the liquid as it travels through the treatment chamber 10, which may assist in directing the liquid to the liquid outlet 34 and floc to the floc outlet 32; (iii) assisting in agglomerating floc. However, the electrodes 40, 240 need not be angled;
  Substantially all floc may be able to efficiently exit the treatment chamber 10 via the floc outlet 32, where it may be separated from the liquid;
  Electrodes 40, 240 may be readily replaced or removed (this is important as the anode 44 in particular may corrode during electrochemical treatment);
  Even dispersal of gas relative to the electrodes 40, 240 throughout the treatment chamber 10, 210, which may improve or increase the liquid flow velocity between the electrodes 40, 240. This has advantages including: (i) reduction of dangerous gas accumulation at the electrodes 40, 240; (ii) reduced passivation of the at least one cathode 42; and (iii) floc is more likely to be pushed to the top 14 of the treatment chamber 10, 210 where it may be efficiently removed;
  An electrode holder 100, 280 may allow for rapid replacement of the electrodes 40, 240 to thereby minimise down-time of the apparatus 1, 201;
  The use of a separate vessel for separation of floc (such as clarifier 306 as in FIGS. 11-12) may be advantageous when processing large volumes of liquid;
  The use of a flow aligner 290 and a pressure differential across the flow aligner 290 may assist in providing an even flow of liquid between the electrodes 240;
  An angled first wall 212 of the treatment chamber, together with a disperser (such as 222) may assist in directing the flow of the liquid towards the electrodes 280);
  The use of at least one treatment agent and/or at least one treatment enhancer during, before or after the electrochemical treatment may assist in purifying the fluid. The use of increased pressure may also assist in purifying the fluid (e.g. by facilitating decomposition of contaminants); and
  The use of defoamers 252 and/or a defoaming chamber 250 may assist in separating the floc from the liquid (by allowing entrained gases to escape which could otherwise be problematic for pumps).

The above advantages when considered individually or collectively provide an apparatus with improved efficiency for electrochemical processes (especially electrocoagulation processes). This may include one or more of: improved removal of contaminants, enhanced oxidation or reduction processes, reduced down-time for maintenance, reduced power consumption and higher through-put of a liquid being treated compared to prior art processes. For the avoidance of doubt, this does not mean that other features of the present invention do not also provide improved efficiency of electrochemical processes.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described includes preferred forms of putting the invention into effect. The invention is, therefore, claimed in any of its forms or modifications within the proper scope of the appended claims appropriately interpreted by those skilled in the art.

The invention claimed is:

1. An electrochemical liquid treatment apparatus comprising:
    a treatment chamber containing at least one inlet for entry of a liquid to be treated, and comprising at least one outlet for exit of electrochemically treated liquid;
    a plurality of electrodes comprising at least one anode, at least one cathode, and at least one electrical conductor positioned intermediate said anode and said cathode;
    at least one electrode holder holding electrodes comprising: (i) at least one electrical conductor; and (ii) at least one anode and/or at least one cathode; wherein the at least one electrode holder is slideable between:
        (i) a holding position in which the electrode holder is engaged with the treatment chamber and said electrodes held by the electrode holder are positioned within the treatment chamber for electrochemical treatment of the liquid;
    and wherein at least two of said electrodes held by the electrode holder are configured to be differently charged so as to define an electrochemical treatment zone in a liquid passageway therebetween; and
        (ii) a released position in which the electrode holder is not present in the treatment chamber; and
    a flow aligner positioned intermediate the at least one inlet and the plurality of electrodes when the at least one electrode holder is in the holding position, wherein the flow aligner includes a wall defining a plurality of apertures for passage of the liquid; and wherein the flow aligner is configured to align the flow of the liquid into the liquid passageway between the at least two electrodes and substantially along a longest axis of at least one of the at least two electrodes;
    wherein, when the at least one electrode holder is in the holding position, the treatment chamber includes at least one power connector for connecting power to said anode or said cathode held by the at least one electrode holder; and
    wherein, when the at least one electrode holder is in the holding position, the at least one power connector includes a resilient metal flexed against said anode or said cathode to thereby connect power thereto without use of a screwed connector.

2. The apparatus of claim 1, wherein the flow aligner is for distributing the liquid between the electrodes.

3. The apparatus of claim 1, wherein the wall defines a plurality of apertures configured to provide a greater liquid pressure on the side of the wall proximate to the at least one inlet than on the side of the wall proximate to the electrodes when the at least one electrode holder is in the holding position.

4. The apparatus of claim 1, wherein in the holding position the at least one electrode holder is engaged with the treatment chamber by friction.

5. The apparatus of claim 1, wherein the at least one electrode holder includes the flow aligner.

6. The apparatus of claim 5, wherein the apparatus includes a plurality of electrode holders and each said electrode holder includes a segment of the flow aligner.

7. The apparatus of claim 1, wherein the treatment chamber includes a liquid disperser for dispersing the liquid to be treated into the treatment chamber, wherein said liquid disperser includes a plurality of inlets within the treatment chamber for entry of a liquid to be treated.

8. The apparatus of claim 7, wherein the liquid disperser is a tube perforated along its length to provide said plurality of inlets.

9. The apparatus of claim 1, wherein the treatment chamber has a first wall and one or more side walls, wherein the first wall is distal to the electrodes and proximate to the at least one inlet, and wherein the first wall has an inner surface configured to direct the flow of liquid towards the electrodes.

10. The apparatus of claim 9, wherein the inner surface of the first wall includes at least one channel which narrows to its base.

11. The apparatus of claim 10, wherein the treatment chamber includes at least one liquid disperser for dispersing the liquid to be treated into the treatment chamber, wherein said liquid disperser includes a plurality of inlets within the treatment chamber for entry of a liquid to be treated, and wherein within each said at least one channel is positioned one said liquid disperser.

12. The apparatus of claim 1, wherein the power connector includes a corrugated spring steel strip flexed against said at least one electrode when the at least one electrode holder is in the holding position.

13. The apparatus of claim 1, wherein the apparatus further includes a defoaming chamber comprising one or more nozzles for spraying liquid onto foam produced from the electrochemical treatment.

14. The apparatus of claim 1, wherein the apparatus is configured for a liquid flow rate of at least 10 liters per second.

15. The apparatus of claim 1, wherein the plurality of electrodes are from 1 to 10 mm apart.

16. The apparatus of claim 1, wherein the at least one outlet is positioned in an upper portion of the treatment chamber, and the at least one inlet is positioned in a lower portion of the treatment chamber.

17. The apparatus of claim 1, wherein the plurality of electrodes are positioned vertically within the treatment chamber.

18. A method of electrochemically treating a liquid, the method comprising the steps of:
    introducing a liquid to be treated into the apparatus of claim 1 when the at least one electrode holder is in the holding position;
    applying a voltage to at least two of said plurality of electrodes to provide at least one cathode and at least one anode to thereby electrochemically treat the liquid; and
    removing electrochemically treated liquid from the apparatus.

19. The method of claim 18, further comprising the step of introducing a treatment agent into the apparatus.

* * * * *